(12) United States Patent
Kubota et al.

(10) Patent No.: US 9,129,568 B2
(45) Date of Patent: Sep. 8, 2015

(54) LIQUID CRYSTAL DISPLAY DEVICE WHEREIN A DEVIATION IN GRAY LEVEL FOR DISPLAYING A STILL IMAGE IN ONE FRAME PERIOD IS LESS THAN OR EQUAL TO 1.2% OF A MAXIMUM GRAY LEVEL

(71) Applicant: SEMICONDUCTOR ENERGY LABORATORY CO., LTD., Atsugi-shi, Kanagawa-ken (JP)

(72) Inventors: Daisuke Kubota, Kanagawa (JP); Yoshiharu Hirakata, Kanagawa (JP); Ryo Hatsumi, Kanagawa (JP)

(73) Assignee: Semiconductor Energy Laboratory Co., Ltd., Kanagawa (JP)

( * ) Notice: Subject to any disclaimer, the term of this patent is extended or adjusted under 35 U.S.C. 154(b) by 0 days.

(21) Appl. No.: 14/078,693

(22) Filed: Nov. 13, 2013

(65) Prior Publication Data
US 2014/0132870 A1    May 15, 2014

(30) Foreign Application Priority Data

| Nov. 15, 2012 | (JP) | ................................. | 2012-251653 |
| Nov. 29, 2012 | (JP) | ................................. | 2012-260839 |
| Mar. 7, 2013 | (JP) | ................................. | 2013-044848 |
| Jul. 22, 2013 | (JP) | ................................. | 2013-151217 |

(51) Int. Cl.
*C09K 19/02* (2006.01)
*G02F 1/133* (2006.01)
*G09G 3/36* (2006.01)
(Continued)

(52) U.S. Cl.
CPC ................ *G09G 3/36* (2013.01); *G02F 1/1396* (2013.01); *G02F 2001/13706* (2013.01); *G02F 2202/42* (2013.01)

(58) Field of Classification Search
CPC .................................................. G02F 1/136277
USPC ...................................... 349/42, 140, 167, 36
See application file for complete search history.

(56) References Cited

U.S. PATENT DOCUMENTS 6,191,833 B1 * 2/2001 Hirakata ......................... 349/61
2002/0033923 A1 * 3/2002 Shimoshikiryou et al. ... 349/141
(Continued)

FOREIGN PATENT DOCUMENTS

| CN | 102667910 | 9/2012 |
| JP | 2002-169184 A | 6/2002 |

(Continued)

OTHER PUBLICATIONS

International Search Report (Application No. PCT/JP2013/080735) Dated Feb. 10, 2014.
(Continued)

*Primary Examiner* — Paul Lee
(74) *Attorney, Agent, or Firm* — Nixon Peabody LLP; Jeffrey L. Costellia

(57) ABSTRACT

A novel liquid crystal display device without a decrease in display quality. The liquid crystal display device includes a pixel for displaying a still image at a frame frequency of less than or equal to 1 Hz, and a liquid crystal layer in the pixel has a dielectric constant anisotropy of greater than or equal to 2 and less than or equal to 5. With the above structure, a change in voltage applied to a pixel can be kept within an acceptable range of a deviation in gray level for displaying the same still image. Thus, flickers due to a low refresh rate can be reduced, which leads to an increase in display quality.

12 Claims, 31 Drawing Sheets

(51) Int. Cl.
*G02F 1/139* (2006.01)
*G02F 1/137* (2006.01)

(56) References Cited

U.S. PATENT DOCUMENTS

| | | |
|---|---|---|
| 2002/0093619 A1 | 7/2002 | Furuie |
| 2008/0048966 A1* | 2/2008 | Liao et al. .................... 345/102 |
| 2010/0060836 A1 | 3/2010 | Kunimatsu et al. |
| 2011/0090183 A1 | 4/2011 | Yamazaki et al. |
| 2011/0090204 A1 | 4/2011 | Yamazaki et al. |
| 2011/0102696 A1 | 5/2011 | Yamazaki et al. |
| 2011/0115839 A1 | 5/2011 | Takahashi et al. |
| 2011/0128461 A1 | 6/2011 | Koyama et al. |
| 2011/0134350 A1 | 6/2011 | Yamazaki et al. |
| 2011/0148826 A1 | 6/2011 | Koyama et al. |
| 2011/0148846 A1 | 6/2011 | Arasawa et al. |
| 2011/0149185 A1 | 6/2011 | Yamazaki |
| 2011/0157131 A1 | 6/2011 | Miyake |
| 2011/0175833 A1 | 7/2011 | Kurokawa et al. |
| 2011/0175874 A1 | 7/2011 | Wakimoto et al. |
| 2011/0175894 A1 | 7/2011 | Wakimoto et al. |
| 2011/0175895 A1 | 7/2011 | Hayakawa et al. |
| 2011/0181560 A1 | 7/2011 | Yamazaki |
| 2011/0193836 A1 | 8/2011 | Umezaki |
| 2011/0199404 A1 | 8/2011 | Umezaki et al. |
| 2011/0205254 A1* | 8/2011 | Umezaki et al. .............. 345/690 |
| 2011/0210957 A1 | 9/2011 | Koyama et al. |
| 2011/0216023 A1 | 9/2011 | Kurokawa et al. |
| 2011/0216043 A1 | 9/2011 | Tamura et al. |
| 2011/0216048 A1 | 9/2011 | Koyama et al. |
| 2011/0267297 A1 | 11/2011 | Yamazaki et al. |
| 2011/0267330 A1 | 11/2011 | Yamazaki et al. |
| 2011/0267331 A1 | 11/2011 | Yamazaki et al. |
| 2011/0267381 A1 | 11/2011 | Yamazaki et al. |
| 2011/0279356 A1 | 11/2011 | Takemura |
| 2011/0279419 A1 | 11/2011 | Takemura |
| 2011/0285372 A1 | 11/2011 | Takahashi et al. |
| 2011/0285426 A1 | 11/2011 | Takahashi et al. |
| 2012/0001874 A1 | 1/2012 | Kurokawa et al. |
| 2012/0001954 A1 | 1/2012 | Yamazaki et al. |
| 2012/0002127 A1 | 1/2012 | Yamazaki et al. |
| 2012/0032942 A1 | 2/2012 | Toyotaka et al. |
| 2012/0033151 A1 | 2/2012 | Toyotaka et al. |
| 2012/0038618 A1 | 2/2012 | Koyama |
| 2012/0062811 A1 | 3/2012 | Miyake |
| 2012/0273773 A1 | 11/2012 | Ieda et al. |
| 2012/0293202 A1 | 11/2012 | Nishijima et al. |
| 2012/0293209 A1 | 11/2012 | Takewaki |
| 2012/0319107 A1 | 12/2012 | Miyake |
| 2013/0134416 A1 | 5/2013 | Nishijima et al. |
| 2013/0235689 A1 | 9/2013 | Koyama |

FOREIGN PATENT DOCUMENTS

| | | |
|---|---|---|
| JP | 2002-311457 A | 10/2002 |
| JP | 2011-237760 | 11/2011 |
| KR | 2002-0042455 A | 6/2002 |
| KR | 2012-0105505 A | 9/2012 |
| TW | 201202819 | 1/2012 |
| WO | WO-2011/074391 | 6/2011 |

OTHER PUBLICATIONS

Written Opinion (Application No. PCT/JP2013/080735) Dated Feb. 10, 2014.

* cited by examiner

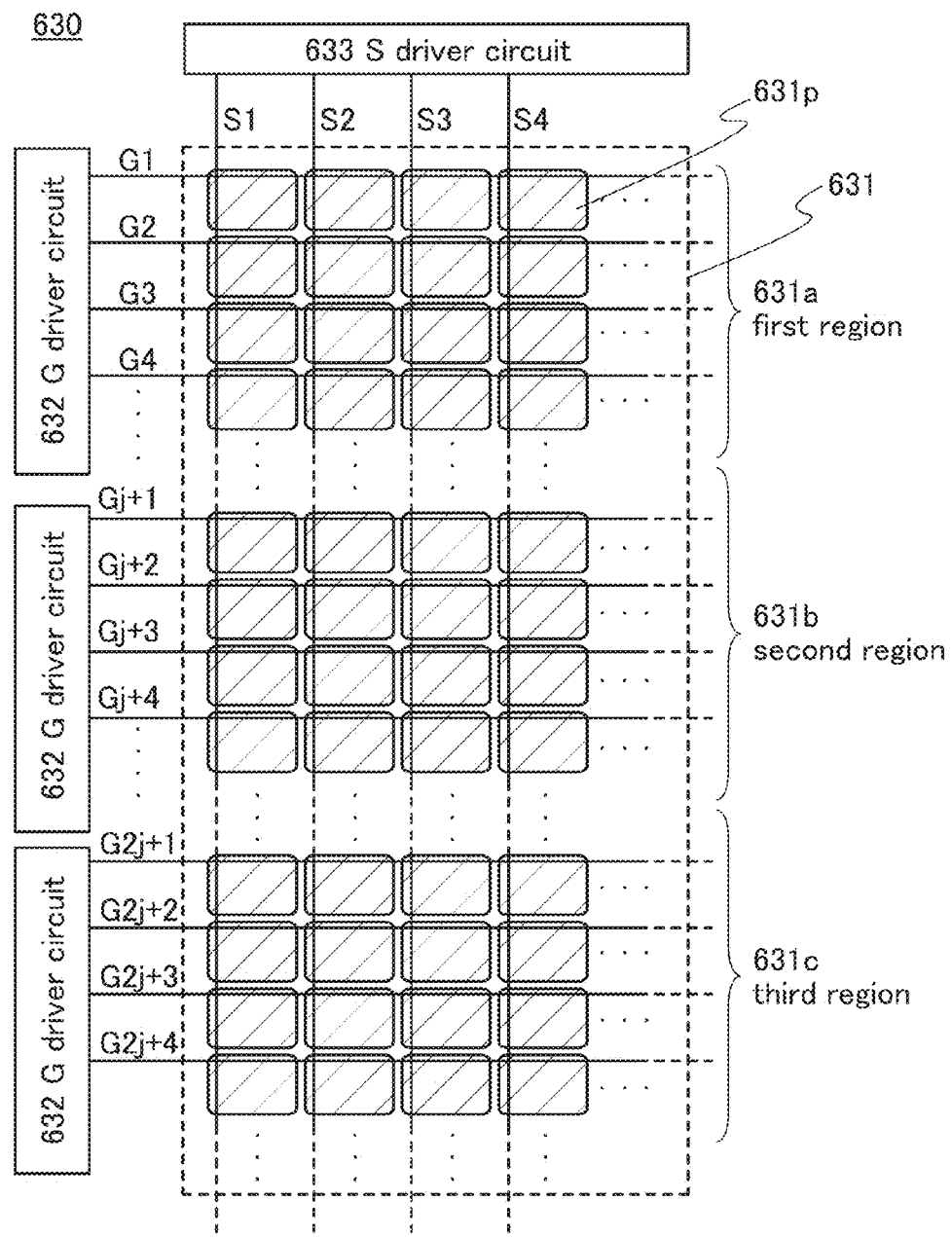

FIG. 11A1
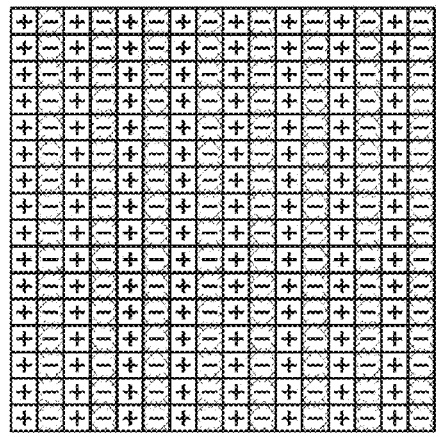
FIG. 11A2
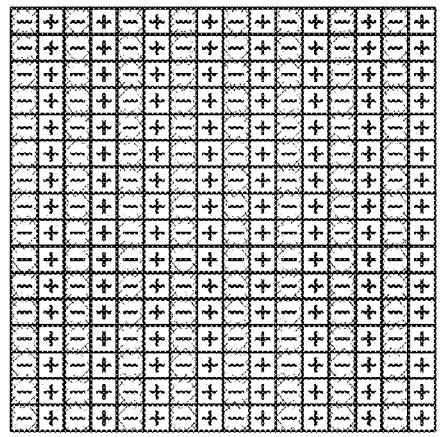
FIG. 11B1
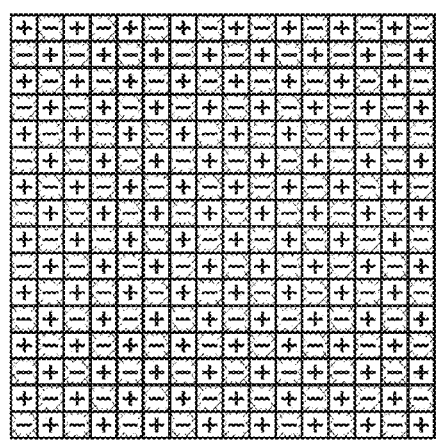
FIG. 11B2
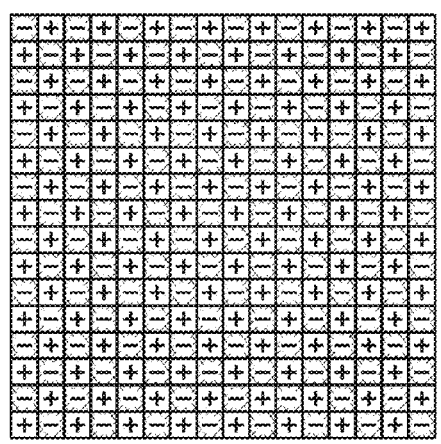
FIG. 11C
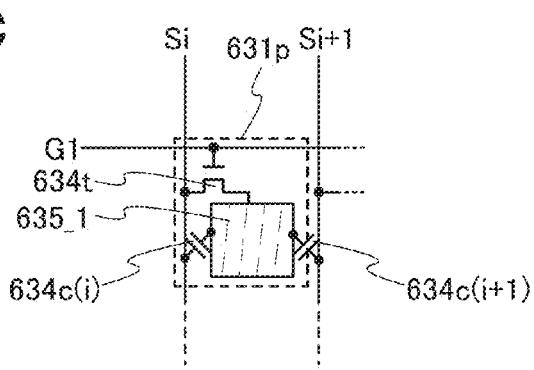

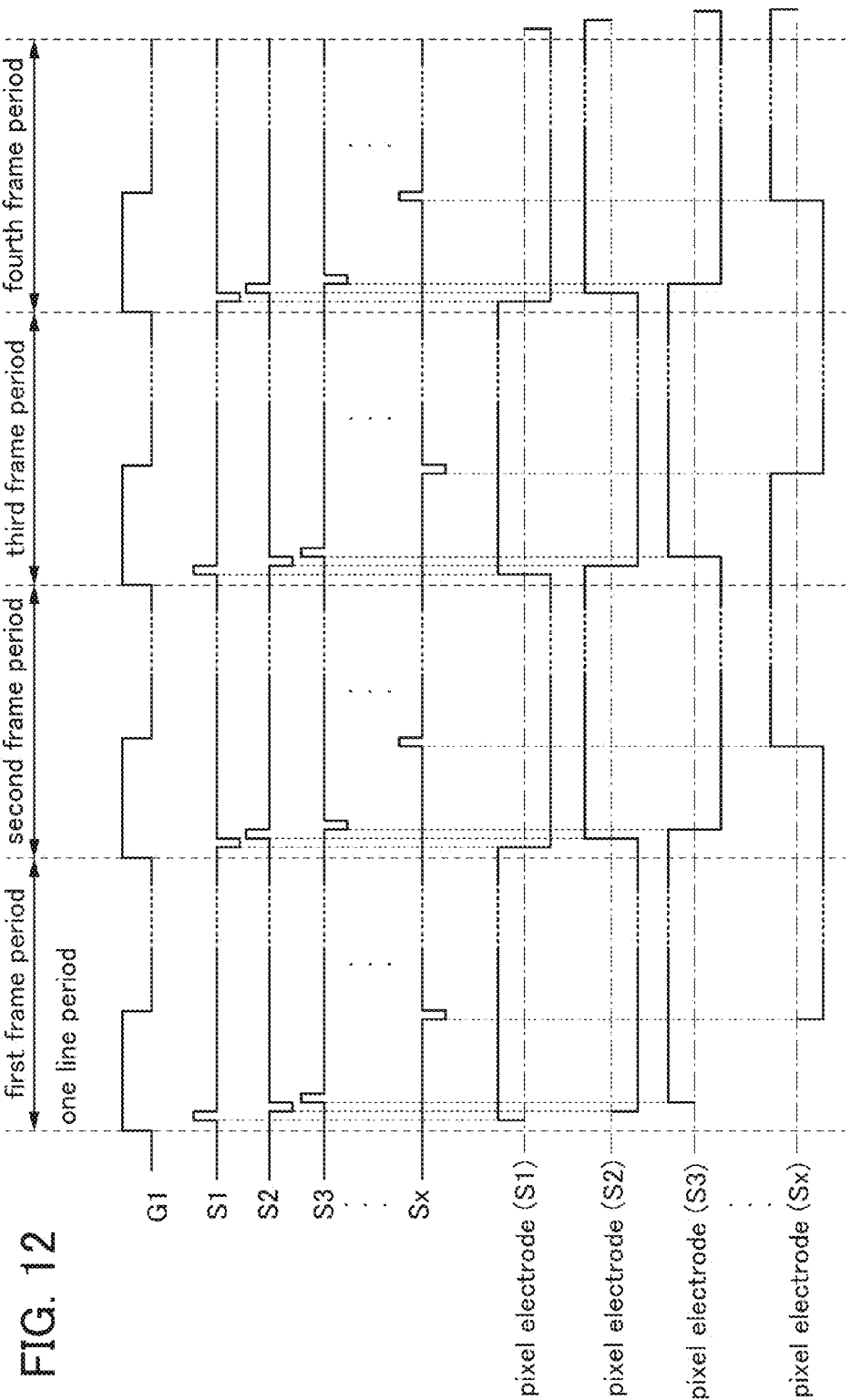

1400
1401 1402 1403

1410 1414 1412
1411
1415 1413

1420 1424
1421 1422
1423

LIQUID CRYSTAL DISPLAY DEVICE WHEREIN A DEVIATION IN GRAY LEVEL FOR DISPLAYING A STILL IMAGE IN ONE FRAME PERIOD IS LESS THAN OR EQUAL TO 1.2% OF A MAXIMUM GRAY LEVEL

TECHNICAL FIELD

The present invention relates to a liquid crystal display device.

Note that the liquid crystal display device refers to a device including a liquid crystal element. The liquid crystal display device includes a driver circuit for driving a plurality of pixels and the like. Furthermore, the liquid crystal display device includes a control circuit, a power supply circuit, a signal generation circuit, or the like provided over a different substrate.

BACKGROUND ART

Commoditization of liquid crystal display devices has progressed as a result of recent technological innovation. Higher value-added products are being required and have still been actively developed.

As added value of the liquid crystal display devices, a reduction in power consumption has attracted attention for the purpose of extending operation time of a mobile device or the like.

For example, Patent Document 1 discloses the structure of a display device whose power consumption is reduced by reducing the frequency of writing signals (also referred to as "refresh") for the same image in the case of continuously displaying the same image (still image).

The refresh operation needs to be performed such that a change of an image caused by the refresh operation is not distinguished by users. The frequency of refresh operations is referred to as a refresh rate.

REFERENCE

Patent Document

[Patent Document 1] Japanese Published Patent Application No. 2011-237760

DISCLOSURE OF INVENTION

For driving of a display device at a low refresh rate, it is need to prevent a change of a still image with time from being perceived by users.

However, a voltage corresponding to a signal written to a pixel changes with time. When the voltage applied to a pixel changes in excess of an acceptable range of a deviation in gray level for displaying the same still image, viewers perceive flickers in the image, which leads to a decrease in display quality.

In view of the above, an object of one embodiment of the present invention is to provide a novel liquid crystal display device without a decrease in display quality.

One embodiment of the present invention is a liquid crystal display device including a pixel for displaying a still image at a frame frequency of less than or equal to 1 Hz. In the liquid crystal display device, the pixel includes a liquid crystal layer having a dielectric constant anisotropy of greater than or equal to 2 and less than or equal to 5.

One embodiment of the present invention is a liquid crystal display device including a pixel for displaying a still image at a frame frequency of less than or equal to 1 Hz. In the liquid crystal display device, the pixel includes a transistor and a liquid crystal element including a liquid crystal layer, and the liquid crystal layer has a dielectric constant anisotropy of greater than or equal to 2 and less than or equal to 5.

In the liquid crystal display device of one embodiment of the present invention, it is preferable that the transistor include a semiconductor layer and the semiconductor layer include an oxide semiconductor.

In the liquid crystal display device of one embodiment of the present invention, it is preferable that the liquid crystal layer have a dielectric constant anisotropy of greater than or equal to 2.6 and less than or equal to 4.4.

In the liquid crystal display device of one embodiment of the present invention, it is preferable that the liquid crystal layer have a dielectric constant anisotropy of greater than or equal to 3 and less than or equal to 3.8.

In the liquid crystal display device of one embodiment of the present invention, it is preferable that the frame frequency be less than or equal to 0.2 Hz.

In one embodiment of the present invention, a change in voltage applied to a pixel can be kept within an acceptable range of a deviation in gray level for displaying the same still image. Thus, flickers due to a low refresh rate can be reduced, which leads to an increase in display quality.

BRIEF DESCRIPTION OF DRAWINGS

FIG. 9 illustrates a structure of the display portion of the liquid crystal display device having a display function of one embodiment of the present invention.

FIGS. 11A1, 11A2, 11B1, 11B2, and 11C illustrate source line inversion driving and dot inversion driving of a liquid crystal display device having a display function of one embodiment of the present invention.

FIG. 12 is a timing chart showing the source line inversion driving and the dot inversion driving of the liquid crystal display device having a display function of one embodiment of the present invention.

BEST MODE FOR CARRYING OUT THE INVENTION

Figure 1:
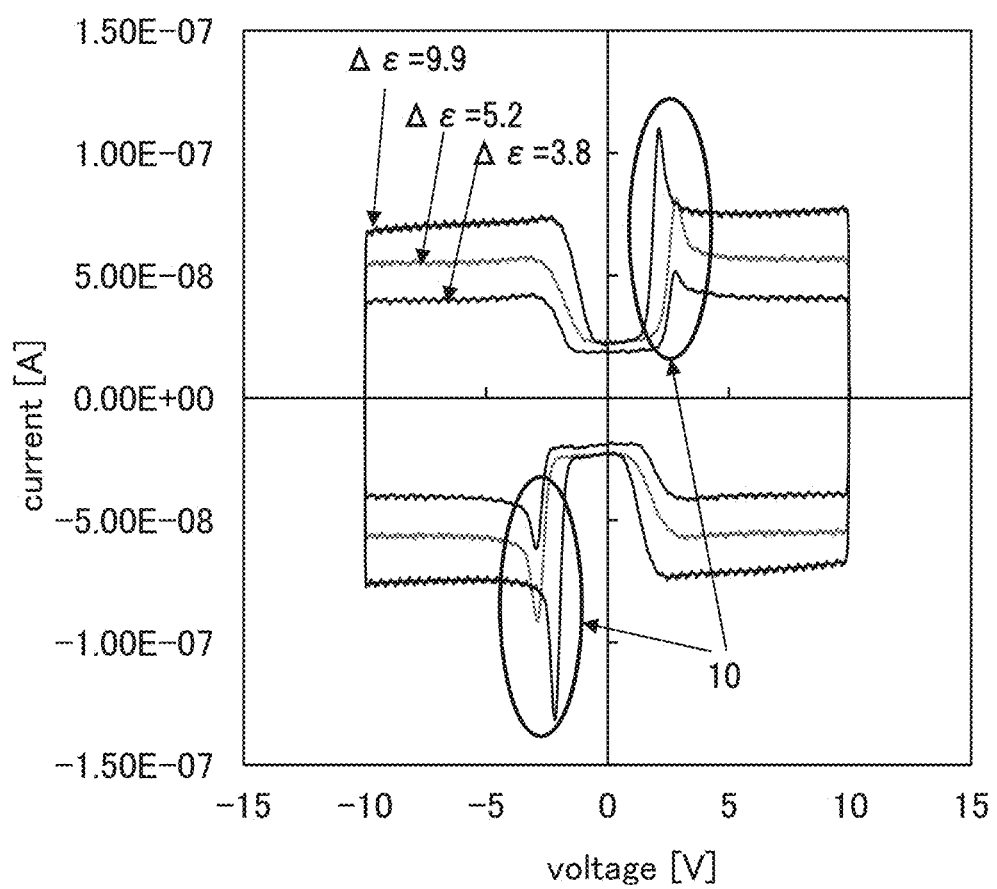
FIG. 1 is a graph showing the current-voltage characteristics of a liquid crystal layer.

Hereinafter, embodiments will be described with reference to drawings. Note that the embodiments can be implemented with various modes, and it will be readily appreciated by those skilled in the art that modes and details can be changed in various ways without departing from the spirit and scope of the present invention. Thus, the present invention should not be interpreted as being limited to the following description of the embodiments.

In the reference drawings, the size, the thickness of layers, and/or regions may be exaggerated for clarity in some cases. Therefore, embodiments of the present invention are not limited to such scales. Note that drawings are schematic views of ideal examples, and the embodiments of the present invention are not limited to the shape or the value illustrated in the drawings. For example, variation in signal, voltage, or current due to noise or difference in timing can be included.

Note that in this specification and the like, a transistor is an element having at least three terminals of a gate, a drain, and a source. In addition, the transistor has a channel region between a drain (a drain terminal, a drain region, or a drain electrode) and a source (a source terminal, a source region, or a source electrode), and current can flow through the drain, the channel region, and the source.

Here, since the source and the drain of the transistor change depending on the structure, operating conditions, and the like of the transistor, it is difficult to define which is a source or a drain. Thus, a portion which functions as the source and a portion which functions as the drain are not called a source and a drain and one of the source and the drain is referred to as a first electrode and the other thereof is referred to as a second electrode in some cases.

Note that in this specification, ordinal numbers such as "first", "second", and "third" are used in order to avoid confusion among components, and the terms do not limit the components numerically.

Note that in this specification, when it is described that "A and B are connected to each other", the case where A and B are electrically connected to each other is included in addition to the case where A and B are directly connected to each other. Here, the description "A and B are electrically connected to each other" means the following case: when an object having any electrical function exists between A and B, an electric signal can be transmitted and received between A and B.

Note that in this specification, terms for describing arrangement, such as "over" and "under", are used for convenience for describing a positional relation between components with reference to drawings. Further, a positional relation between components is changed as appropriate in accordance with a direction in which each component is described. Thus, there is no limitation to terms used in this specification, and description can be made appropriately depending on the situation.

Note that positional relations of circuit blocks in block diagrams are specified for description, and even in the case where different circuit blocks have different functions, they may be provided in an actual circuit or region so that different functions are achieved in the same circuit or region. In addition, functions of circuit blocks in block diagrams are specified for description, and even in the case where one circuit block is illustrated, blocks may be provided in an actual circuit or region so that processing performed by one circuit block is performed by a plurality of circuit blocks.

Note that a pixel corresponds to a display unit controlling the luminance of one color component (e.g., any one of R (red), G (green), and B (blue)). Therefore, in a color display device, the minimum display unit of a color image is composed of three pixels of an R pixel, a G pixel and a B pixel. Note that the color of the color elements is not necessarily of three varieties and may be of three or more varieties or may include a color other than RGB.

Hereinafter, embodiments and an example of the present invention will be described with reference to the accompanying drawings. The embodiments and the example will be described in the following order.

1. Embodiment 1 (a basic structure of one embodiment of the present invention)
2. Embodiment 2 (a structure of a liquid crystal display device)
3. Embodiment 3 (an example of a driving method)
4. Embodiment 4 (another example of a driving method)
5. Embodiment 5 (another example of a driving method)
6. Embodiment 6 (a structure of a panel module)
7. Embodiment 7 (a structure of a panel module having a touch panel function)
8. Embodiment 8 (a structure of a transistor)
9. Embodiment 9 (a structure of a semiconductor film)
10. Embodiment 10 (electronic devices)
11. Embodiment 11 (the significance of a reduction in refresh rate)
12. Example (a time-dependent change in transmittance of a panel)

(Embodiment 1)

In this embodiment, a basic structure of one embodiment of the present invention is described. The basic operation of one embodiment of the present invention can be explained using graphs and schematic diagrams of FIG. 1, FIGS. 2A to 2C, FIG. 3, FIGS. 4A and 4B, FIGS. 5A and 5B, and FIG. 6.

A liquid crystal display device of one embodiment of the present invention includes a pixel for displaying a still image at a frame frequency of 1 Hz or lower. A liquid crystal layer included in the pixel has a dielectric constant anisotropy (Δs) of greater than or equal to 2 and less than or equal to 5.

First, an effect brought by setting the dielectric constant anisotropy of the liquid crystal layer to greater than or equal to 2 and less than or equal to 5 is described. The graph in FIG. 1 shows voltage-current characteristics of a liquid crystal layer having a dielectric constant anisotropy of 3.8 as an example of the liquid crystal layer having a dielectric constant anisotropy of greater than or equal to 2 and less than or equal to 5. For comparison, the graph in FIG. 1 also shows voltage-current characteristics of a liquid crystal layer having a dielectric constant anisotropy of 5.2 and those of a liquid crystal layer having a dielectric constant anisotropy of 9.9 as examples of liquid crystal layers having a dielectric constant anisotropy in excess of 5.

Note that a TN mode liquid crystal (MLC7030 produced by Merck) is used as a liquid crystal material of the liquid crystal layer having a dielectric constant anisotropy of 3.8. A TN mode liquid crystal (MLC4792 produced by Merck) is used as a liquid crystal material of the liquid crystal layer having a dielectric constant anisotropy of 5.2. A TN mode liquid crystal (MLC3019 produced by Merck) is used as a liquid crystal material of the liquid crystal layer having a dielectric constant anisotropy of 9.9.

Note that the liquid crystal material of the liquid crystal layer having a dielectric constant anisotropy of 3.8 has a resistivity of $4.9 \times 10^{14}$ ($\Omega \cdot cm$). The liquid crystal material of the liquid crystal layer having a dielectric constant anisotropy of 5.2 has a resistivity of $8.1 \times 10^{13}$ ($\Omega \cdot cm$). The liquid crystal material of the liquid crystal layer having a dielectric constant anisotropy of 9.9 has a resistivity of $2.9 \times 10^{13}$ ($\Omega \cdot cm$).

FIG. 1 shows that when the dielectric constant anisotropy is 3.8, current changes rapidly (regions 10 in FIG. 1) with an increase in voltage and then comes into a steady state. Similarly, FIG. 1 shows that when the dielectric constant anisotropy is 5.2 or 9.9, current changes rapidly (the regions 10 in FIG. 1) with an increase in voltage and then comes into a steady state.

By comparing the lines with different dielectric constant anisotropies in FIG. 1, it is found that the degree of the abrupt change in current is larger in the liquid crystal layer having a larger dielectric constant anisotropy. This abrupt change in current results from the fact that the proportion of an impurity (e.g., an ionic impurity) included in the liquid crystal layer increases when a dielectric constant anisotropy is high, and thus the resistivity of the liquid crystal layer decreases.

Here, the dielectric constant anisotropy is described. The dielectric constant anisotropy is also called dielectric anisotropy. A high dielectric anisotropy is preferable for displaying moving images.

When the dielectric constant anisotropy of a liquid crystal layer is high, interaction with an electric field is strong and the operation speed of the liquid crystal layer is high; thus, a liquid crystal display device including a liquid crystal layer having a high dielectric constant anisotropy can operate at a high speed.

However, when the dielectric constant anisotropy of a liquid crystal layer exceeds 5, an influence of an impurity included in the liquid crystal layer becomes significant as described above. It is difficult to remove the impurity in the liquid crystal layer, especially in the liquid crystal layer having a dielectric constant anisotropy in excess of 5. The impurity that remains in the liquid crystal layer increases the conductivity of the liquid crystal layer, which makes it difficult to keep voltage which has been applied to a pixel when the refresh rate is low.

On the other hand, there is an idea that a low dielectric constant anisotropy is preferable.

When the dielectric constant anisotropy of a liquid crystal layer is low, the amount of an impurity in the liquid crystal layer can be reduced, so that the liquid crystal layer can have a low conductivity. For this reason, the liquid crystal layer having a low dielectric constant anisotropy has an advantage in that voltage applied into a pixel can be kept longer when the refresh rate is low.

However, when the dielectric constant anisotropy of a liquid crystal layer is less than 2, interaction with an electric field is small and the operation speed of the liquid crystal layer is low; thus, a high driving voltage is needed for high speed operation. For this reason, a dielectric constant anisotropy of less than 2 is not suitable for a liquid crystal layer of a liquid crystal display device whose refresh rate is reduced for the purpose of low power consumption. In particular, high driving voltage is not preferable because the total power consumption of the liquid crystal display device significantly increases when driving at a low refresh rate is changed to driving at a higher refresh rate for displaying moving images.

Therefore, in one mode of this embodiment, it is preferable that the dielectric constant anisotropy of a liquid crystal layer be greater than or equal to 2 and less than or equal to 5. The liquid crystal layer having a dielectric constant anisotropy of greater than or equal to 2 and less than or equal to 5 can reduce the proportion of the impurity included therein and does not increase power consumption when moving image display is performed; thus, driving voltage of the liquid crystal layer can be set in a preferable range.

Note that in the case where the dielectric constant anisotropy of a liquid crystal layer is greater than or equal to 2 and less than or equal to 5, the driving voltage of the liquid crystal layer is preferably set high within the range without an increase in power consumption. A high driving voltage of the liquid crystal layer broadens an acceptable range of a deviation in gray level. In other words, flickers can be reduced owing to a small deviation in gray level in accordance with a change in voltage because the driving voltage is high.

Although the liquid crystal layer having a dielectric constant anisotropy of greater than or equal to 2 and less than or equal to 5 is described above, it is more preferable (described in order of increasing preference) that the dielectric constant anisotropy be greater than or equal to 2.2 and less than or equal to 4.8; greater than or equal to 2.4 and less than or equal to 4.6; greater than or equal to 2.6 and less than or equal to 4.4; greater than or equal to 2.8 and less than or equal to 4.2; greater than or equal to 3 and less than or equal to 4; and greater than or equal to 3 and less than or equal to 3.8.

In this embodiment, a liquid crystal layer in a twisted nematic (TN) mode is described as an example, but other modes can be employed.

As an operation mode of the liquid crystal layer other than the TN mode, an IPS (in-plane-switching) mode, an FFS (fringe field switching) mode, an MVA (multi-domain vertical alignment) mode, a PVA (patterned vertical alignment) mode, an ASM (axially symmetric aligned micro-cell) mode, an OCB (optical compensated birefringence) mode, an FLC (ferroelectric liquid crystal) mode, an AFLC (antiferroelectric liquid crystal) mode, or the like can be used. Note that the structure of a pixel electrode in each pixel in the liquid crystal display device can be changed as appropriate in accordance with the display mode.

By setting the dielectric constant anisotropy of the liquid crystal layer to greater than or equal to 2 and less than or equal to 5, a deviation in gray level can be kept within the acceptable range for displaying the same still image, so that flickers can be reduced. As a result, display quality can be improved.

Note that the acceptable deviation in gray level for displaying the same still image is 0 or more and 3 or less when the image is displayed by controlling 256 levels of transmittance, for example. When the deviation in gray level for displaying the same still image is 0 or more and 3 or less, viewers hardly perceive flickers. As another example, when the image is displayed by controlling 1024 levels of transmittance, the acceptable range of a deviation in gray level is 0 or more and 12 or less. That is, the acceptable range of a deviation in gray level for displaying the same still image is preferably more than or equal to 1% and less than or equal to 1.2% of the maximum gray levels.

It is particularly preferable that the structure of the liquid crystal layer having a dielectric constant anisotropy of greater than or equal to 2 and less than or equal to 5, which is one embodiment of the present invention, be combined with a driving method by which moving image display and still image display are performed at different refresh rates. In a liquid crystal display device which operates at different refresh rates, when moving image display is changed to still image display, the frame frequency is changed from 60 Hz to less than or equal to 1 Hz, preferably from 60 Hz to less than or equal to 0.2 Hz, whereby the power consumption is reduced. That is, the structure of this embodiment is suitable as a structure in which the refresh rate is reduced at the time of still image display.

In the liquid crystal display device which performs display at different refresh rates, it is preferable to reduce power consumption and prevent a decrease in display quality at the time of moving image display and at the time of still image display. At the time of still image display, as the refresh rate is set lower, the time interval between applications of voltage to a pixel gets longer. In other words, when the refresh rate at the time of still image display is decreased, there is a certain period of time during which voltage is not applied to a pixel.

Accordingly, in the case of driving at a decreased refresh rate at the time of still image display, it is important to keep voltage applied to a pixel at a certain value. In addition, since the frame frequency is increased in the case of driving at an increased refresh rate at the time of moving image display, setting driving voltage low is important for reducing power consumption.

In one embodiment of the present invention, an impurity in the liquid crystal layer is reduced as compared with in a liquid crystal layer having a dielectric constant anisotropy in excess of 5. Accordingly, leakage current caused by impurity in the liquid crystal layer is small, so that voltage applied to a pixel can be kept when the refresh rate is low.

Furthermore, in the structure of one embodiment of the present invention, driving voltage can be set low as compared with in the case of a liquid crystal layer having a dielectric constant anisotropy of less than 2. In a liquid crystal display device which operates at a low driving voltage, an increase in power consumption, which is caused by an increase in frame frequency when still image display is changed to moving image display, can be suppressed.

In one embodiment of the present invention, since leakage current caused by an impurity in the liquid crystal layer can be small, flickers can be reduced without providing a large storage capacitor in a pixel in advance. Since the design for reducing flickers with a large storage capacitor is not necessary, a design with a small storage capacitor is possible, so that the pixel resolution can be increased. The high pixel resolution and a low refresh rate can reduce eye strain.

In the case where still image display is performed at a refresh rate of less than or equal to 1 Hz as in this embodiment, an eye-friendly liquid crystal display device can be achieved by satisfying the following requirements. The specific requirements are that when still image display is performed, images are displayed on a display portion in which light that is transmitted to the viewer side through the liquid crystal layer has a wavelength of longer than 420 nm, preferably longer than 440 nm, and the pixel resolution is greater than or equal to 150 ppi, preferably greater than or equal to 200 ppi.

Figure 25:
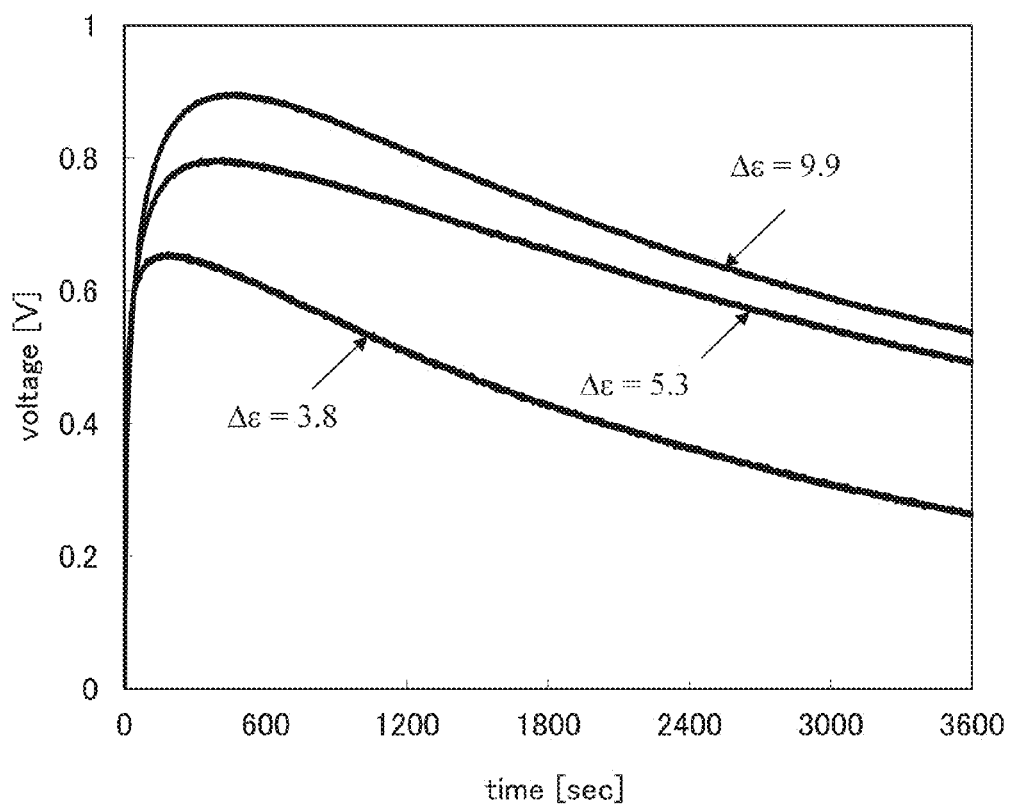
FIG. 25 is a graph showing changes in residual DC of liquid crystal layers having different dielectric constant anisotropies.

An influence on a time-dependent change in residual DC by setting the dielectric constant anisotropy of a liquid crystal layer to greater than or equal to 2 and less than or equal to 5 is described. The graph in FIG. 25 shows a time-dependent change in voltage in a state where a voltage of 5 V is applied between electrodes between which a liquid crystal layer is sandwiched for one hour, and the electrodes are short-circuited for one second, and then the electrodes are open-circuited. Note that the graph in FIG. 25 shows a time-dependent change in residual DC after the electrodes are open-circuited.

Note that the residual DC refers to voltage generated by electric charges remaining between the electrodes when voltage is applied to the liquid crystal layer. By the residual DC, an extra voltage is applied between the electrodes when a predetermined voltage is applied to the liquid crystal layer. In addition, even in a period of time when voltage is not applied to the liquid crystal layer, voltage remains between the electrodes due to electric charges which remain in the liquid crystal layer. Note that in the structure in which a liquid crystal material is sandwiched between electrodes and alignment films are provided on the electrodes, "between the electrodes" means between the alignment films.

The graph in FIG. 25 shows a result of a liquid crystal layer having a dielectric constant anisotropy of 3.8 as an example of a liquid crystal layer having a dielectric constant anisotropy of greater than or equal to 2 and less than or equal to 5. For comparison, the graph in FIG. 25 also shows results of liquid crystal layers having dielectric constant anisotropies of 5.2 and 9.9. Liquid crystal materials of the liquid crystal layers are the same as those in FIG. 1.

FIG. 25 shows that when the dielectric constant anisotropy is 3.8, voltage increases just after the electrodes are open-circuited, but the residual voltage due to an impurity in the liquid crystal layer decreases with time. On the other hand, when the dielectric constant anisotropy is 5.2 or 9.9, voltage greatly increases just after the electrodes are open-circuited, and the residual voltage due to an impurity in the liquid crystal layer remains, though it decreases with time.

By comparing the lines with different dielectric constant anisotropies in FIG. 25, it is found that the voltage just after the electrodes are open-circuited is higher in the liquid crystal layer having a larger dielectric constant anisotropy. A reason of the difference in voltage depending on the liquid crystal materials is that a large dielectric constant anisotropy increases the proportion of an impurity in the liquid crystal layer. Therefore, by employing the structure of one embodiment of the present invention with a dielectric constant anisotropy of greater than or equal to 2 and less than or equal to 5, in which the proportion of an impurity in the liquid crystal layer is low, an influence of the residual DC just after the electrodes are open-circuited can be reduced.

Figure 28:
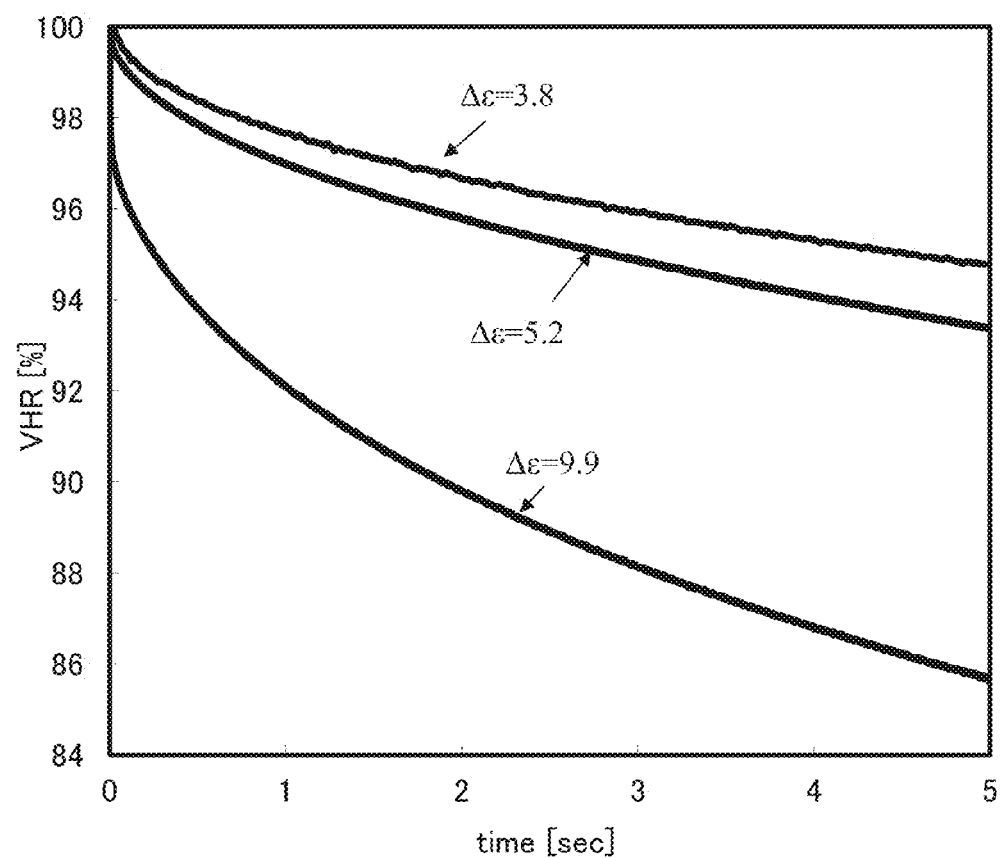
FIG. 28 is a graph showing changes in voltage holding ratio of liquid crystal layers having different dielectric constant anisotropies.

Next, FIG. 28 shows a time-dependent change in voltage holding ratio (VHIR) of each of the liquid crystal layers having different dielectric constant anisotropies (Δ∈=3.8, 5.2, 9.9) at 30° C. The graph in FIG. 28 shows the results obtained by measuring a change in voltage after voltage is applied to electrodes between which the liquid crystal layer is sandwiched and the electrodes are open-circuited. The results indicate that the voltage holding ratio increases with an increase of the resistivity. Even in a period of time when voltage is not applied to the liquid crystal layer, the voltage holding ratio is preferably high in order to reduce a deviation in gray level.

Next, using FIGS. 2A to 2C, FIG. 3, FIGS. 4A and 4B, FIGS. 5A and 5B, and FIG. 6, description is made on the structure in FIG. 1 in which a deviation in gray level in accordance with a change in voltage applied to a pixel can be kept within an acceptable range by employing the liquid crystal layer having a dielectric constant anisotropy of greater than or equal to 2 and less than or equal to 5.

Figure 2A:
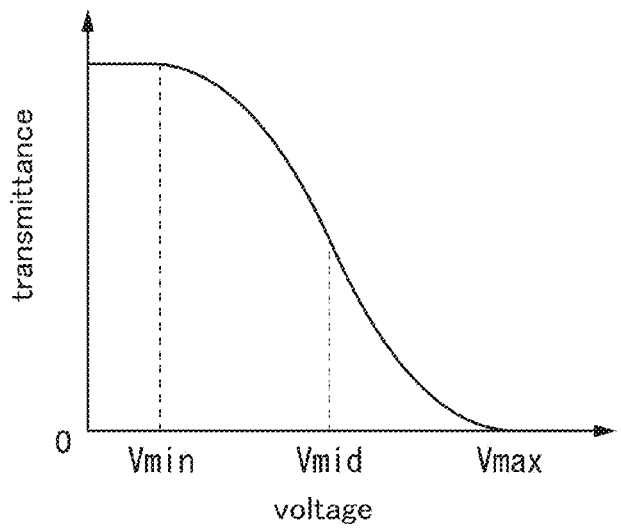
FIGS. 2A to 2C are graphs for showing the transmittance-voltage characteristics of a liquid crystal layer and schematic cross-sectional view of the liquid crystal layer.
Figure 2B:
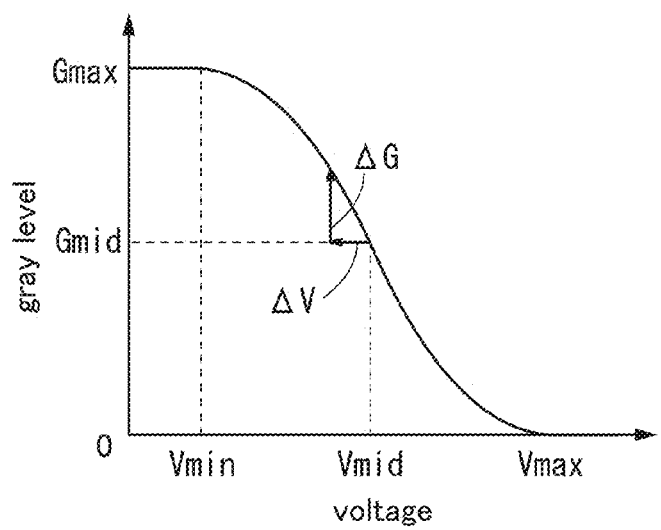
Figure 2C:
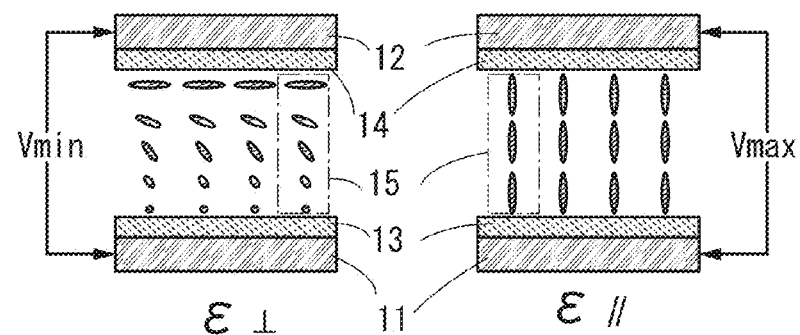

First, characteristics of a liquid crystal layer are described using FIGS. 2A to 2C for easy understanding of the following descriptions of specific examples of liquid crystal layers using FIG. 3, FIGS. 4A and 4B, FIGS. 5A and 5B, and FIG. 6.

FIG. 2A is a graph showing voltage-transmittance characteristics of a liquid crystal layer in the TN mode.

The graph in FIG. 2A shows a curve of a normally-white liquid crystal element. In a liquid crystal layer, orientations of liquid crystal molecules in the liquid crystal layer are changed by an electric field in accordance with voltage applied between electrodes between which the liquid crystal layer is sandwiched, whereby the transmittance of polarized light is controlled. In FIG. 2A, the voltage Vmax is voltage at which the transmittance of light through the liquid crystal layer becomes 0. The voltage Vmin is voltage at which the transmittance of light through the liquid crystal layer becomes the maximum value. The voltage Vmid is voltage at which the transmittance of light through the liquid crystal layer becomes a half value (50%).

The graph in FIG. 2B shows a relation of voltage applied to the liquid crystal layer and a gray level. In FIG. 2B, for example, in the case where a black image or a white image is displayed, the light transmittance is changed by application of the voltage Vmax or the voltage Vmin; thus, the image can be displayed by switching the gray level between 0 and Gmax.

In FIG. 2B, in the case where an image is displayed with multi gray levels for expressing a color shade, the voltages Vmax, Vmid, and Vmin are applied, so that the light transmittance is changed and the gray level is switched between Gmax, Gmid, and 0, whereby the image can be displayed. In order to increase the gray levels, a plurality of voltage levels is set between the voltage Vmax and the voltage Vmin. The light transmittance is changed in accordance with the voltage level, which is utilized for achieving a liquid crystal display device capable of displaying an image with a plurality of gray levels.

In that case, when a value of voltage applied to the liquid crystal layer is not changed, the light transmittance is also not changed; thus, a desired gray level can be obtained. On the other hand, a value of voltage applied to a liquid crystal layer in a pixel in an active-matrix liquid crystal display device is changed with time due to current flowing through the liquid crystal layer. Specifically, as a certain period of time passes and the value of voltage is changed by ΔV, the gray level is also changed by ΔG. When the value of voltage applied to a pixel is changed to a value outside the acceptable range of a deviation in gray level for displaying the same still image, flickers might be perceived by viewers, which means a decrease in display quality.

FIG. 2C is a cross-sectional schematic view of electrodes between which a liquid crystal layer is sandwiched. FIG. 2C illustrates an oriented state of the liquid crystal layer to which the voltage Vmin in FIG. 2A is applied (an initial orientation state) and an oriented state of the liquid crystal layer to which the voltage Vmax is applied (an saturated orientation state).

Note that the initial orientation state refers to a state of liquid crystal molecules to which voltage is not applied. The initial orientation state in the TN liquid crystal is a state where liquid crystal molecules are twisted by 90° between electrodes. The saturated orientation state refers to a state of liquid crystal molecules to which voltage is applied in which the liquid crystal molecules are tilted or rise and the orientations are hardly changed by application of a higher voltage.

In FIG. 2C, cross sections of a first electrode 11, a second electrode 12, an alignment film 13, an alignment film 14, and a liquid crystal molecules 15 are illustrated. Note that the first electrode 11 corresponds to a pixel electrode, and the second electrode 12 corresponds to a counter electrode.

A dielectric constant in the initial orientation state is represented by ∈⊥, and a dielectric constant in the saturated orientation state is represented by ∈//. A difference between the dielectric constant E1 in the initial orientation state and the dielectric constant ∈// in the saturated orientation state corresponds to the dielectric constant anisotropy (Δ∈) described above.

Figure 3:
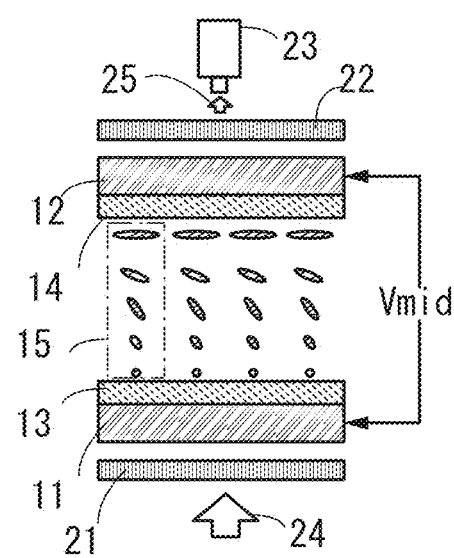
FIG. 3 is a schematic cross-sectional view of a liquid crystal layer for observing the transmittance of the liquid crystal layer.

FIG. 3 is a schematic view for observing a change in transmittance in the case where the voltage Vmid is applied between the electrodes illustrated in FIG. 2C between which the liquid crystal layer is sandwiched.

FIG. 3 illustrates an oriented state of the liquid crystal layer to which the voltage Vmid in FIG. 2A is applied (a middle orientation state). FIG. 3 illustrates a polarizing plate 21, a polarizing plate 22, and a light detector 23, in addition to the first electrode 11, the second electrode 12, the alignment film 13, the alignment film 14, and the liquid crystal molecules 15 illustrated in FIG. 2C. In FIG. 3, arrows represent light; an arrow 24 represents light that enters the liquid crystal layer and an arrow 25 represents light that is transmitted through the liquid crystal layer. Note that the light represented by the arrow 24 corresponds to backlight of the liquid crystal display device. Note that a liquid crystal element may refer to a structure including the first electrode 11, the second electrode 12, the alignment film 13, the alignment film 14, the liquid crystal molecules 15, the polarizing plate 21, and the polarizing plate 22 illustrated in FIG. 3.

The components illustrated in FIG. 3 are described in detail below. A 110-nm-thick indium tin oxide (ITO) film is formed as each of the first electrode 11 and the second electrode 12. A 70-nm-thick polyimide film (SE-7492 produced by Nissan Chemical Industries, Ltd.) is formed as each of the alignment film 13 and the alignment film 14. For the liquid crystal molecules 15, two kinds of TN mode liquid crystal materials (ZLI4792 and MLC7030 produced by Merck) having different dielectric constants are used. The cell gap between the alignment film 13 and the alignment film 14 is 4 μm. The gray levels, which are expressed by control of light transmittance by voltage application to the liquid crystal layer, for measurement are 256 levels.

Figure 4A:
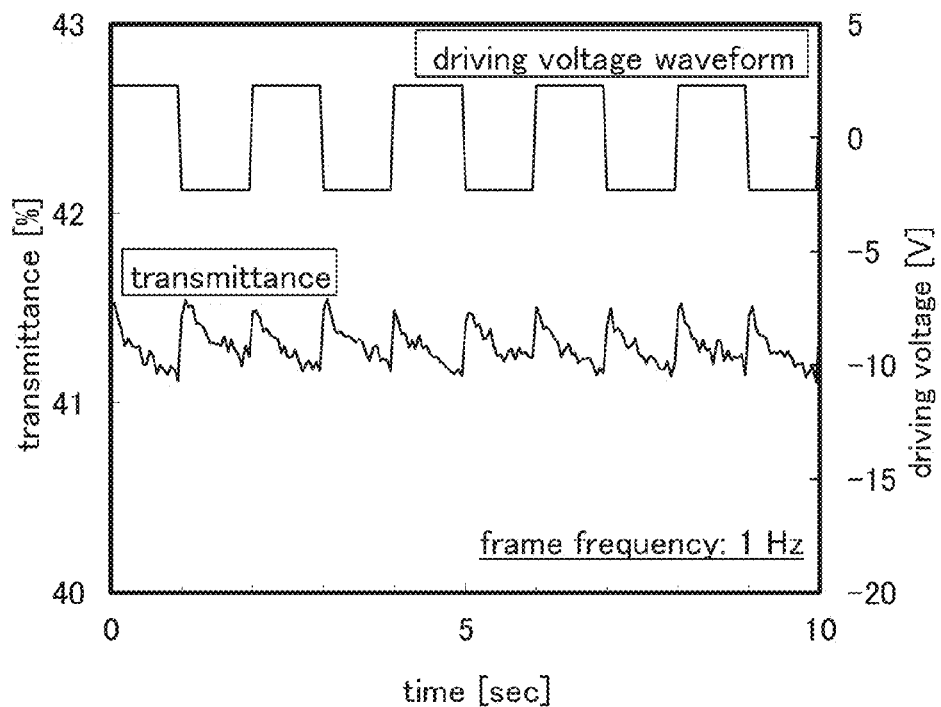
FIGS. 4A and 4B are graphs each showing a time-dependent change in transmittance of a liquid crystal layer (1 Hz).

FIG. 4A shows a time-dependent change in transmittance in the case where voltage is applied to a liquid crystal element including the TN mode liquid crystal layer having a dielectric constant anisotropy of 5.2 in FIG. 1. Voltage is applied to the first electrode 11 at a frame frequency of 1 Hz in a driving voltage waveform (a square wave on the upper side in FIG. 4A). A voltage of 0 V is applied to the second electrode 12.

FIG. 4A shows a time-dependent change in transmittance (a sawtooth waveform on the lower side in FIG. 4A) in the case where a voltage of +2.5 V and a voltage of −2.5 V which correspond to the voltage Vmid are alternately applied to the liquid crystal layer.

Figure 4B:
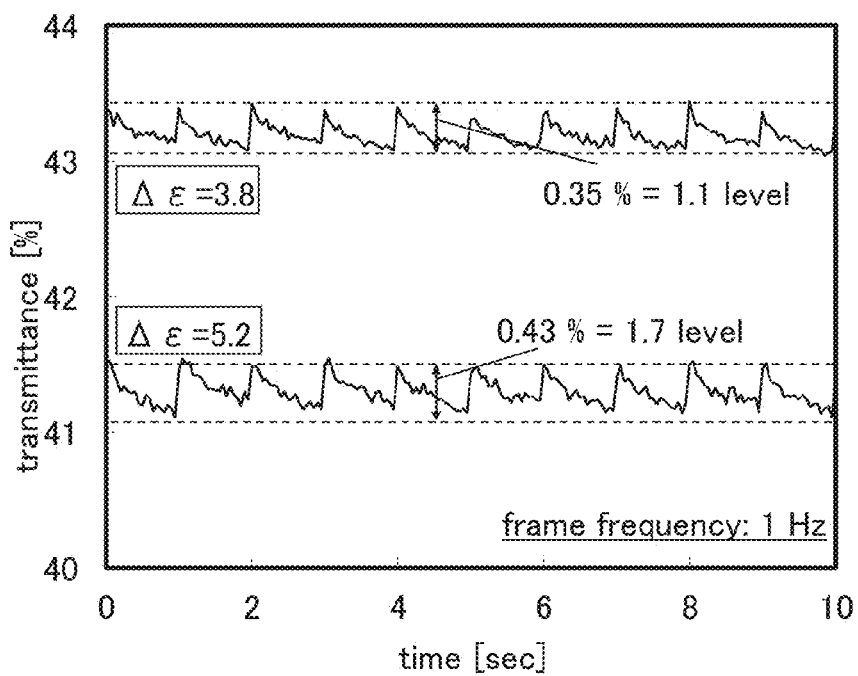

FIG. 4B shows a time-dependent change in transmittance (a sawtooth waveform on the upper side in FIG. 4B) in the case where voltage is applied to a liquid crystal element including the TN mode liquid crystal layer having a dielectric constant anisotropy of 3.8 which can be obtained in a manner similar to that in FIG. 4A. FIG. 4B also shows a time-dependent change in transmittance (a sawtooth waveform on the lower side in FIG. 4B) in the case where voltage is applied to a liquid crystal element including the TN mode liquid crystal layer having a dielectric constant anisotropy of 5.2 which can be obtained in a manner similar to that in FIG. 4A.

It is estimated that in the liquid crystal element including the TN mode liquid crystal layer having a dielectric constant anisotropy of 3.8, the maximum deviation in gray level is 1.1 levels (transmittance: 0.35%); while in the liquid crystal element including the TN mode liquid crystal layer having a dielectric constant anisotropy of 5.2, the maximum deviation in gray level is 1.7 levels (transmittance: 0.43%).

The sawtooth waveform in FIG. 4B reflects the above-described residual DC due to an impurity in the liquid crystal layer described above. Therefore, in the structure of one embodiment of the present invention with a dielectric constant anisotropy of greater than or equal to 2 and less than or equal to 5, in which the proportion of an impurity in the liquid crystal layer is low, the change in transmittance caused by the residual DC can be reduced.

That is, a deviation in gray level can be reduced in the case of a dielectric constant anisotropy of 3.8, which is within the dielectric constant anisotropy range of one embodiment of the present invention.

Figure 5A:
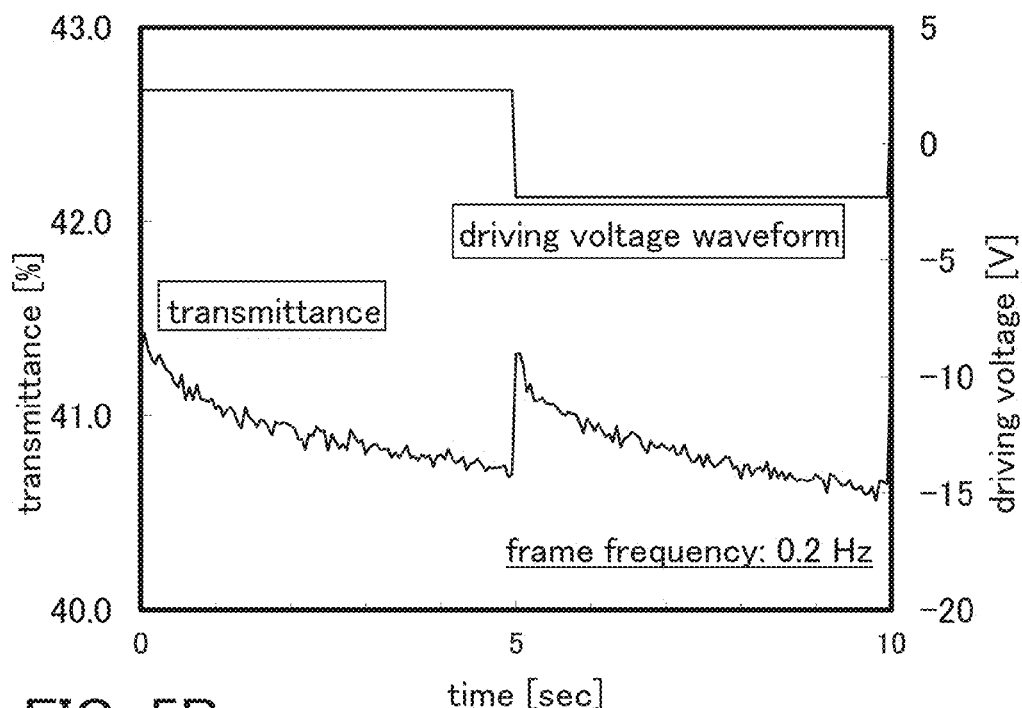
FIGS. 5A and 5B are graphs each showing a time-dependent change in transmittance of a liquid crystal layer (0.2 Hz).

As another example, FIG. 5A shows a time-dependent change in transmittance in the case where voltage is applied to a liquid crystal element including the TN mode liquid crystal layer having a dielectric constant anisotropy of 5.2 in FIG. 1. Voltage is applied to the first electrode 11 at a frame frequency of 0.2 Hz in a driving voltage waveform (a square wave on the upper side in FIG. 5A). A voltage of 0 V is applied to the second electrode 12. FIG. 5A shows a time-dependent change in transmittance (a sawtooth waveform on the lower side in FIG. 5A) in the case where a voltage of +2.5 V and a voltage of −2.5 V which correspond to the voltage Vmid are alternately applied to the liquid crystal layer.

Figure 5B:
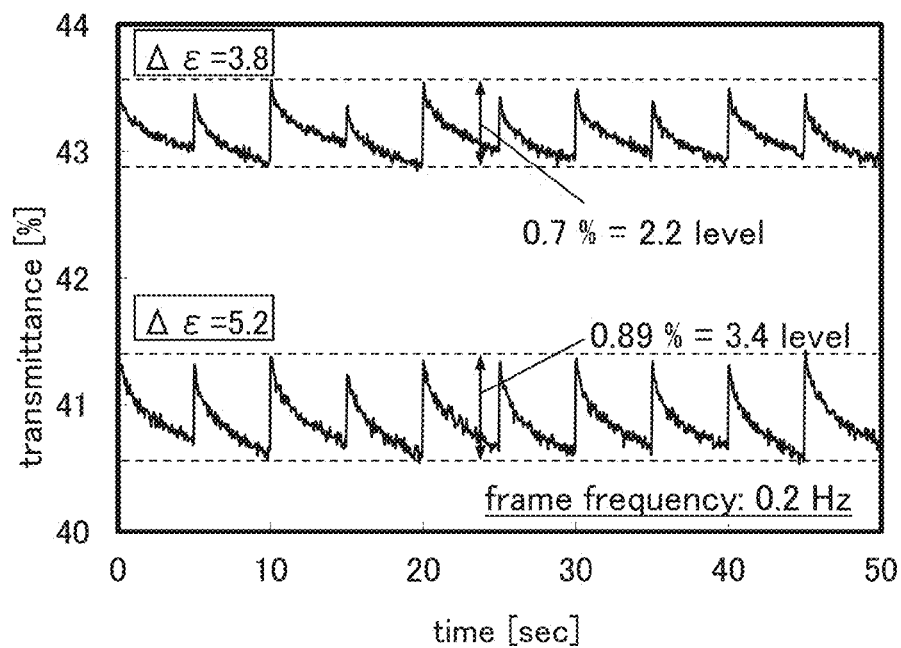

FIG. 5B shows a time-dependent change in transmittance (a sawtooth waveform on the upper side in FIG. 5B) in the case where voltage is applied to a liquid crystal element including the TN mode liquid crystal layer having a dielectric constant anisotropy of 3.8 which can be obtained in a manner similar to that in FIG. 5A. FIG. 5B also shows a time-dependent change in transmittance (a sawtooth waveform on the lower side in FIG. 5B) in the case where voltage is applied to a liquid crystal element including the TN mode liquid crystal layer having a dielectric constant anisotropy of 5.2 which can be obtained in a manner similar to that in FIG. 5A.

It is estimated that in the liquid crystal element including the TN mode liquid crystal layer having a dielectric constant anisotropy of 3.8, the maximum deviation in gray level is 2.2 levels (transmittance: 0.7%); while in the liquid crystal element including the TN mode liquid crystal layer having a dielectric constant anisotropy of 5.2, the maximum deviation in gray level is 3.4 levels (transmittance: 0.89%).

The sawtooth waveform in FIG. 5B reflects the above-described residual DC due to an impurity in the liquid crystal layer described above. Therefore, similarly in FIG. 4B, in the structure of one embodiment of the present invention with a dielectric constant anisotropy of greater than or equal to 2 and less than or equal to 5, in which the proportion of an impurity in the liquid crystal layer is low, the change in transmittance caused by the residual DC can be reduced.

That is, a deviation in gray level can be reduced in the case of a dielectric constant anisotropy of 3.8, which is within the dielectric constant anisotropy range of one embodiment of the present invention. Since a deviation in gray level in excess of 3 is perceived as flickers by viewers as described above, a desired effect cannot be obtained when the dielectric constant anisotropy is outside the acceptable range of one embodiment of the present invention, which is from 2 to 5.

Although the case of a frame frequency of 1 Hz and the case of a frame frequency of 0.2 Hz are described as examples with reference to FIGS. 4A and 4B and FIGS. 5A and 5B, respectively, the frequency is not limited thereto. The frame frequency can be set as appropriate depending on a liquid crystal mode and/or a material of the liquid crystal layer.

Figure 6:
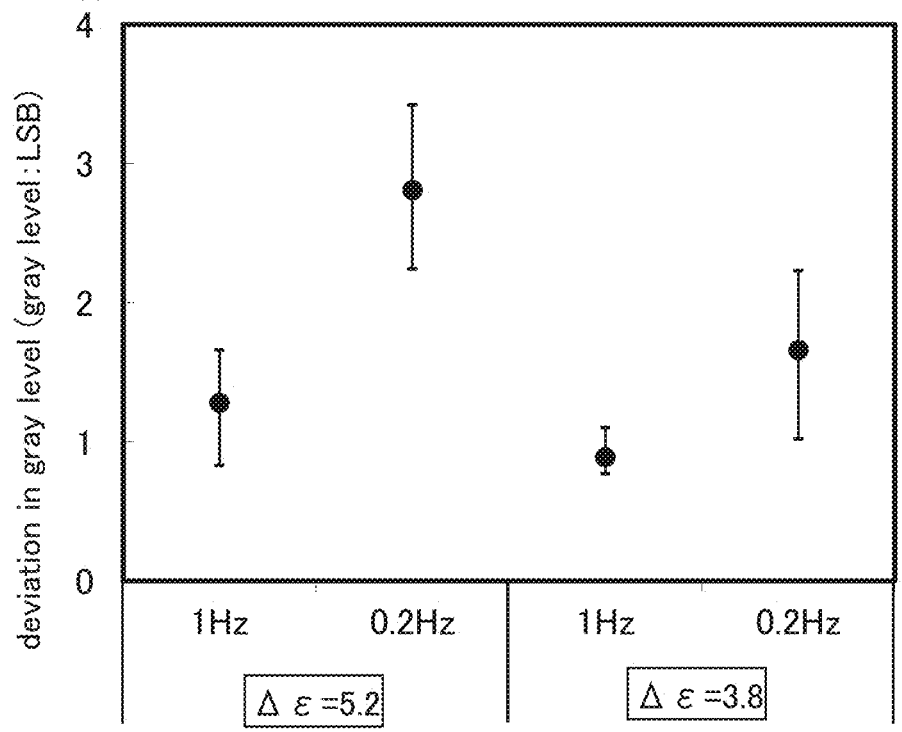
FIG. 6 is a graph showing the amount of a deviation in gray level of liquid crystal layers having different dielectric constant anisotropies.

FIG. 6 shows the frame frequencies, the dielectric constant anisotropies, and the deviations in gray level described using FIGS. 4A and 4B and FIGS. 5A and 5B all together. As seen from FIG. 6, when the dielectric constant anisotropy is 3.8, the deviation in gray level can be less than or equal to 3. On the other hand, when the dielectric constant anisotropy is 5.2, the deviation in gray level at a frame frequency of 1 Hz can be less than or equal to 3, but the deviation in gray level at a frame frequency of 0.2 Hz exceeds 3.

As shown in FIG. 6, by setting the dielectric constant anisotropy of one embodiment of the present invention to greater than or equal to 2 and less than or equal to 5, a deviation in gray level caused by a change in voltage applied to a pixel can be less than or equal to 3. Thus, flickers due to a low refresh rate can be reduced, which leads to an increase in display quality.

Furthermore, accumulation of electric charges which is caused by a difference in electric characteristics between the alignment film and the liquid crystal layer might contribute to the deviation in gray level caused by a change in voltage applied to a pixel. A leakage current flows through the alignment film and the liquid crystal layer. Accordingly, the current density of a leakage current flowing through the alignment film has the same value as the current density of a leakage current flowing through the liquid crystal layer. However, there is a difference in relaxation time τ that is proportional to the product of the dielectric constant ∈ and the resistivity ρ, between the alignment film and the liquid crystal layer. Consequently, when a leakage current flows through the liquid crystal layer, electric charges are accumulated at around an interface between the alignment film and the liquid crystal layer, so that a residual DC is generated at around the interface.

When Formula 1 derived from Maxwell-Wagner theory about multilayer dielectric is satisfied, electric charges accumulated at the interface between the alignment film and the liquid crystal layer can be reduced, so that the residual DC can be reduced. Note that in Formula 1, $\epsilon_{LC}$ represents a dielectric constant of the liquid crystal layer, $\rho_{LC}$ represents a resistivity of the liquid crystal layer, $\epsilon_{AL}$ represents a dielectric constant of the alignment film, and $\rho_{AL}$ represents a resistivity of the alignment film.

[FORMULA 1]

$$\epsilon_{LC} \cdot \rho_{LC} = \epsilon_{AL} \cdot \rho_{AL} \qquad (1)$$

To obtain a relation close to the relation in Formula 1, it is preferable that the resistivity of the liquid crystal layer and the resistivity of the alignment film be close to each other as much as possible. Since the alignment film has higher resistivity than the liquid crystal layer, to make the resistivities of the liquid crystal layer and the alignment film close to each other, it is necessary to increase the resistivity of the liquid crystal layer or decrease the resistivity of the alignment film. As described above, it is preferable to increase the resistivity of the liquid crystal layer.

Figure 29:
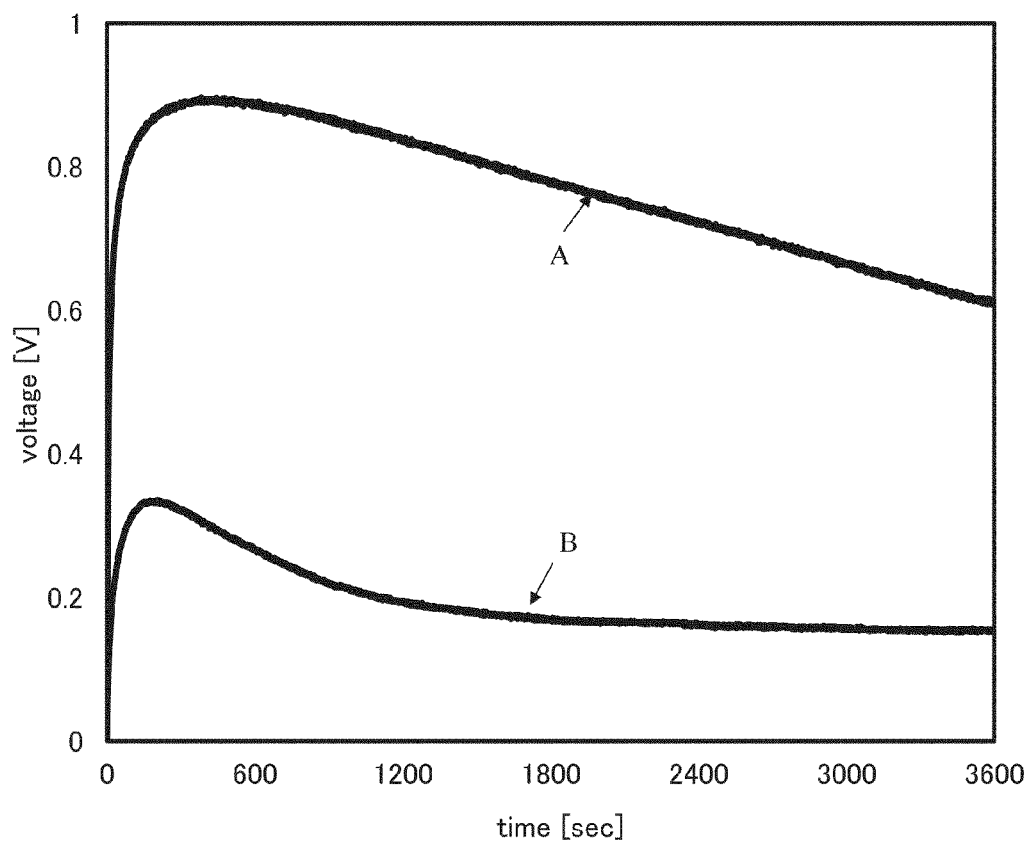
FIG. 29 is a graph showing changes in residual DC of liquid crystal elements with different alignment films.

Specifically, a TN mode liquid crystal layer having a dielectric constant anisotropy of 3.8 was used as the liquid crystal layer having a dielectric constant anisotropy of greater than or equal to 2 and less than or equal to 5 and alignment films having different physical property values were used, and a difference in residual DC was measured. FIG. 29 shows the measurement results. FIG. 29 is a graph where an alignment film A denotes an alignment film having a resistivity of $4 \times 10^{15}$ (Ω·cm), an alignment film B denotes an alignment film having a resistivity of $2 \times 10^{14}$ (Ω·cm), the horizontal axis denotes time, and the vertical axis denotes a voltage value due to the residual DC.

Figure 30:
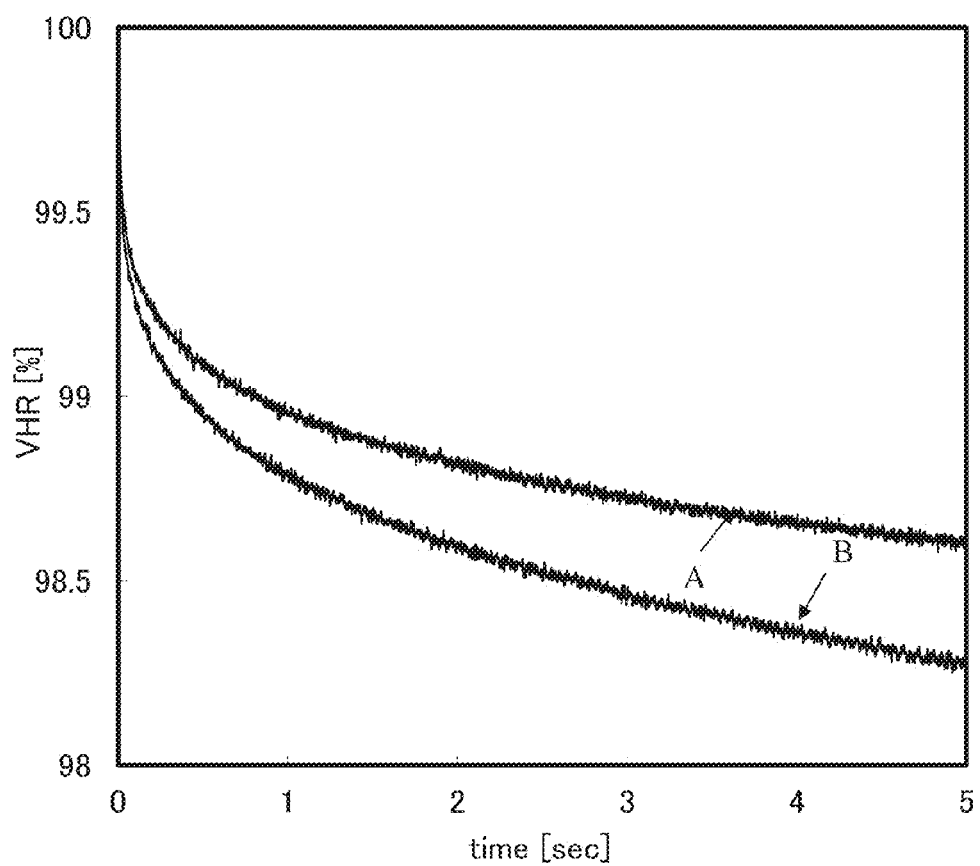
FIG. 30 is a graph showing changes in voltage holding ratio of the liquid crystal elements with different alignment films.

FIG. 30 shows a change in voltage holding ratio of TN mode liquid crystal display devices having a dielectric constant anisotropy of 3.8, one of which includes the alignment film A and the other of which includes the alignment film B.

FIG. 29 indicates that the residual DC can be reduced by decreasing the resistivity of the alignment film. However, FIG. 30 indicates that the leakage current is increased and the voltage holding ratio is decreased by reducing the resistivities of the liquid crystal layer and the alignment film.

In the case of driving at a low refresh rate as in the structure of this embodiment, it is preferable to increase the resistivities of the alignment film and the liquid crystal layer to be close to each other.

In view of the above results, it is preferable to satisfy the following conditions: using a liquid crystal layer having a dielectric constant anisotropy of greater than or equal to 2 and less than or equal to 5; using a material having a high voltage holding ratio for the liquid crystal layer; and reducing the residual DC by increasing the resistivities of the alignment film and the liquid crystal layer to be close to each other.

(Embodiment 2)

In this embodiment, an example of a liquid crystal display device including the liquid crystal layer described in Embodiment 1 is described with reference to FIG. 7 and FIGS. 8A and 8B.

Specifically, a liquid crystal display device which has a first mode in which a G signal is output at a frequency of 60 Hz or higher and a second mode in which the G signal is output at a frequency of 1 Hz or lower, preferably 0.2 Hz or lower is described. The G signal selects a pixel.

Figure 7:
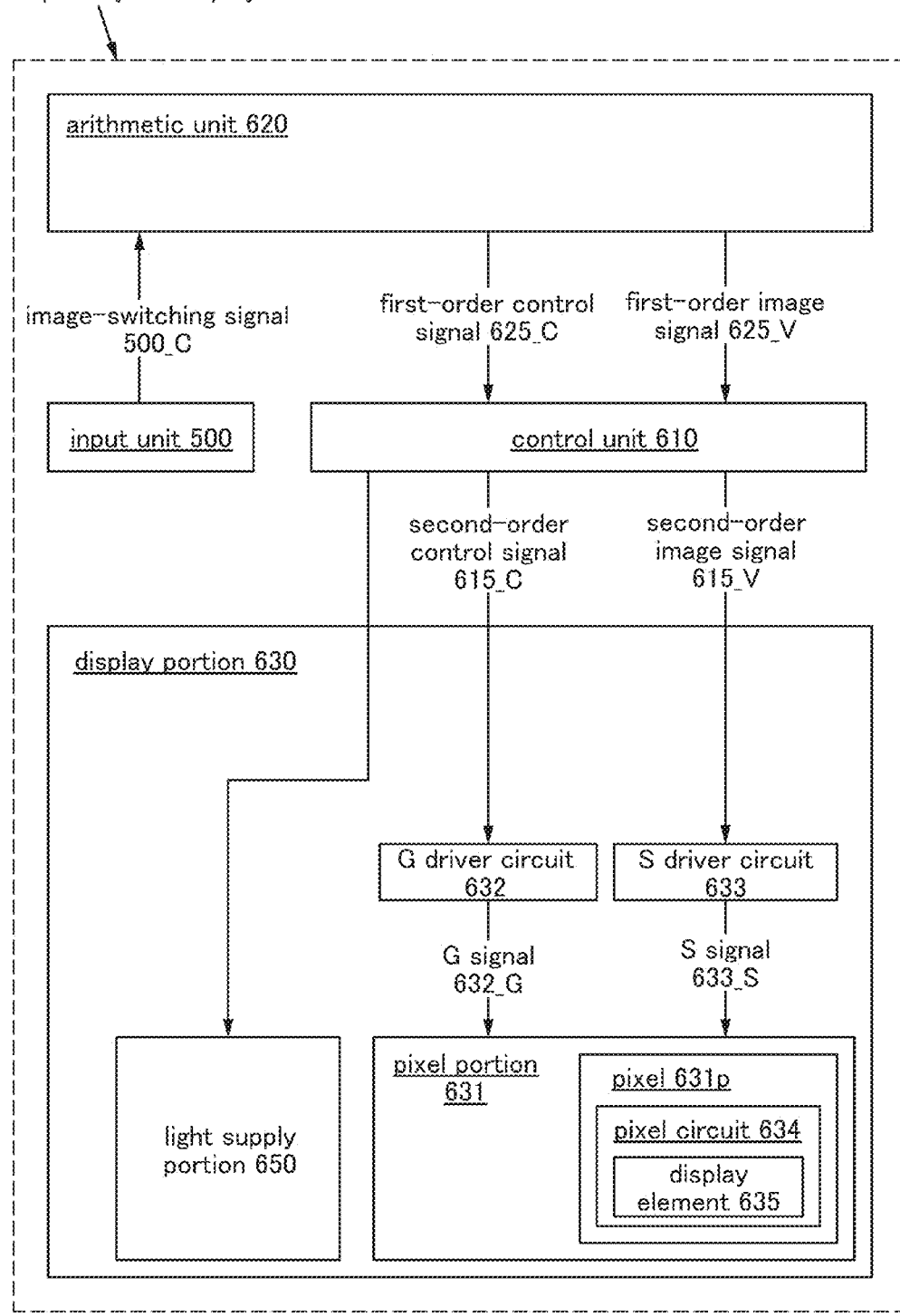
FIG. 7 is a block diagram illustrating a structure of a liquid crystal display device having a display function of one embodiment of the present invention.

FIG. 7 is a block diagram of a structure of a liquid crystal display device having a display function of one embodiment of the present invention.

Figure 8A:
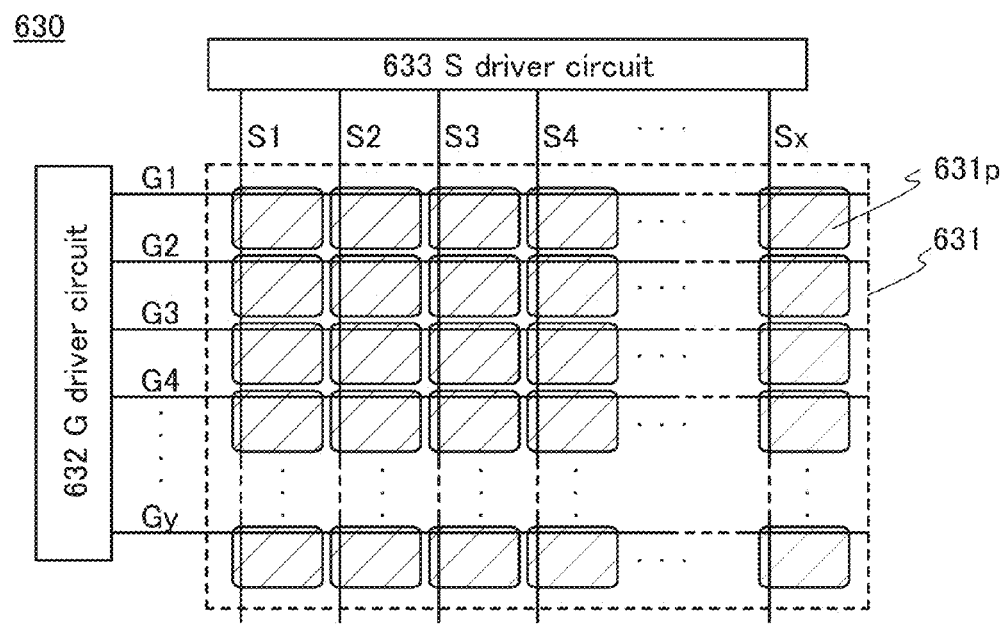
FIGS. 8A and 8B illustrate a structure of a display portion of a liquid crystal display device having a display function of one embodiment of the present invention.
Figure 8B:
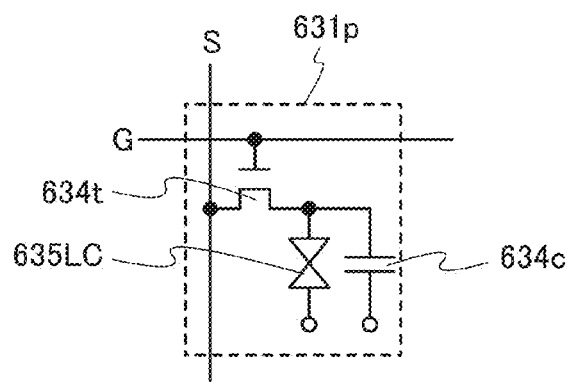

FIGS. 8A and 8B are a block diagram and a circuit diagram of a structure of a display portion in the liquid crystal display device having a display function of one embodiment of the present invention.

<1. Structure of Liquid Crystal Display Device>

A liquid crystal display device 600 having a display function, which is described as an example in this embodiment and illustrated in FIG. 7, includes a pixel portion 631 including pixel circuits 634; the pixel circuits 634 which hold first driving signals (also referred to as S signals) 633_S input and include display elements 635; the display elements 635 display an image on the pixel portion 631 in accordance with the S signals 633_S; a first driver circuit (also referred to as S driver circuit) 633 which outputs the S signals 633_S to the pixel circuits 634; and a second driver circuit (also referred to as G driver circuit) 632 which outputs second driving signals (also referred to as G signals) 632_G for selecting the pixel circuits 634 to the pixel circuits 634.

The G driver circuit 632 has a first mode in which a G signal 632_G is output to a pixel at a frequency of 30 or more times per second, preferably a frequency of 60 or more times and less than 960 times per second and a second mode in which the G signal 632_G is output to a pixel at a frequency of one or more times per day and less than 0.1 time per second, preferably a frequency of one or more times per hour and less than once per second.

Note that in the G driver circuit 632, the first mode and the second mode are switched in accordance with a mode-switching signal.

The pixel circuit 634 is provided in a pixel 631p. A plurality of pixels 631p is provided in the pixel portion 631 in a display portion 630.

The liquid crystal display device 600 having a display function includes an arithmetic unit 620. The arithmetic unit 620 outputs a first-order control signal 625_C and a first-order image signal 625_V.

The liquid crystal display device 600 includes a control unit 610. The control unit 610 controls the S driver circuit 633 and the G driver circuit 632.

In the case where a liquid crystal element is used as the display element 635, a light supply portion 650 is provided in the display portion 630. The light supply portion 650 supplies light to the pixel portion 631 including the liquid crystal element, and functions as a backlight.

In the liquid crystal display device 600 having a display function, the frequency for selecting one from a plurality of pixel circuits 634 in the pixel portion 631 can be changed by the G signal 632_G output from the G driver circuit 632. As a result, the liquid crystal display device 600 can have a display function which gives less eye strain to users.

Elements included in the liquid crystal display device having a display function of one embodiment of the present invention are described below.

<2. Arithmetic Unit>

The arithmetic unit 620 generates the first-order image signal 625_V and the first-order control signal 625_C.

The first-order control signal 625_C generated by the arithmetic unit 620 includes the mode-switching signal.

For example, the arithmetic unit 620 may output the first-order control signal 625_C including the mode-switching signal in accordance with an image-switching signal 500_C output from an input unit 500.

When the image-switching signal 500_C is input to the G driver circuit 632 in the second mode from the input unit 500 through the control unit 610, the G driver circuit 632 switches its mode from the second mode to the first mode, and outputs a G signal at least once, and then switches its modes to the second mode.

For example, when the input unit 500 senses a page turning operation, the input unit 500 outputs the image-switching signal 500_C to the arithmetic unit 620.

The arithmetic unit 620 generates the first-order image signal 625_V including the page turning operation signal and outputs the first-order image signal 625_V together with the first-order control signal 625_C including the image-switching signal 500_C.

The control unit 610 outputs the image-switching signal 500_C to the G driver circuit 632 and outputs the second-order image signal 615_V including the page turning operation signal to the S driver circuit 633.

The G driver circuit 632 switches its modes from the second mode to the first mode, and outputs the G signal 632_G at a rate at which viewers cannot perceive a change in image by signal rewriting operation.

Meanwhile, the S driver circuit 633 outputs to the pixel circuits 634 the S signals 633_S generated from the second-order image signal 615_V including the page turning operation signal.

The second-order image signal 615_V including the page turning operation signal is applied to the pixel 631p; thus, the pixel 631p can display many frame images including the page turning operation for a short time, resulting in smooth page turning operation.

The arithmetic unit 620 may be configured to determine whether the first-order image signal 625_V output from the arithmetic unit 620 to the display portion 630 is an moving image or a still image, and output a signal for selecting the first mode when the first-order image signal 625_V is a moving image and output a signal for selecting the second mode when the first-order image signal 625_V is a still image.

Whether the first-order image signal 625_V is a moving image or a still image can be determined in accordance with a difference in signal between one frame in the first-order image signal 625_V and the previous or next frame. When the difference is larger than a predetermined value, the signal is a moving image; when the difference is less than or equal to the predetermined value, the signal is a still image.

Alternatively, a structure can be employed in which when the second mode is switched to the first mode, the G signal 632_G is output a predetermined number of times which is larger than or equal to one, and then the first mode is switched to the second mode.

<3. Control Unit>

The control unit 610 outputs the second-order image signal 615_V generated from the first-order image signal 625_V (see FIG. 7). Note that the control unit 610 may be configured to output the first-order image signal 625_V directly to the display portion 630.

The control unit 610 has a function of generating a second-order control signal 615_C (e.g., a start pulse signal SP, a latch signal LP, or a pulse width control signal PWC) from the first-order control signal 625_C including a synchronization signal (e.g., a vertical synchronization signal or a horizontal synchronization signal) and supplying the generated signal to the display portion 630. Note that the second-order control signal 615_C includes a clock signal CK or the like.

The control unit 610 may be provided with an inversion control circuit to have a function of inverting the polarity of the second-order image signal 615_V at a timing notified by the inversion control circuit. Specifically, the inversion of the polarity of the second-order image signal 615_V may be performed in the control unit 610 or in the display portion 630 in accordance with an instruction by the control unit 610.

The inversion control circuit has a function of determining timing of inverting the polarity of the second-order image signal 615_V by using a synchronization signal. For example, the inversion control circuit includes a counter and a signal generation circuit.

The counter has a function of counting the number of frame periods by using the pulse of a horizontal synchronization signal.

The signal generation circuit has a function of notifying timing of inverting the polarity of the second-order image signal 615_V to the control unit 610 so that the polarity of the second-order image signal 615_V is inverted every plural consecutive frame periods by using information on the number of frame periods that is obtained in the counter.

<4. Display Portion>

The display portion 630 includes the pixel portion 631 including a display element 635 in each pixel and driver circuits such as the S driver circuit 633 and the G driver circuit 632. The pixel portion 631 includes a plurality of pixels 631p each provided with the display element 635 (see FIG. 7).

The second-order image signal 615_V that are input to the display portion 630 are supplied to the S driver circuit 633. In addition, power supply potentials and the second-order control signal 615_C are supplied to the S driver circuit 633 and the G driver circuit 632.

Note that the second-order control signals 615_C include an S driver circuit start pulse signal SP and an S driver circuit clock signal CK that control the operation of the S driver circuit 633; a latch signal LP; a G driver circuit start pulse SP and a G driver circuit clock signal CK that control the operation of the G driver circuit 632; a pulse width control signal PWC; and the like.

FIG. 8A illustrates an example of a structure of the display portion 630.

In the display portion 630 in FIG. 8A, the plurality of pixels 631p, a plurality of scan lines G for selecting the pixels 631p row by row, and a plurality of signal lines S for supplying the S signals 633_S generated from the second-order image signal 615_V to the selected pixels 631p are provided in the pixel portion 631.

The input of the G signals 632_G to the scan lines G is controlled by the G driver circuit 632. The input of the S signals 633_S to the signal lines S is controlled by the S driver circuit 633. Each of the plurality of pixels 631p is connected to at least one of the scan lines G and at least one of the signal lines S.

Note that the kinds and number of the wirings in the pixel portion 631 can be determined by the structure, number, and position of the pixels 631p. Specifically, in the pixel portion 631 illustrated in FIG. 8A, the pixels 631p are arranged in a matrix of x columns and y rows, and the signal lines S1 to Sx and the scan lines G1 to Gy are provided in the pixel portion 631.

<4-1. Pixel>

Each pixel 631p includes the display element 635 and the pixel circuit 634 including the display element 635.

<4-2. Pixel Circuit>

In this embodiment, FIG. 8B illustrates an example of a structure of the pixel circuit 634 in which a liquid crystal element 635LC is used as the display element 635.

The pixel circuit 634 includes a transistor 634t for controlling supply of the S signal 633_S to the liquid crystal element 635LC. An example of connection relation between the transistor 634t and the display element 635 is described.

A gate of the transistor 634t is connected to any one of the scan lines G1 to Gy. One of a source and a drain of the transistor 634t is connected to any one of the signal lines S1 to Sx. The other of the source and the drain of the transistor 634t is connected to a first electrode of the display element 635.

Note that pixel 631p may include, in addition to the capacitor 634c for holding voltage between a first electrode and a second electrode of the liquid crystal element 635LC, another circuit element such as a transistor, a diode, a resistor, a capacitor, or an inductor as needed.

In the pixel 631p illustrated in FIG. 8B, one transistor 634t is used as a switching element for controlling input of the S signal 633_S to the pixel 631p. However, a plurality of transistors which serve as one switching element may be used in the pixel 631p. In the case where the plurality of transistors serve as one switching element, the transistors may be connected to one another in parallel, in series, or in combination of parallel connection and series connection.

Note that the capacitance of the pixel circuit 634 may be adjusted as appropriate. For example, in the second mode to be described later, in the case where the S signal 633_S is held for a relatively long time (specifically, greater than or equal to 1/60 sec), the capacitor 634c is provided. Alternatively, the capacitance of the pixel circuit 634 may be adjusted by utilizing a structure other than the capacitor 634c. For example, with a structure in which the first electrode and the second electrode of the liquid crystal element 635LC are formed to overlap with each other, a capacitor may be substantially formed.

Note that the structure of the pixel circuit 634 can be selected depending on the kind of the display element 635 or the driving method.

<4-2a. Display Element>

The liquid crystal element 635LC includes a first electrode, a second electrode, and a liquid crystal layer including a liquid crystal material to which the voltage between the first electrode and the second electrode is applied. In the liquid crystal element 635LC, the alignment of liquid crystal molecules is changed in accordance with the level of voltage applied between the first electrode and the second electrode, so that the transmittance is changed. Accordingly, the transmittance of the display element 635 is controlled by the potential of the S signal 633_S; thus, gradation can be expressed.

<4-2b. Transistor>

The transistor 634t controls whether to apply the potential of the signal line S to the first electrode of the display element 635. A predetermined reference potential Vcom is applied to the second electrode of the display element 635.

Note that a transistor including an oxide semiconductor can be suitably used as the transistor in the liquid crystal display device of one embodiment of the present invention. Embodiments 8 and 9 can be referred to for details of the transistor including an oxide semiconductor.

<5. Light Supply Portion>

A plurality of light sources is provided in the light supply portion 650. The control unit 610 controls driving of the light sources in the light supply portion 650.

The light source in the light supply portion 650 can be a cold cathode fluorescent lamp, a light-emitting diode (LED), an OLED element generating luminescence (electroluminescence) when an electric field is applied thereto, or the like.

In particular, the intensity of blue light emitted by the light source is preferably weakened compared to that of light of any other color. Blue light included in light emitted by the light source reaches the retina in the eye without being absorbed by the cornea or the lens. Accordingly, weakening the intensity of blue light emitted by the light source compared to that of light of any other color makes it possible to reduce long-term effects of blue light on the retina (e.g., age-related macular degeneration), adverse effects of exposure to blue light until midnight on the circadian rhythm, and the like. The wavelength of the light emitted by the light source is preferably longer than 420 nm, more preferably longer than 440 nm.

Figure 24:
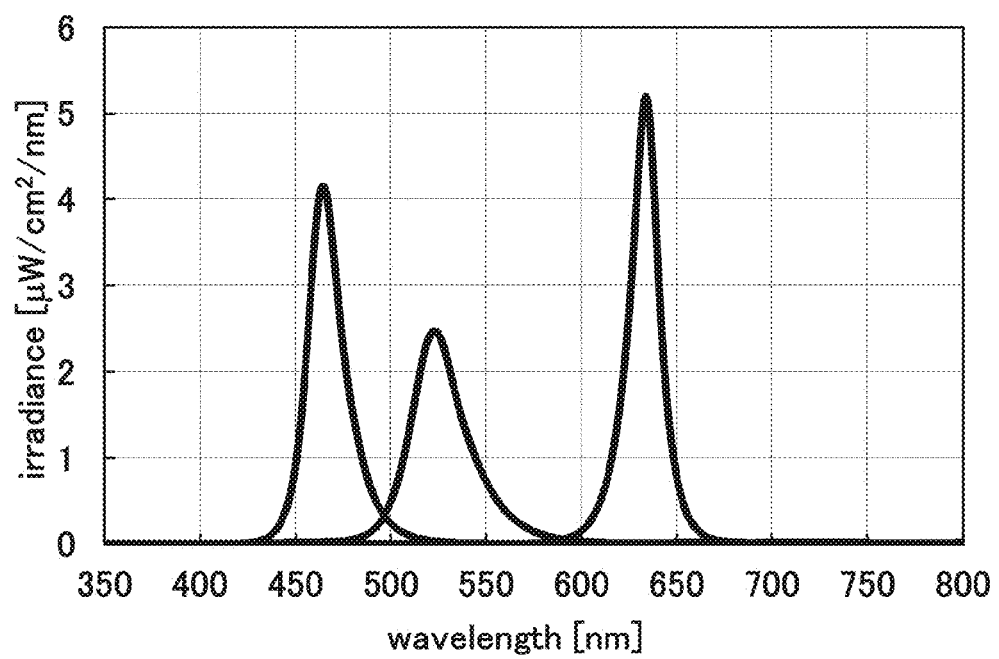
FIG. 24 is a graph showing emission spectra of a backlight.

FIG. 24 shows emission spectra of a preferable backlight. As light sources of the backlight, light emitting diodes (LEDs) of three colors, R (red), G (green), and B (blue), are used. FIG. 24 shows emission spectra of the light emitting diodes. In FIG. 24, irradiance is hardly observed at a wavelength of 420 nm or shorter. A display portion with the backlight for which these light sources are used can reduce eye strain of users.

The above structure can reduce the luminance of short-wavelength light, and makes it possible to reduce the user's eye fatigue and damage to the retina and prevent harm to the user's health.

<6. Input Unit>

As the input unit 500, a touch panel, a touch pad, a mouse, a finger joystick, a trackball, a data glove, or an imaging device can be used, for example. In the arithmetic unit 620, an electric signal output from the input unit 500 can be associated with coordinates of a display portion. Accordingly, users can input an instruction for processing information displayed on the display portion.

Examples of information input with the input unit 500 by users are instructions for dragging an image displayed on the display portion to another position on the display portion; for swiping a screen for turning a displayed image and displaying the next image; for scrolling a continuous image; for selecting a specific image; for pinching a screen for changing the size of a displayed image; and for inputting handwritten characters.

Note that this embodiment can be combined with any of the other embodiments in this specification as appropriate.

(Embodiment 3)

In this embodiment, an example of a method for driving the liquid crystal display device (also referred to as a display device) described in Embodiment 2 will be described with reference to FIGS. 8A and 8B, FIG. 9, and FIG. 10.

FIGS. 8A and 8B are a block diagram and a circuit diagram illustrating a configuration of a display portion of a liquid crystal display device having a display function in one embodiment of the present invention.

FIG. 9 is a block diagram illustrating a modification example of a configuration of a display portion of a liquid crystal display device having a display function in one embodiment of the present invention.

Figure 10:
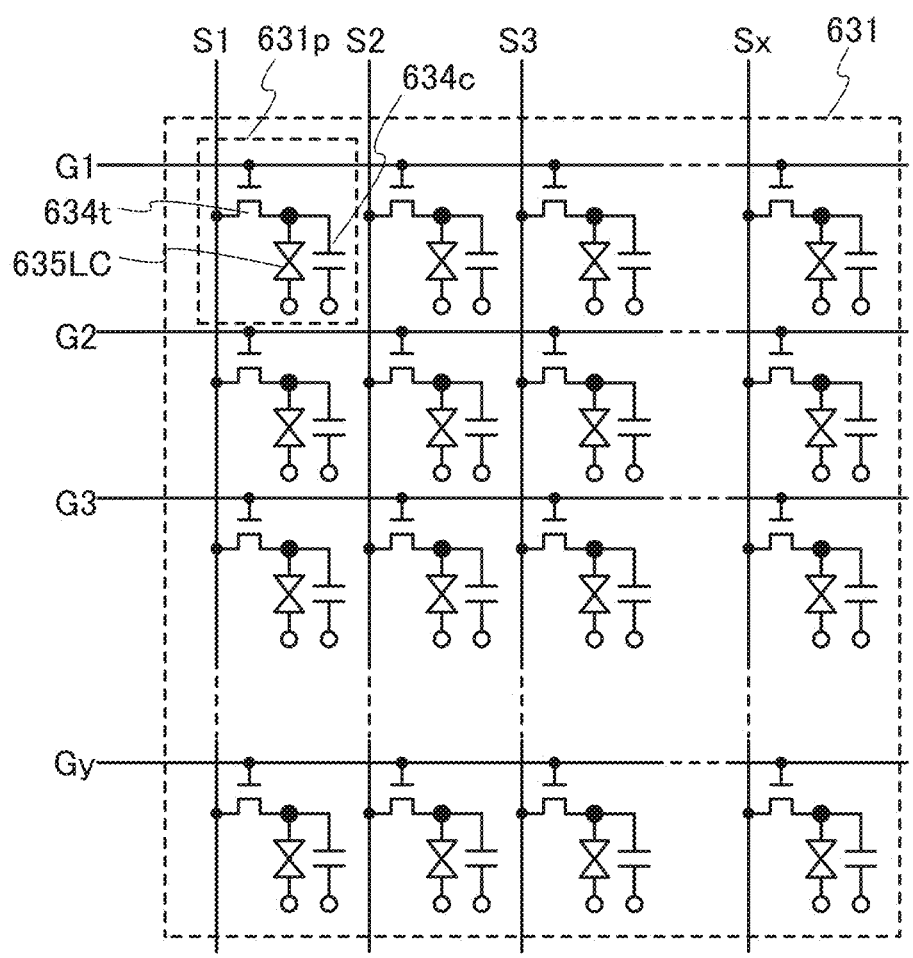
FIG. 10 is a circuit diagram illustrating a liquid crystal display device having a display function of one embodiment of the present invention.

FIG. 10 is a circuit diagram illustrating a liquid crystal display device having a display function in one embodiment of the present invention.

<1. Method for Writing S Signals into Pixel Portion>

An example of a method for writing the S signals 633_S into the pixel portion 631 in FIG. 8A or FIG. 9 is described. Specifically, the method described here is a method for writing the S signal 633_S into each pixel 631p including the pixel circuit illustrated in FIG. 8B in the pixel portion 631.

<Writing Signals into Pixel Portion>

In a first frame period, the scan line G1 is selected by input of the G signal 632_G with a pulse to the scan line G1. In each of the plurality of pixels 631p connected to the selected scan line G1, the transistor 634t is turned on.

When the transistors 634t are on (in one line period), the potentials of the S signals 633_S generated from the second-order image signals 615_V are applied to the signal lines S1 to Sx. Through each of the transistors 634t that are on, charge corresponding to the potential of the S signal 633_S is accumulated in the capacitor 634c and the potential of the S signal 633_S is applied to a first electrode of the liquid crystal element 635LC.

In a period during which the scan line G1 is selected in the first frame period, the S signals 633_S having a positive polarity are sequentially input to all the signal lines S1 to Sx. Thus, the S signals 633_S having a positive polarity are input to first electrodes G1S1 to G1Sx in the pixels 631p that are connected to the scan line G1 and the signal lines S1 to Sx. Accordingly, the transmittance of the liquid crystal element 635LC is controlled by the potential of the S signal 633_S; thus, gradation is expressed by the pixels.

Similarly, the scan lines G2 to Gy are sequentially selected, and the pixels 631p connected to the scan lines G2 to Gy are sequentially subjected to the same operation as that performed while the scan line G1 is selected. Through the above operations, an image for the first frame can be displayed on the pixel portion 631.

Note that in one embodiment of the present invention, the scan lines G1 to Gy are not necessarily selected sequentially.

It is possible to employ dot sequential driving in which the S signals 633_S are sequentially input to the signal lines S1 to Sx from the S driver circuit 633 or line sequential driving in which the S signals 633_S are input all at once. Alternatively, a driving method in which the S signals 633_S are sequentially input to every plural signal lines S may be employed.

In addition, the method for selecting the scan lines G is not limited to progressive scan; interlaced scan may be employed for selecting the scan lines G.

In given one frame period, the polarities of the S signals 633_S input to all the signal lines may be the same, or the polarities of the S signals 633_S to be input to the pixels may be inverted signal line by signal line.

<Writing Signals into Pixel Portion Divided into Plurality of Regions>

FIG. 9 illustrates a modification example of the structure of the display portion 630.

In the display portion 630 in FIG. 9, the plurality of pixels 631p, the plurality of scan lines G for selecting the pixels 631p row by row, and the plurality of signal lines S for supplying the S signals 633_S to the selected pixels 631p are provided in the pixel portion 631 divided into a plurality of regions (specifically, a first region 631a, a second region 631b, and a third region 631c).

The input of the G signals 632_G to the scan lines G in each region is controlled by the corresponding G driver circuit 632. The input of the S signals 633_S to the signal lines S is controlled by the S driver circuit 633. Each of the plurality of pixels 631p is connected to at least one of the scan lines G and at least one of the signal lines S.

Such a structure allows the pixel portion 631 to be divided into separately driven regions.

For example, the following operation is possible: when information is input from a touch panel used as the input unit 500, coordinates specifying a region to which the information is to be input are obtained, and the G driver circuit 632 driving the region corresponding to the coordinates operates in the first mode and the G driver circuit 632 driving the other region operates in the second mode. Thus, it is possible to stop the operation of the G driver circuit for a region where information has not been input from the touch panel, that is, a region where rewriting of a displayed image is not necessary.

<2. G Driver Circuit in First Mode and Second Mode>

The S signal 633_S is input to the pixel circuit 634 to which the G signal 632_G output by the G driver circuit 632 is input. In a period during which the G signal 632_G is not input, the pixel circuit 634 holds the potential of the S signal 633_S. In other words, the pixel circuit 634 holds a state where the potential of the S signal 633_S is written in.

The pixel circuit 634 into which display data is written maintains a display state corresponding to the S signal 633_S. Note that to maintain a display state is to keep the amount of change in display state within a given range. This given range is set as appropriate, and is preferably set so that a user viewing displayed images can recognize the displayed images as the same image.

The G driver circuit 632 has the first mode and the second mode.

<2-1. First Mode>

The G driver circuit 632 in the first mode outputs the G signals 632_G to pixels at a rate of higher than or equal to 30 times per second, preferably higher than or equal to 60 times per second and lower than 960 times per second.

The G driver circuit 632 in the first mode rewrites signals at a speed such that change in images which occurs each time signals are rewritten is not recognized by the user. As a result, a smooth moving image can be displayed.

<2-2. Second Mode>

The G driver circuit 632 in the second mode outputs the G signals 632_G to pixels at a rate of higher than or equal to once per day and lower than 0.1 times per second, preferably higher than or equal to once per hour and lower than once per second.

In a period during which the G signal 632_G is not input, the pixel circuit 634 keeps holding the S signal 633_S and maintains the display state corresponding to the potential of the S signal 633_S.

In this manner, display without flicker due to rewriting of the display in the pixel can be performed in the second mode.

As a result, eye fatigue of a user of the liquid crystal display device having a display function can be reduced.

Power consumed by the G driver circuit 632 is reduced in a period during which the G driver circuit 632 does not operate.

Note that the pixel circuit that is driven by the G driver circuit 632 having the second mode is preferably configured to hold the S signal 633_S for a long period. For example, the off-state leakage current of the transistor 634t is preferably as low as possible.

Embodiments 8 and 9 can be referred to for examples of a structure of the transistor 634t with low off-state leakage current.

Note that this embodiment can be combined with any of the other embodiments in this specification as appropriate.

(Embodiment 4)

In this embodiment, an example of a method for driving the liquid crystal display device described in Embodiment 2 will be described with reference to FIG. 10, FIGS. 11A1, 11A2, 11B1, 11B2, and 11C, and FIG. 12.

FIG. 10 is a circuit diagram illustrating a liquid crystal display device having a display function in one embodiment of the present invention.

FIGS. 11A1, 11A2, 11B1, 11B2, and 11C illustrate source line inversion driving and dot line inversion driving of a liquid crystal display device having a display function in one embodiment of the present invention.

FIG. 12 is a timing chart illustrating source line inversion driving and dot line inversion driving of a liquid crystal display device having a display function in one embodiment of the present invention.

<1. Overdriving>

The response time of liquid crystal from application of voltage to saturation of the change in transmittance is generally about ten milliseconds. Thus, the slow response of the liquid crystal tends to be perceived as a blur of a moving image.

As a countermeasure, in one embodiment of the present invention, overdriving may be employed in which the voltage applied to the display element 635 including the liquid crystal element is temporarily increased so that the alignment of liquid crystal changes quickly. By overdriving, the response speed of the liquid crystal can be increased, a blur of a moving image can be prevented, and the quality of the moving image can be improved.

Further, if the transmittance of the display element 635 including the liquid crystal element keeps changing without reaching a constant value after the transistor 634t is turned off, the relative permittivity of the liquid crystal also changes; accordingly, the voltage held in the display element 635 including the liquid crystal element easily changes.

For example, in the case where no capacitor is connected in parallel to the display element 635 including the liquid crystal element or in the case where the capacitor 634c connected in parallel to the display element 635 including the liquid crystal element has small capacitance, the change in the voltage held in the display element 635 including the liquid crystal element tends to occur markedly. However, by the overdriving, the response time can be shortened and therefore the change in the transmittance of the display element 635 including the liquid crystal element after the transistor 634t is turned off can be made small. Accordingly, even in the case where the capacitor 634c connected in parallel to the display element 635 including the liquid crystal element has small capacitance, the change in the voltage held in the display element 635 including the liquid crystal element after turning off the transistor 634t can be prevented.

<2. Source Line Inversion Driving and Dot Inversion Driving>

In the pixel 631p to which the signal line Si of the pixel circuit illustrated in FIG. 10 is connected, the pixel electrode 635_1 is positioned between the signal line Si and a signal line Si+1 that is adjacent to the signal line Si. If the transistor 634t is off, it is ideal that the pixel electrode 635_1 and the signal line Si are electrically separated from each other. Further, ideally, the pixel electrode 635_1 and the signal line Si+1 are electrically separated from each other. However, there actually exist a parasitic capacitance 634c(i) between the pixel electrode 635_1 and the signal line Si, and a parasitic capacitance 634c(i+1) between the pixel electrode 635_1 and the signal line Si+1 (see FIG. 11C). Note that FIG. 11C illustrates a pixel electrode 635_1 serving as a first electrode or a second electrode of the liquid crystal element 635LC, instead of the liquid crystal element 635LC illustrated in FIG. 10.

For example, when a structure is employed in which the first electrode and the second electrode of the liquid crystal element 635LC overlap with each other and the overlap between the two electrodes is practically utilized as a capacitor, there are cases where the capacitor 634c formed using a capacitor line is not connected to the liquid crystal element 635LC, or where the capacitor 634c connected to the liquid crystal element 635LC has a small capacitance. In such cases, the potential of the pixel electrode 635_1 serving as the first electrode or the second electrode of the liquid crystal element is easily affected by the parasitic capacitance 634c(i) and the parasitic capacitor 634c(i+1).

This tends to cause a phenomenon in which even when the transistor 634t is off in the period during which the potential of an image signal is held, the potential of the pixel electrode 635_1 fluctuates in conjunction with a change in the potential of the signal line Si or the signal line Si+1.

The phenomenon in which in the period during which the potential of an image signal is held, the potential of a pixel electrode fluctuates in conjunction with a change in the potential of a signal line is referred to as crosstalk. Crosstalk causes degradation of display contrast. For example, in the case of using normally-white liquid crystal for the liquid crystal element 635LC, images are whitish.

In one embodiment of the present invention, in view of the above situation, a driving method may be employed in which image signals having opposite polarities are input to the signal line Si and the signal line Si+1 arranged with the pixel electrode 635_1 provided therebetween, in one given frame period.

Note that the "image signals having opposite polarities" means, on the assumption that the potential of a common electrode of the liquid crystal element is a reference potential, an image signal having a potential higher than the reference potential and an image signal having a potential lower than the reference potential.

Two methods (source line inversion and dot inversion) can be given as examples of a method for sequentially writing image signals having alternating opposite polarities into a plurality of pixels which are selected.

In either method, in a first frame period, an image signal having a positive (+) polarity is input to the signal line Si and an image signal having a negative (−) polarity is input to the signal line Si+1. Next, in a second frame period, an image signal having a negative (−) polarity is input to the signal line Si and an image signal having a positive (+) polarity is input to the signal line Si+1. Then, in a third frame period, an image signal having a positive (+) polarity is input to the signal line Si and an image signal having a negative (−) polarity is input to the signal line Si+1 (see FIG. 11C).

When such a driving method is employed, the potentials of a pair of signal lines change in opposite polarity directions, whereby the fluctuation of the potential of a pixel electrode can be cancelled out. Therefore, crosstalk can be reduced.

<2-1. Source Line Inversion Driving>

Source line inversion is a method in which image signals having opposite polarities are input in one given frame period so that the polarity of an image signal input to a plurality of pixels connected to one signal line and the polarity of an image signal input to a plurality of pixels connected to another signal line that is adjacent to the above signal line are opposite to each other.

FIGS. 11A1 and 11A2 schematically show polarities of image signals supplied to pixels in the case of source line inversion driving. In FIGS. 11A1 and 11A2, the sign "+" indicates a pixel to which an image signal having a positive polarity is supplied in one given frame period, and the sign "−" indicates a pixel to which an image signal having a negative polarity is supplied in the given frame period. The frame illustrated in FIG. 11A2 is a frame following the frame illustrated in FIG. 11A1.

<2-2. Dot Inversion Driving>

Dot inversion is a method in which image signals having opposite polarities are input in one given frame period so that the polarity of an image signal input to a plurality of pixels connected to one signal line and the polarity of an image signal input to a plurality of pixels connected to another signal line adjacent to the above signal line are opposite to each other and, in addition, so that in the plurality of pixels connected to the one signal line, the polarity of an image signal input to a pixel and the polarity of an image signal input to a pixel adjacent to the pixel are opposite to each other.

FIGS. 11B1 and 11B2 schematically show polarities of image signals supplied to pixels in the case of dot inversion driving. In FIGS. 11B1 and 11B2, the sign "+" indicates a pixel to which an image signal having a positive polarity is supplied in one given frame period, and the sign "−" indicates a pixel to which an image signal having a negative polarity is supplied in the given frame period. The frame illustrated in FIG. 11B2 is a frame following the frame illustrated in FIG. 11B1.

<2-3. Timing Chart>

FIG. 12 is a timing chart in the case of operating the pixel portion 631 illustrated in FIG. 10 by source line inversion driving. Specifically, FIG. 12 shows changes over time of the potential of a signal supplied to the scan line G1, the potentials of image signals supplied to the signal lines S1 to Sx, and the potentials of the pixel electrodes included in pixels connected to the scan line G1.

First, the scan line G1 is selected by inputting a signal with a pulse to the scan line G1. In each of the plurality of pixels 631p connected to the selected scan line G1, the transistor 634t is turned on. When a potential of an image signal is supplied to the signal lines S1 to Sx in the state where the transistor 634t is on, the potential of the image signal is supplied to the pixel electrode of the liquid crystal element 635LC via the on-state transistor 634t.

In the timing chart of FIG. 12, an example is shown in which, in a period during which the scan line G1 is selected in the first frame period, image signals having a positive polarity are sequentially input to the odd-numbered signal lines S1, S3, . . . and image signals having a negative polarity are sequentially input to the even-numbered signal lines S2, S4, . . . , Sx. Therefore, image signals having a positive polarity are supplied to the pixel electrodes (S1), (S3), . . . in the pixels 631p which are connected to the odd-numbered signal lines S1, S3, . . . . Further, image signals having a negative polarity are supplied to the pixel electrodes (S2), (S4), . . . , (Sx) in the pixels 631p connected to the even-numbered signal lines S2, S4, . . . , Sx.

In the liquid crystal element 635LC, the alignment of liquid crystal molecules is changed in accordance with the level of the voltage applied between the pixel electrode and the common electrode, whereby transmittance is changed. Accordingly, the transmittance of the liquid crystal element 635LC can be controlled by the potential of the image signal; thus, gradation can be displayed.

When input of image signals to the signal lines S1 to Sx is completed, the selection of the scan line G1 is terminated. When the selection of the scan line is terminated, the transistors 634t are turned off in the pixels 631p connected to the scan line. Then, voltage applied between the pixel electrode and the common electrode is held in the liquid crystal element 635LC, whereby display of gradation is maintained. Further, the scan lines G2 to Gy are sequentially selected, and operations similar to that in the period during which the scan line G1 is selected are performed in the pixels connected to the above respective scan lines.

Next, the scan line G1 is selected again in the second frame period. In a period during which the scan line G1 is selected in the second frame period, image signals having a negative polarity are sequentially input to the odd-numbered signal lines S1, S3, . . . and image signals having a positive polarity are sequentially input to the even-numbered signal lines S2, S4, . . . , Sx, unlike the period during which the scan line G1 is selected in the first frame period. Therefore, image signals having a negative polarity are supplied to the pixel electrodes (S1), (S3), . . . in the pixels 631p which are connected to the odd-numbered signal lines S1, S3, . . . . Further, image signals having a positive polarity are supplied to the pixel electrodes (S2), (S4), . . . , (Sx) in the pixels 631p connected to the even-numbered signal lines S2, S4, . . . , Sx.

Also in the second frame period, when input of image signals to the signal lines S1 to Sx is completed, the selection of the scan line G1 is terminated. Further, the scan lines G2 to Gy are sequentially selected, and operations similar to that in the period during which the scan line G1 is selected are performed in the pixels connected to the above respective scan lines.

An operation similar to the above is repeated in the third frame period and the fourth frame period.

Although an example in which image signals are sequentially input to the signal lines S1 to Sx is shown in the timing chart of FIG. 12, one embodiment of the present invention is not limited to this structure. Image signals may be input to the signal lines S1 to Sx all at once, or image signals may be sequentially input per plurality of signal lines.

In this embodiment, the scan line is selected by progressive scan; however, interlace scan may also be employed for selecting a scan line.

By inversion driving in which the polarity of the potential of an image signal is inverted using the reference potential of a common electrode as a reference, degradation of liquid crystal called burn-in can be prevented.

However, in the inversion driving, the change in the potential supplied to the signal line is increased at the time of changing the polarity of the image signal; thus, a potential difference between a source electrode and a drain electrode of the transistor 634t which functions as a switching element is increased. Accordingly, degradation of characteristics, such as a shift of threshold voltage, is easily caused in the transistor 634t.

Furthermore, in order to maintain the voltage held in the liquid crystal element 635LC, the off-state current of the transistor 634t needs to be low even when the potential difference between the source electrode and the drain electrode is large.

Note that this embodiment can be combined with any of the other embodiments in this specification as appropriate.

(Embodiment 5)

In this embodiment, description is made on a method for generating an image that can be displayed on the liquid crystal display device of one embodiment of the present invention. In particular, an eye-friendly image switching method is described. The eye-friendly image switching method includes an image switching method by which eye strain of users is reduced and an image switching method by which the eye strain is not caused.

High-speed image switching causes eye strain of users in some cases. For example, moving image display for which images are switched at an extremely high speed and the case of switching between different still images correspond to the high-speed image switching.

When images are switched for displaying different images, it is preferable that the images be switched gradually (silently) and naturally, not instantaneously.

For example, when a first image is changed to a second image that is different from the first image, it is preferable to interpose a fade-out image of the first image and/or a fade-in image of the second image between the first image and the second image. Alternatively, an image obtained by overlapping the first image and the second image may be interposed so that the second image fades in at the same time when the first image fades out (this technique is also referred to as crossfading). Further alternatively, a moving image (also referred to as morphing) for displaying the process in which the first image gradually changes into the second image may be interposed.

Specifically, a first still image is displayed at a low refresh rate, followed by an image for image switching is displayed at a high refresh rate, and then a second still image is displayed at a low refresh rate.

<Fade-in, Fade-out>

An example of a method for switching images A and B which are different images is described below.

Figure 13A:
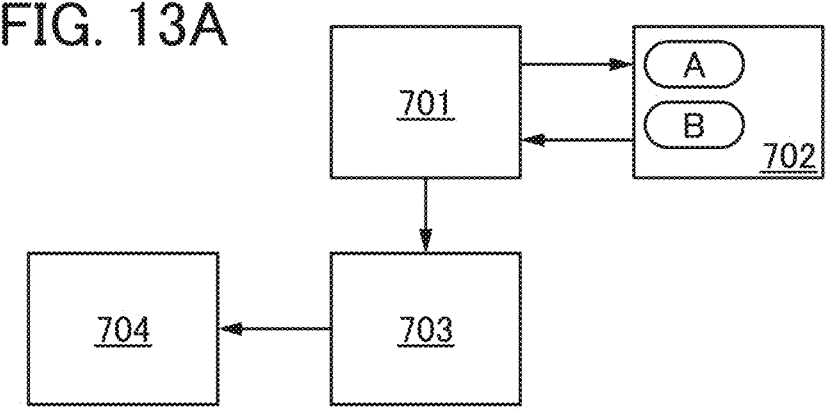
FIGS. 13A and 13B illustrate a structure of a display device of one embodiment of the present invention.

FIG. 13A is a block diagram of a structure of a display device capable of switching images. The display device illustrated in FIG. 13A includes an arithmetic unit 701, a memory unit 702, a graphic unit 703, and a display means 704.

In the first step, the arithmetic unit 701 makes the memory unit 702 store data for the image A and data for the image B from an external memory device or the like.

In the second step, the arithmetic unit 701 sequentially generates new image data on the basis of the data for the image A and the data for the image B, in accordance with a division number set in advance.

In the third step, the arithmetic unit 701 outputs the generated image data to the graphic unit 703. The graphic unit 703 makes the display means 704 display the image data.

Figure 13B:
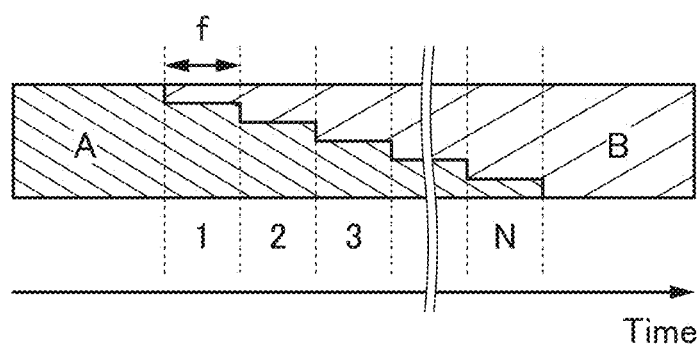

FIG. 13B is a schematic view for explaining image data generated for gradual image switching from the image A to the image B.

FIG. 13B shows the case where N (N is a natural number) sets of image data are generated for switching from the image A to the image B, and each set of image data is displayed for a frame period off (f is a natural number). Therefore, the period needed for the switching from the image A to the image B is f×N frames.

Here, it is preferable that the above parameters such as N and f can be set freely by users. The arithmetic unit 701 obtains these parameters in advance, and generates image data in accordance with the parameters.

The i-th generated image data (i is an integer of 1 or larger and N or smaller) is generated by weighting image data of the image A and image data of the image B and summing up the weighted data. For example, when the luminance (gray level) of a certain pixel where the image A is displayed is represented by a and the luminance (gray level) of the pixel where the image B is displayed is represented by b, the luminance (gray level) c of the pixel where the i-th generated image data is displayed is expressed by Formula 2.

[FORMULA 2]

$$c = \frac{(N-i)a + ib}{N} \quad (1)$$

The image A is changed to the image B using image data generated in the above manner; therefore, discontinuous images can be switched gradually (silently) and naturally.

The case when all pixels satisfy a=0 in Formula 2 corresponds to fade-in when a black image is gradually changed to the image B. The case when all pixels satisfy b=0 corresponds to fade-out when the image A is gradually changed to the black image.

Although the method for switching images by temporarily overlapping two images is described above, a method by which images are not overlapped may be employed.

In the case where two images are not overlapped with each other, a black image may be interposed between the image A and the image B. In this case, the above image switching method can be performed at transition from the image A to the black image and/or transition from the black image to the image B. Moreover, an image interposed between the image A and the image B is not necessarily limited to a black image; a single color image like a white image may be used, or a multicolored image may be used as long as it differs from the image A and the image B.

Interposition of another image, particularly a single color image like a black image, between the image A and the image B enables users to watch images without feeling uncomfortable even when the images are switched; that is, images can be switched without causing stress of users.

(Embodiment 6)

In this embodiment, a structural example of a panel module which can be used as a display unit in a liquid crystal display device of one embodiment of the present invention is described with reference to drawings.

Figure 23A:
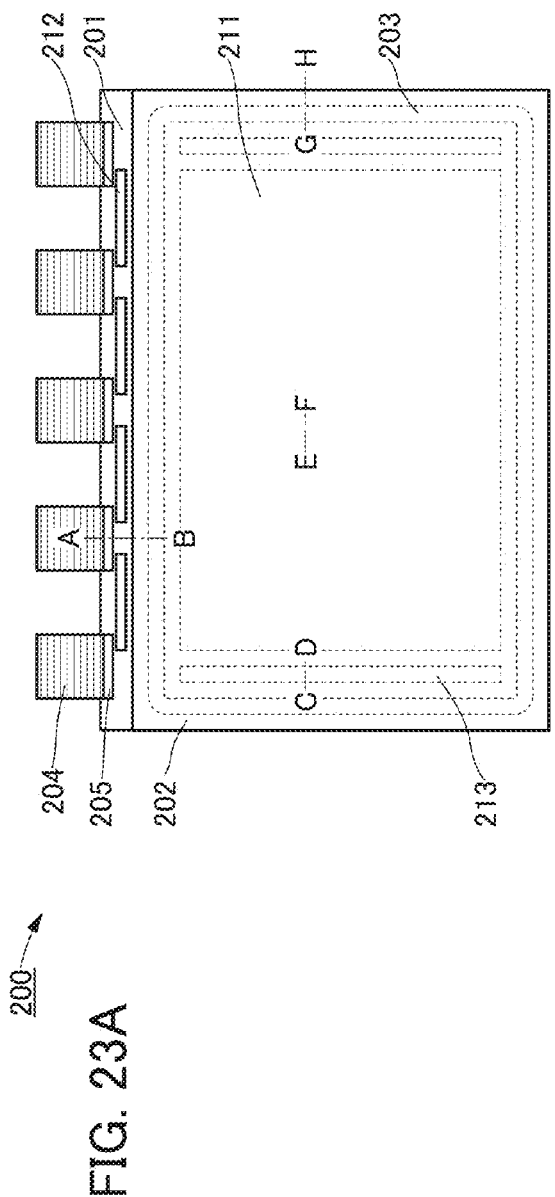
FIGS. 23A and 23B illustrate a structural example of a display device of one embodiment of the present invention.

FIG. 23A is a schematic top view of a panel module 200 described as an example in this embodiment.

The panel module 200 includes a pixel portion 211 including a plurality of pixels and a gate driver circuit 213 in a sealed region surrounded by a first substrate 201, a second substrate 202, and a sealant 203. The panel module 200 also includes an external connection electrode 205 and an IC 212 functioning as a source driver circuit in a region outside the sealed region over the first substrate 201. Power and signals for driving the pixel portion 211, the gate driver circuit 213, the IC 212, and the like can be input through an FPC 204 electrically connected to the external connection electrode 205.

Figure 23B:
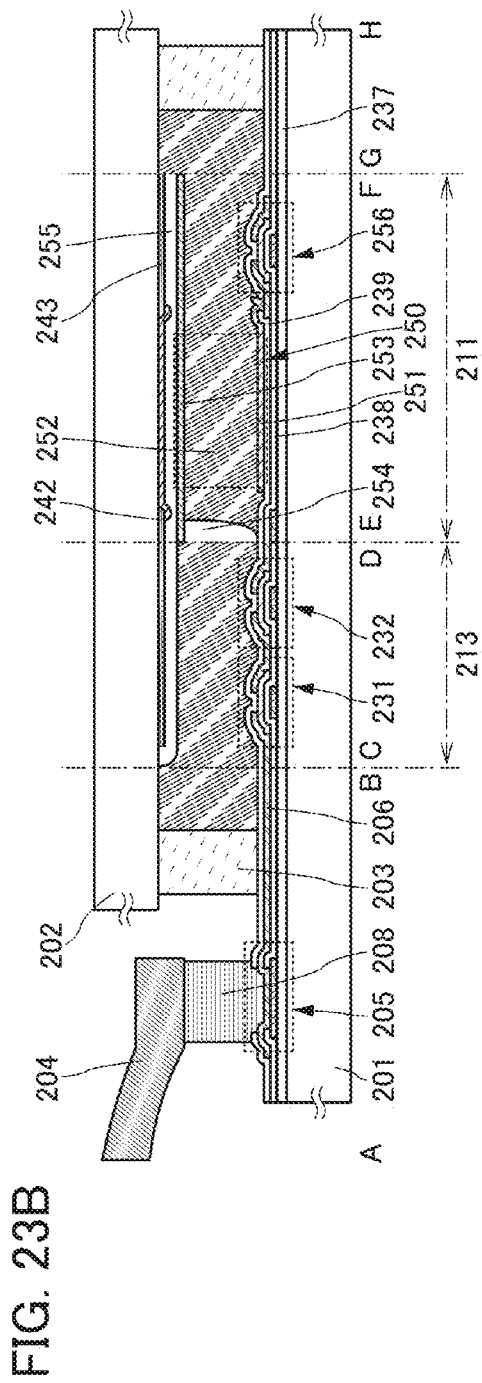

FIG. 23B is a schematic cross-sectional view of a region including the FPC 204 and the sealant 203 along the section line A-B, a region including and the gate driver circuit 213 along the section line C-D, a region including the pixel portion 211 along the section line E-F, and a region including the sealant 203 along the section line G-H in FIG. 23A.

The first substrate 201 and the second substrate 202 are bonded to each other with the sealant 203 in regions of the substrates which are close to the outer edges. In a region surrounded by the first substrate 201, the second substrate 202, and the sealant 203, at least the pixel portion 211 is provided.

In FIG. 23B, the gate driver circuit 213 includes a circuit in which n-channel transistors, transistors 231 and 232, are used in combination, as an example. Note that the gate driver circuit 213 is not limited to this structure and may include various CMOS circuits in which an n-channel transistor and a p-channel transistor are used in combination or a circuit in which p-channel transistors are used in combination. Although a driver-integrated structure in which the gate driver circuit 213 is formed over the first substrate 201 is described in this structural example, the gate driver circuit or the source driver circuit, or both may be formed over a substrate different from the first substrate 201. For example, a driver circuit IC may be mounted by a COG method, or a flexible substrate (FPC) mounted with a driver circuit IC by a COF method may be mounted. In this structural example, the IC 212 functioning as a source driver circuit is provided over the first substrate 201 by a COG method.

Note that there is no particular limitation on the structures of the transistors included in the pixel portion 211 and the gate driver circuit 213. For example, a forward staggered transistor or an inverted staggered transistor may be used. Further, a top-gate transistor or a bottom-gate transistor may be used. As a semiconductor material used for the transistors, for example, a semiconductor material such as silicon or germanium or an oxide semiconductor containing at least one of indium, gallium, and zinc may be used.

Further, there is no particular limitation on the crystallinity of a semiconductor used for the transistors, and an amorphous semiconductor or a semiconductor having crystallinity (a microcrystalline semiconductor, a polycrystalline semiconductor, a single crystal semiconductor, or a semiconductor partly including crystal regions) may be used. A semiconductor having crystallinity is preferably used, in which case deterioration of transistor characteristics can be reduced.

Typical examples of the oxide semiconductor containing at least one of indium, gallium, and zinc include an In—Ga—Zn-based metal oxide. An oxide semiconductor having a wider band gap and a lower carrier density than silicon is preferably used because off-state leakage current can be reduced. Details of preferred oxide semiconductors will be described below in Embodiments 8 and 9.

FIG. 23B shows a cross-sectional structure of one pixel as an example of the pixel portion 211. The pixel portion 211 includes a liquid crystal element 250 using a vertical alignment (VA) mode.

One pixel includes at least a switching transistor 256 and may also include a storage capacitor which is not shown. In addition, a first electrode 251 is provided over an insulating layer 239 to be electrically connected to a source electrode or a drain electrode of the transistor 256.

The liquid crystal element 250 provided for a pixel includes the first electrode 251 provided over the insulating layer 239, a second electrode 253 provided on the second substrate 202, and a liquid crystal 252 sandwiched between the first electrode 251 and the second electrode 253.

For the first electrode 251 and the second electrode 253, a light-transmitting conductive material is used. As the light-transmitting conductive material, a conductive oxide such as indium oxide, indium tin oxide, indium zinc oxide, zinc oxide, or zinc oxide to which gallium is added, or graphene can be used.

Further, a color filter 243 and a black matrix 242 are provided on the second substrate 202 in at least a region overlapping with the pixel portion 211.

The color filter 243 is provided in order to adjust the color of light transmitted through a pixel to increase the color purity. For example, in a full-color panel module using a white backlight, a plurality of pixels provided with color filters of different colors is used. In that case, the color filters may be those of three colors of R (red), G (green), and B (blue) or four colors (yellow (Y) in addition to these three colors). Further, a white (W) pixel may be added to R, G, and B pixels (and a Y pixel). That is, color filters of four colors (or five colors) may be used.

A black matrix 242 is provided between the adjacent color filters 243. The black matrix 242 blocks light emitted from an adjacent pixel, thereby preventing color mixture between the adjacent pixels. In one configuration, the black matrix 242 may be provided only between adjacent pixels of different emission colors and not between pixels of the same emission color. Here, the color filter 243 is provided so that its end portions overlap with the black matrix 242, whereby light leakage can be reduced. The black matrix 242 can be formed using a material that blocks light transmitted through the pixel, for example, a metal material or a resin material including a pigment. Note that it is preferable to provide the black matrix 242 also in a region overlapping with the gate driver circuit 213 or the like besides the pixel portion 211 as illustrated in FIGS. 23A and 23B, in which case undesired leakage of guided light or the like can be prevented.

An overcoat 255 is provided so as to cover the color filter 243 and the black matrix 242. The overcoat 255 can suppress diffusion of impurities such as a pigment, which are included in the color filter 243 and the black matrix 242, into the liquid crystal 252. For the overcoat, a light-transmitting material is used, and an inorganic insulating material or an organic insulating material can be used.

Note that the second electrode 253 is provided on the overcoat 255.

In addition, a spacer 254 is provided in a region where the overcoat 255 overlaps with the black matrix 242. The spacer 254 is preferably formed using a resin material because it can be formed thick. For example, the spacer 254 can be formed using a positive or negative photosensitive resin. When a light-blocking material is used for the spacer 254, the spacer 254 blocks light emitted from an adjacent pixel, thereby preventing color mixture between the adjacent pixels. Although the spacer 254 is provided on the second substrate 202 side in this structural example, the spacer 254 may be provided on the first substrate 201 side. Further, a structure may be employed in which spherical silicon oxide particles are used as the spacer 254 and the particles are scattered in a region where the liquid crystal 252 is provided.

An image can be displayed in the following way: an electric field is generated in the vertical direction with respect to an electrode surface by application of voltage between the first electrode 251 and the second electrode 253, alignment of the liquid crystal 252 is controlled by the electric field, and polarization of light from a backlight provided outside the panel module is controlled in each pixel.

An alignment film that controls alignment of the liquid crystal 252 may be provided on a surface in contact with the liquid crystal 252. A light-transmitting material is used for the alignment film.

In this structural example, a color filter is provided in a region overlapping with the liquid crystal element 250; thus, a full-color image with high color purity can be displayed. With the use of a plurality of light-emitting diodes (LEDs) which emit light of different colors as a backlight, a time-division display method (a field-sequential driving method) can be employed. In the case of employing a time-division display method, the aperture ratio of each pixel or the number of pixels per unit area can be increased because neither color filters nor subpixels from which light of red (R), green (G), or blue (B), for example, is obtained are needed.

As the liquid crystal 252, a thermotropic liquid crystal, a low-molecular liquid crystal, a polymer liquid crystal, a ferroelectric liquid crystal, an anti-ferroelectric liquid crystal, or the like can be used. Moreover, a liquid crystal exhibiting a blue phase is preferably used because an alignment film is not needed and a wide viewing angle is obtained in that case. It is also possible to use a polymer-stabilized liquid crystal material which is obtained by adding a monomer and a polymerization initiator to the above liquid crystal and, after injection or dispensing and sealing of the liquid crystal, polymerizing the monomer.

Although the liquid crystal element 250 using a VA mode is described in this structural example, the structure of the liquid crystal element is not limited to this example, and the liquid crystal element 250 using a different mode can be used.

The first substrate 201 is provided with an insulating layer 237 in contact with an upper surface of the first substrate 201, an insulating layer 238 functioning as a gate insulating layer of transistors, and the insulating layer 239 covering the transistors.

The insulating layer 237 is provided in order to prevent diffusion of impurities included in the first substrate 201. The insulating layers 238 and 239, which are in contact with semiconductor layers of the transistors, are preferably formed using a material which prevents diffusion of impurities that promote degradation of the transistors. For these insulating layers, for example, an oxide, a nitride, or an oxynitride of a semiconductor such as silicon or a metal such as aluminum can be used. Alternatively, a stack of such inorganic insulating materials or a stack of such an inorganic insulating material and an organic insulating material may be used. Note that the insulating layers 237 and 239 are not necessarily provided when not needed.

An insulating layer functioning as a planarization layer which covers steps due to the transistors, a wiring, or the like provided therebelow may be provided between the insulating layer 239 and the first electrode 251. For such an insulating layer, it is preferable to use a resin material such as polyimide or an acrylic resin. An inorganic insulating material may be used as long as high planarity can be obtained.

With the structure shown in FIG. 23B, the number of photomasks needed for forming a transistor and the first electrode 251 of the liquid crystal element 250 over the first substrate 201 can be reduced. Specifically, five photomasks are needed; one is used in a step of processing a gate electrode, one is used in a step of processing a semiconductor layer, one is used in a step of processing a source electrode and a drain electrode, one is used in a step of forming an opening in the insulating layer 239, and one is used in a step of processing the first electrode 251.

A wiring 206 over the first substrate 201 is provided so as to extend to the outside of the region sealed with the sealant 203 and is electrically connected to the gate driver circuit 213. Part of an end portion of the wiring 206 forms part of the external connection electrode 205. In this structural example, the external connection electrode 205 is formed by a stack of a conductive film used for the source electrode and the drain electrode of the transistor and a conductive film used for the gate electrode of the transistor. The external connection electrode 205 is preferably formed by a stack of a plurality of conductive films as described above because mechanical strength against a pressure bonding step performed on the FPC 204 or the like can be increased.

Although not shown, a wiring and an external connection electrode which electrically connect the IC 212 and the pixel portion 211 may have structures similar to those of the wiring 206 and the external connection electrode 205.

A connection layer 208 is provided in contact with the external connection electrode 205. The FPC 204 is electrically connected to the external connection electrode 205 through the connection layer 208. For the connection layer 208, a known anisotropic conductive film, a known anisotropic conductive paste, or the like can be used.

The end portions of the wiring 206 and the external connection electrode 205 are preferably covered with an insulating layer so that surfaces thereof are not exposed, in which case oxidation of the surfaces and defects such as an unintended short circuit can be suppressed.

This embodiment can be combined with any of the other embodiments disclosed in this specification as appropriate.

(Embodiment 7)

The panel module described in Embodiment 6 can function as a touch panel by being provided with a touch sensor (a contact detector). In this embodiment, a touch panel is described with reference to FIGS. 14A and 14B and FIG. 15. Hereinafter, description of the same portions as those in the above embodiment is omitted in some cases.

Figure 14A:
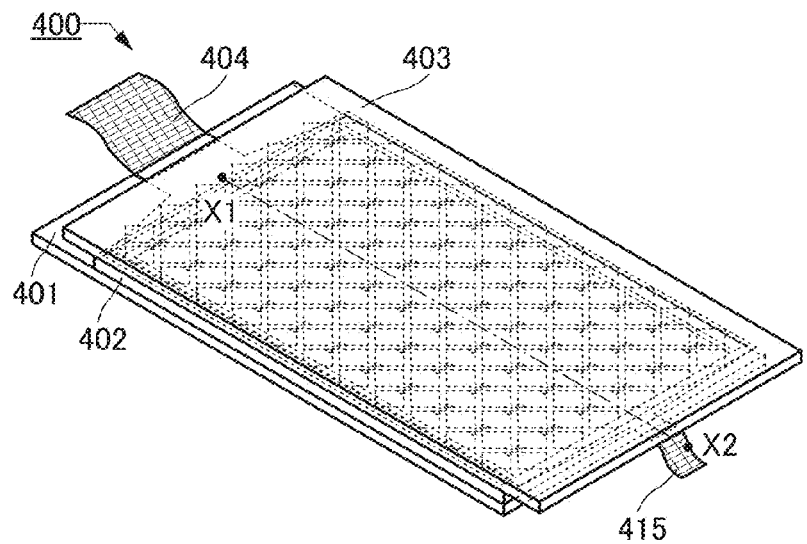
FIGS. 14A and 14B illustrate a touch panel.
Figure 14B:
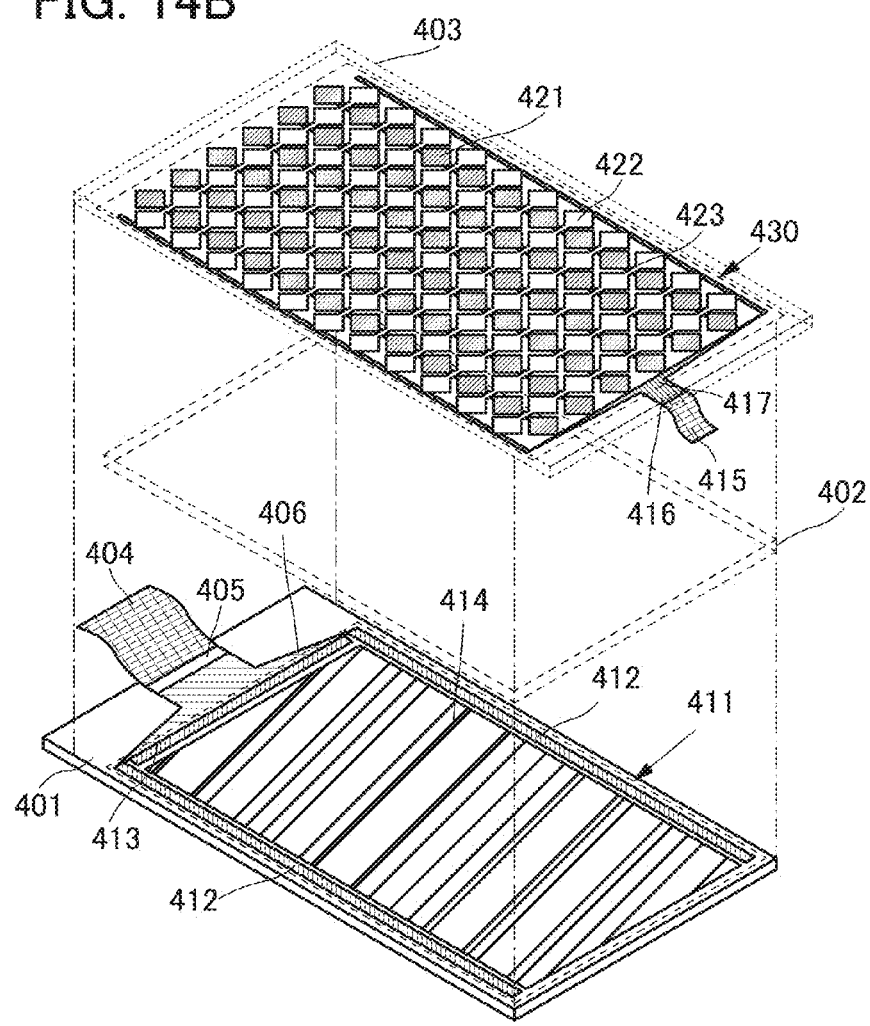

FIG. 14A is a schematic perspective view of a touch panel 400 described in this embodiment as an example. FIG. 14B is a developed view of the schematic perspective view of the touch panel 400. Note that FIGS. 14A and 14B illustrate only main components for simplicity.

The touch panel 400 includes a display portion 411 interposed between a first substrate 401 and a second substrate 402 and a touch sensor 430 interposed between the second substrate 402 and a third substrate 403.

The first substrate 401 is provided with the display portion 411 and a plurality of wirings 406 electrically connected to the display portion 411. The plurality of wirings 406 is led to the periphery of the first substrate 401, and part of the wirings form an external connection electrode 405 for electrical connection to an FPC 404.

The display portion 411 includes a pixel portion 414 including a plurality of pixels, a source driver circuit 412, and a gate driver circuit 413, and sealed by the first substrate 401 and the second substrate 402. Although FIG. 14B illustrates a structure in which two source driver circuits 412 are positioned on both sides of the pixel portion 414, one source driver circuit 412 may be positioned along one side of the pixel portion 414.

A liquid crystal element is used as a display element applicable to the pixel portion 414 in the display portion 411.

The third substrate 403 is provided with the touch sensor 430 and a plurality of wirings 417 electrically connected to the touch sensor 430. The touch sensor 430 is provided on a surface of the third substrate 403 on a side facing the second substrate 402. The plurality of wirings 417 is led to the periphery of the third substrate 403, and part of the wirings form an external connection electrode 416 for electrical connection to an FPC 415. Note that in FIG. 14B, electrodes, wirings, and the like of the touch sensor 430 which are provided on the back side of the third substrate 403 (the back side of the diagram) are indicated by solid lines for clarity.

The touch sensor 430 illustrated in FIG. 14B is an example of a projected capacitive touch sensor. The touch sensor 430 includes electrodes 421 and electrodes 422. The electrode 421 and the electrode 422 are each electrically connected to any one of the plurality of wirings 417.

Here, the electrode 422 is in the form of a series of quadrangles arranged in one direction as illustrated in FIGS. 14A and 14B. Each of the electrodes 421 is in the form of a quadrangle. The plurality of electrodes 421 arranged in a line in a direction intersecting with the direction in which the electrode 422 extends is electrically connected to each other by the wiring 423. The electrode 422 and the wiring 423 are preferably arranged so that the area of the intersecting portion of the electrode 422 and the wiring 423 becomes as small as possible. Such a shape can reduce the area of a region where the electrodes are not provided and decrease luminance unevenness of light passing through the touch sensor 430 which are caused by a difference in transmittance depending on whether the electrodes are provided or not.

Note that the shapes of the electrode 421 and the electrode 422 are not limited thereto and can be any of a variety of shapes. For example, a structure may be employed in which the plurality of electrodes 421 is arranged so that gaps between the electrodes 421 are reduced as much as possible, and the electrode 422 is spaced apart from the electrodes 421 with an insulating layer interposed therebetween to have regions not overlapping with the electrodes 421. In that case, between two adjacent electrodes 422, it is preferable to provide a dummy electrode which is electrically insulated from these electrodes, whereby the area of regions having different transmittances can be reduced.

Figure 15:
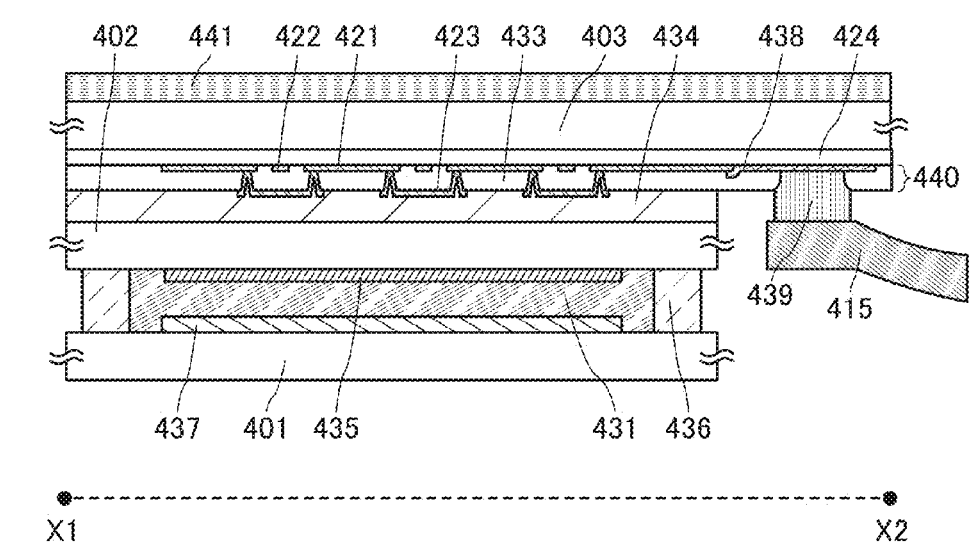
FIG. 15 illustrates a touch panel.

FIG. 15 is a cross-sectional view of the touch panel 400 taken along X1-X2 in FIG. 14A.

A switching element layer 437 is provided over the first substrate 401. The switching element layer 437 includes at least a transistor, and may further include a capacitor or the like. Furthermore, the switching element layer 437 may include a driver circuit (a gate driver circuit and/or a source driver circuit), a wiring, an electrode, or the like.

A color filter layer 435 is provided on one surface of the second substrate 402. The color filter layer 435 includes a color filter which overlaps with a liquid crystal element. When the color filter layer 435 is provided with three color filters of red (R), green (G), and blue (B), a full-color liquid crystal display device can be obtained.

The color filter layer 435 can be formed using a photosensitive material including a pigment by a photolithography process. In the color filter layer 435, a black matrix may be provided between color filters with different colors. Furthermore, an overcoat may be provided to cover the color filters and the black matrix.

Note that one of electrodes of the liquid crystal element may be formed on the color filter layer 435 in accordance with the structure of the liquid crystal element. Note that the electrode becomes part of the liquid crystal element to be formed later. An alignment film may be provided over the electrode.

A liquid crystal 431 is sealed between the first substrate 401 and the second substrate 402 with a sealant 436. The sealant 436 is provided to surround the switching element layer 437 and the color filter layer 435.

As the sealant 436, a thermosetting resin or an ultraviolet curable resin can be used; for example, an organic resin such as an acrylic resin, a urethane resin, an epoxy resin, or a resin having a siloxane bond can be used. Alternatively, the sealant 436 may be formed with glass frit including a low-melting-point glass. Further alternatively, the sealant 436 may be formed with a combination of the organic resin and the glass frit. For example, a structure in which the organic resin is provided in contact with the liquid crystal 431 and the glass frit is provided outside the liquid crystal 431 can prevent water and the like from entering the liquid crystal from the outside.

A touch sensor is provided over the second substrate 402. A sensor layer 440 is provided on one surface of the third substrate 403 with an insulating layer 424 provided therebetween. The sensor layer 440 is bonded to the second substrate 402 with an adhesive layer 434 provided therebetween. A polarizing plate 441 is provided on the other surface of the third substrate 403.

The touch sensor can be formed as follows: the sensor layer 440 is formed over the third substrate 403; and the sensor layer 440 is bonded to the second substrate 402 with the adhesive layer 434 that is over the sensor layer 440, interposed therebetween.

For the insulating layer 424, an oxide such as a silicon oxide can be used. Electrodes 421 having a light-transmitting property and electrodes 422 having a light-transmitting property are provided in contact with the insulating layer 424. The electrodes 421 and the electrodes 422 are formed in the following manner: a conductive film is formed over the insulating layer 424 over the third substrate 403 by a sputtering method, and selectively etched by a known patterning technique such as a photolithography process. As a light-transmitting conductive material, a conductive oxide such as indium oxide, indium tin oxide, indium zinc oxide, zinc oxide, or zinc oxide to which gallium is added can be used.

A wiring 438 is electrically connected to the electrode 421 or the electrode 422. Part of the wiring 438 serves as an external connection electrode which is electrically connected to the FPC 415. For the wiring 438, a metal material such as aluminum, gold, platinum, silver, nickel, titanium, tungsten, chromium, molybdenum, iron, cobalt, copper, or palladium or an alloy material containing any of these metal materials can be used.

The electrodes 422 are provided to form stripes extended in one direction. The electrodes 421 are provided such that one electrode 422 is sandwiched between a pair of electrodes 421. The pair of electrodes 421 are electrically connected to each other by a wiring 423. The wiring 423 is provided to intersect with the electrode 422. Here, the one electrode 422 and the pair of electrodes 421 which are electrically connected to each other by the wiring 423 do not necessarily intersect orthogonally and may form an angle of less than 90°.

An insulating layer 433 is provided to cover the electrodes 421 and the electrodes 422. As a material of the insulating layer 433, for example, a resin such as an acrylic resin or an epoxy resin, a resin having a siloxane bond, or an inorganic insulating material such as silicon oxide, silicon oxynitride, or aluminum oxide can be used. Openings reaching the electrodes 421 are formed in the insulating layer 433, and the wirings 423 electrically connected to the electrodes 421 are provided over the insulating layer 433 and in the openings. The wiring 423 is preferably formed using a light-transmitting conductive material similar to that of the electrode 421 and the electrode 422, in which case the aperture ratio of the touch panel can be improved. Although a material which is the same as that of the electrode 421 and the electrode 422 may be used for the wiring 423, a material having higher conductivity than the material of the electrode 421 and the electrode 422 is preferably used for the wiring 423.

An insulating layer covering the insulating layer 433 and the wirings 423 may be provided. The insulating layer can serve as a protection layer.

An opening reaching the wiring 438 is formed in the insulating layer 433 (and the insulating layer serving as a protection layer). A connection layer 439 provided in the opening electrically connects the FPC 415 with the wiring 438. For the connection layer 439, an anisotropic conductive film (ACF), anisotropic conductive paste (ACP), or the like can be used.

It is preferable that the adhesive layer 434 by which the sensor layer 440 is bonded to the second substrate 402 have a light-transmitting property. For example, a thermosetting resin or an ultraviolet curable resin can be used; specifically, a resin such as an acrylic resin, a urethane resin, an epoxy resin, or a resin having a siloxane bond can be used.

As the polarizing plate 441, a known polarizing plate can be used. For the polarizing plate 441, a material capable of producing linearly polarized light from natural light or circularly polarized light is used. For example, a material whose optical anisotropy is obtained by disposing dichroic substances in one direction can be used. Such a polarizing plate can be formed in such a manner that an iodine-based compound or the like is adsorbed to a film such as a polyvinyl alcohol film and the film or the like is stretched in one direction, for example. Note that as the dichroic substance, a dye-based compound or the like as well as an iodine-based compound can be used. A film-like, sheet-like, or plate-like material can be used for the polarizing plate 441.

Note that in this embodiment, an example is described in which a projected capacitive touch sensor is used for the sensor layer 440; however, the sensor layer 440 is not limited to this, and a sensor functioning as a touch sensor which senses proximity or touch of a conductive object to be sensed such as a finger from an outer side than the polarizing plate can be used. The touch sensor provided in the sensor layer 440 is preferably a capacitive touch sensor. Examples of the capacitive touch sensor are of a surface capacitive type, of a projected capacitive type, and the like. Further, examples of the projected capacitive type are of a self capacitive type, a mutual capacitive type, and the like mainly in accordance with the difference in the driving method. The use of a mutual capacitive type is preferable because multiple points can be sensed simultaneously.

In the touch panel described in this embodiment, since the refresh rate at the time of still image display can be reduced, the same image can be seen for a long time by users as much as possible; thus, perceivable flickers in a screen can be reduced. Furthermore, the size of one pixel is small and thus high resolution display is possible, so that precise and smooth display can be achieved. Moreover, at the time of still image display, deterioration of image quality caused by a change in gray level can be reduced and power consumed by the touch panel can be reduced.

(Embodiment 8)

In this embodiment, structural examples of transistors which can be used in pixels of a liquid crystal display device will be described with reference to drawings.

<Structural Example of Transistor>

Figure 16A:
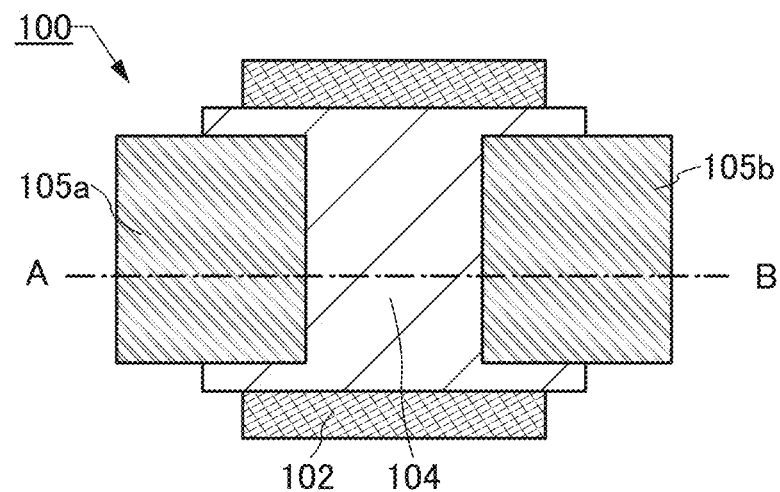
FIGS. 16A and 16B illustrate a structural example of a transistor of one embodiment of the present invention.
Figure 16B:
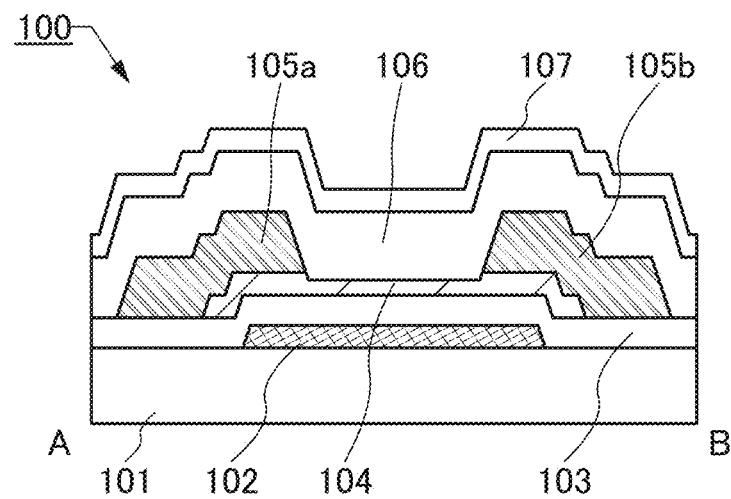

FIG. 16A is a schematic top view of a transistor 100 described below as an example. FIG. 16B is a schematic cross-sectional view of the transistor 100 taken along the section line A-B in FIG. 16A. The transistor 100 described as an example in this structural example is a bottom-gate transistor.

The transistor 100 includes a gate electrode 102 over a substrate 101, an insulating layer 103 over the substrate 101 and the gate electrode 102, an oxide semiconductor layer 104 over the insulating layer 103, which overlaps with the gate electrode 102, and a pair of electrodes 105a and 105b in contact with the top surface of the oxide semiconductor layer 104. Further, an insulating layer 106 is provided to cover the insulating layer 103, the oxide semiconductor layer 104, and the pair of electrodes 105a and 105b, and an insulating layer 107 is provided over the insulating layer 106.

<<Substate 101>>

There is no particular limitation on the property of a material and the like of the substrate 101 as long as the material has heat resistance enough to withstand at least heat treatment which will be performed later. For example, a glass substrate, a ceramic substrate, a quartz substrate, a sapphire substrate, or an yttria-stabilized zirconia (YSZ) substrate may be used as the substrate 101. Alternatively, a single crystal semiconductor substrate or a polycrystalline semiconductor substrate made of silicon, silicon carbide, or the like, a compound semiconductor substrate made of silicon germanium or the like, an SOI substrate, or the like can be used as the substrate 101. Still alternatively, any of these substrates provided with a semiconductor element may be used as the substrate 101.

Still alternatively, a flexible substrate such as a plastic substrate may be used as the substrate 101, and the transistor 100 may be provided directly on the flexible substrate. Further alternatively, a separation layer may be provided between the substrate 101 and the transistor 100. The separation layer can be used when part or the whole of the transistor is formed over the separation layer and separated from the substrate 101 and transferred to another substrate. Thus, the transistor 100 can be transferred to a substrate having low heat resistance or a flexible substrate.

<<Gate Electrode 102>>

The gate electrode 102 can be formed using a metal selected from aluminum, chromium, copper, tantalum, titanium, molybdenum, and tungsten; an alloy containing any of these metals as a component; an alloy containing any of these metals in combination; or the like. Further, one or more metals selected from manganese and zirconium may be used. Furthermore, the gate electrode 102 may have a single-layer structure or a stacked-layer structure of two or more layers. For example, a single-layer structure of an aluminum film containing silicon, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in this order, and the like can be given. Alternatively, an alloy film containing aluminum and one or more metals selected from titanium, tantalum, tungsten, molybdenum, chromium, neodymium, and scandium; or a nitride film of the alloy film may be used.

The gate electrode 102 can also be formed using a light-transmitting conductive material such as indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon oxide is added. It is also possible to have a stacked-layer structure formed using the above light-transmitting conductive material and the above metal.

Further, an In—Ga—Zn-based oxynitride semiconductor film, an In—Sn-based oxynitride semiconductor film, an In—Ga-based oxynitride semiconductor film, an In—Zn-based oxynitride semiconductor film, a Sn-based oxynitride semiconductor film, an In-based oxynitride semiconductor film, a film of metal nitride (such as InN or ZnN), or the like may be provided between the gate electrode 102 and the insulating layer 103. These films each have a work function higher than or equal to 5 eV, preferably higher than or equal to 5.5 eV, which is higher than the electron affinity of the oxide semiconductor. Thus, the threshold voltage of the transistor including an oxide semiconductor can be shifted in the positive direction, and what is called a normally-off switching element can be achieved. For example, in the case of using an In—Ga—Zn-based oxynitride semiconductor film, an In—Ga—Zn-based oxynitride semiconductor film having a higher nitrogen concentration than at least the oxide semiconductor layer 104, specifically, an In—Ga—Zn-based oxynitride semiconductor film having a nitrogen concentration of 7 at. % or higher is used.

<<Insulating Layer 103>>

The insulating layer 103 functions as a gate insulating film. The insulating layer 103 in contact with the bottom surface of the oxide semiconductor layer 104 is preferably an amorphous film.

The insulating layer 103 may be formed to have a single-layer structure or a stacked-layer structure using, for example, one or more of silicon oxide, silicon oxynitride, silicon nitride oxide, silicon nitride, aluminum oxide, hafnium oxide, gallium oxide, Ga—Zn-based metal oxide, silicon nitride, and the like.

The insulating layer 103 may be formed using a high-k material such as hafnium silicate (HfSiO$_x$), hafnium silicate to which nitrogen is added (HfSi$_x$O$_y$N$_z$), hafnium aluminate to which nitrogen is added (HfAl$_x$O$_y$N$_z$), hafnium oxide, or yttrium oxide, so that gate leakage current of the transistor can be reduced.

<<Pair of Electrodes 105a and 105b>>

The pair of electrodes 105a and 105b function as a source electrode and a drain electrode of the transistor.

The pair of electrodes 105a and 105b can be formed to have a single-layer structure or a stacked-layer structure using, as a conductive material, any of metals such as aluminum, titanium, chromium, nickel, copper, yttrium, zirconium, molybdenum, silver, tantalum, and tungsten, or an alloy containing any of these metals as its main component. For example, a single-layer structure of an aluminum film containing silicon, a two-layer structure in which a titanium film is stacked over an aluminum film, a two-layer structure in which a titanium film is stacked over a tungsten film, a two-layer structure in which a copper film is stacked over a copper-magnesium-aluminum alloy film, a three-layer structure in which a titanium film or a titanium nitride film, an aluminum film or a copper film, and a titanium film or a titanium nitride film are stacked in this order, a three-layer structure in which a molybdenum film or a molybdenum nitride film, an aluminum film or a copper film, and a molybdenum film or a molybdenum nitride film are stacked in this order, and the like can be given. Note that a transparent conductive material containing indium oxide, tin oxide, or zinc oxide may be used.

<<Insulating Layer 106, 107>>

The insulating layer 106 is preferably formed using an oxide insulating film containing oxygen at a higher proportion than oxygen in the stoichiometric composition. Part of oxygen is released by heating from the oxide insulating film containing oxygen at a higher proportion than oxygen in the stoichiometric composition. The oxide insulating film containing oxygen at a higher proportion than oxygen in the stoichiometric composition is an oxide insulating film in which the amount of released oxygen converted into oxygen atoms is greater than or equal to $1.0 \times 10^{18}$ atoms/cm$^3$, preferably greater than or equal to $3.0 \times 10^{20}$ atoms/cm$^3$ in thermal desorption spectroscopy (TDS) analysis.

As the insulating layer 106, a silicon oxide film, a silicon oxynitride film, or the like can be formed.

Note that the insulating layer 106 also functions as a film which relieves damage to the oxide semiconductor layer 104 at the time of forming the insulating layer 107 later.

Alternatively, an oxide film transmitting oxygen may be provided between the insulating layer 106 and the oxide semiconductor layer 104.

As the oxide film transmitting oxygen, a silicon oxide film, a silicon oxynitride film, or the like can be formed. Note that in this specification, a "silicon oxynitride film" refers to a film that contains oxygen at a higher proportion than nitrogen, and a "silicon nitride oxide film" refers to a film that contains nitrogen at a higher proportion than oxygen.

The insulating layer 107 can be formed using an insulating film having a blocking effect against oxygen, hydrogen, water, and the like. It is possible to prevent outward diffusion of oxygen from the oxide semiconductor layer 104 and entry of hydrogen, water, or the like into the oxide semiconductor layer 104 from the outside by providing the insulating layer 107 over the insulating layer 106. As for the insulating film having a blocking effect against oxygen, hydrogen, water, and the like, a silicon nitride film, a silicon nitride oxide film, an aluminum oxide film, an aluminum oxynitride film, a gallium oxide film, a gallium oxynitride film, an yttrium oxide film, an yttrium oxynitride film, a hafnium oxide film, and a hafnium oxynitride film can be given as examples.

<Example of Manufacturing Method of Transistor>

Next, an example of a manufacturing method of the transistor 100 illustrated in FIGS. 16A and 16B will be described.

Figure 17A:
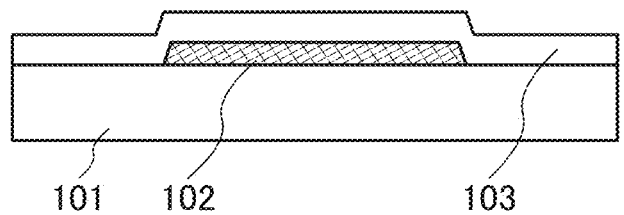
FIGS. 17A to 17D illustrate an example of a method for manufacturing a transistor of one embodiment of the present invention.

First, as illustrated in FIG. 17A, the gate electrode 102 is formed over the substrate 101, and the insulating layer 103 is formed over the gate electrode 102.

Here, a glass substrate is used as the substrate 101.

<<Formation of Gate Electrode>>

A formation method of the gate electrode 102 is described below. First, a conductive film is formed by a sputtering method, a CVD method, an evaporation method, or the like and then a resist mask is formed over the conductive film using a first photomask by a photolithography process. Then, part of the conductive film is etched using the resist mask to form the gate electrode 102. After that, the resist mask is removed.

Note that instead of the above formation method, the gate electrode 102 may be formed by an electrolytic plating method, a printing method, an ink-jet method, or the like.

<<Formation of Gate Insulating Layer>>

The insulating layer 103 is formed by a sputtering method, a CVD method, an evaporation method, or the like.

In the case where the insulating layer 103 is formed using a silicon oxide film, a silicon oxynitride film, or a silicon nitride oxide film, a deposition gas containing silicon and an oxidizing gas are preferably used as a source gas. Typical examples of the deposition gas containing silicon include silane, disilane, trisilane, and silane fluoride. As the oxidizing gas, oxygen, ozone, dinitrogen monoxide, and nitrogen dioxide can be given as examples.

In the case of forming a silicon nitride film as the insulating layer 103, it is preferable to use a two-step formation method. First, a first silicon nitride film with a small number of defects is formed by a plasma CVD method in which a mixed gas of silane, nitrogen, and ammonia is used as a source gas. Then, a second silicon nitride film in which the hydrogen concentration is low and hydrogen can be blocked is formed by switching the source gas to a mixed gas of silane and nitrogen. With such a formation method, a silicon nitride film with a small number of defects and a blocking property against hydrogen can be formed as the insulating layer 103.

Moreover, in the case of forming a gallium oxide film as the insulating layer 103, a metal organic chemical vapor deposition (MOCVD) method can be employed.

<<Formation of Oxide Semiconductor Layer>>

Figure 17B:
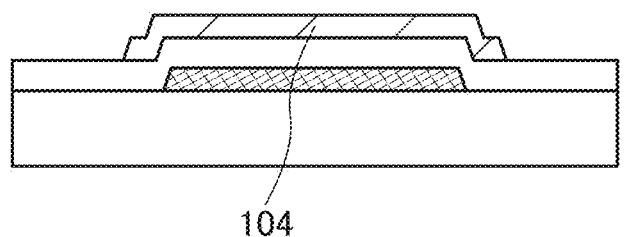

Next, as illustrated in FIG. 17B, the oxide semiconductor layer 104 is formed over the insulating layer 103.

A formation method of the oxide semiconductor layer 104 is described below. First, an oxide semiconductor film is formed. Then, a resist mask is formed over the oxide semiconductor film using a second photomask by a photolithography process. Then, part of the oxide semiconductor film is etched using the resist mask to form the oxide semiconductor layer 104. After that, the resist mask is removed.

After that, heat treatment may be performed. In such a case, the heat treatment is preferably performed under an atmosphere containing oxygen.

<<Formation of Pair of Electrodes>>

Figure 17C:
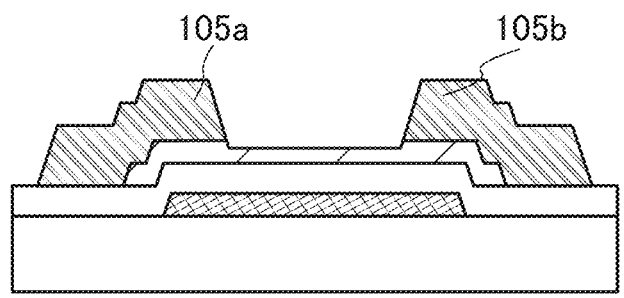

Next, as illustrated in FIG. 17C, the pair of electrodes 105a and 105b is formed.

A formation method of the pair of electrodes 105a and 105b is described below. First, a conductive film is formed by a sputtering method, a CVD method, an evaporation method, or the like. Then, a resist mask is formed over the conductive film using a third photomask by a photolithography process. Then, part of the conductive film is etched using the resist mask to form the pair of electrodes 105a and 105b. After that, the resist mask is removed.

Note that as illustrated in FIG. 17B, an upper part of the oxide semiconductor layer 104 is in some cases partly etched and thinned by the etching of the conductive film. For this reason, the oxide semiconductor layer 104 is preferably formed thick.

<<Formation of Insulating Layer>>

Figure 17D:
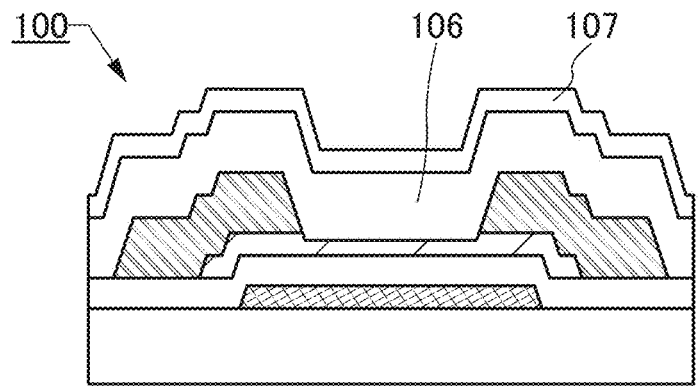

Next, as illustrated in FIG. 17D, the insulating layer 106 is formed over the oxide semiconductor layer 104 and the pair of electrodes 105a and 105b, and the insulating layer 107 is successively formed over the insulating layer 106.

In the case where the insulating layer 106 is formed using a silicon oxide film or a silicon oxynitride film, a deposition gas containing silicon and an oxidizing gas are preferably used as a source gas. Typical examples of the deposition gas containing silicon include silane, disilane, trisilane, and silane fluoride. As the oxidizing gas, oxygen, ozone, dinitrogen monoxide, and nitrogen dioxide can be given as examples.

For example, a silicon oxide film or a silicon oxynitride film is formed under the conditions as follows: the substrate placed in a treatment chamber of a plasma CVD apparatus, which is vacuum-evacuated, is held at a temperature higher than or equal to 180° C. and lower than or equal to 260° C., preferably higher than or equal to 200° C. and lower than or equal to 240° C., the pressure is greater than or equal to 100 Pa and less than or equal to 250 Pa, preferably greater than or equal to 100 Pa and less than or equal to 200 Pa with introduction of a source gas into the treatment chamber, and high-frequency power higher than or equal to 0.17 W/cm$^2$ and lower than or equal to 0.5 W/cm$^2$, preferably higher than or equal to 0.25 W/cm$^2$ and lower than or equal to 0.35 W/cm$^2$ is supplied to an electrode provided in the treatment chamber.

As the film formation conditions, the high-frequency power having the above power density is supplied to the treatment chamber having the above pressure, whereby the decomposition efficiency of the source gas in plasma is increased, oxygen radicals are increased, and oxidation of the source gas is promoted; therefore, oxygen is contained in the oxide insulating film at a higher proportion than oxygen in the stoichiometric composition. However, in the case where the substrate temperature is within the above temperature range, the bond between silicon and oxygen is weak, and accordingly, part of oxygen is released by heating. Thus, it is possible to form an oxide insulating film which contains oxygen at a higher proportion than oxygen in the stoichiometric composition and from which part of oxygen is released by heating.

Further, in the case of providing an oxide insulating film between the oxide semiconductor layer 104 and the insulating layer 106, the oxide insulating film serves as a protective film for the oxide semiconductor layer 104 in the steps of forming the insulating layer 106. Thus, the insulating layer 106 can be formed using the high-frequency power having a high power density while damage to the oxide semiconductor layer 104 is reduced.

For example, a silicon oxide film or a silicon oxynitride film is formed as the oxide insulating film under the conditions as follows: the substrate placed in a treatment chamber of a plasma CVD apparatus, which is vacuum-evacuated, is held at a temperature higher than or equal to 180° C. and lower than or equal to 400° C., preferably higher than or equal to 200° C. and lower than or equal to 370° C., the pressure is greater than or equal to 20 Pa and less than or equal to 250 Pa, preferably greater than or equal to 100 Pa and less than or equal to 250 Pa with introduction of a source gas into the treatment chamber, and high-frequency power is supplied to an electrode provided in the treatment chamber. Further, when the pressure in the treatment chamber is greater than or equal to 100 Pa and less than or equal to 250 Pa, damage to the oxide semiconductor layer 104 can be reduced.

A deposition gas containing silicon and an oxidizing gas are preferably used as a source gas of the oxide insulating film. Typical examples of the deposition gas containing silicon include silane, disilane, trisilane, and silane fluoride. As the oxidizing gas, oxygen, ozone, dinitrogen monoxide, and nitrogen dioxide can be given as examples.

The insulating layer 107 can be formed by a sputtering method, a CVD method, or the like.

In the case where the insulating layer 107 is formed using a silicon nitride film or a silicon nitride oxide film, a deposition gas containing silicon, an oxidizing gas, and a gas containing nitrogen are preferably used as a source gas. Typical examples of the deposition gas containing silicon include silane, disilane, trisilane, and silane fluoride. As the oxidizing gas, oxygen, ozone, dinitrogen monoxide, and nitrogen dioxide can be given as examples. As the gas containing nitrogen, nitrogen and ammonia can be given as examples.

Through the above process, the transistor 100 can be formed.

<Modification Example of Transistor 100>

A structural example of a transistor, which is partly different from the transistor 100, will be described below.

<<Modification Example>>1

Figure 18A:
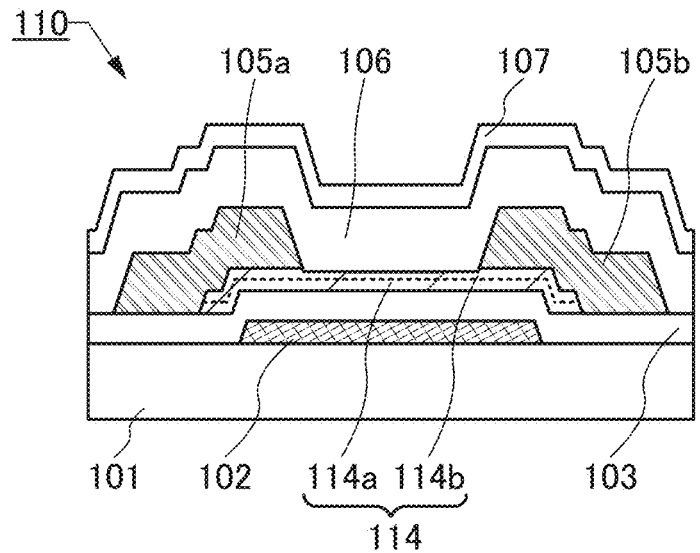
FIGS. 18A and 18B illustrate structural examples of a transistor of one embodiment of the present invention.

FIG. 18A is a schematic cross-sectional view of a transistor 110 described as an example below. The transistor 110 is different from the transistor 100 in the structure of an oxide semiconductor layer.

In an oxide semiconductor layer 114 included in the transistor 110, an oxide semiconductor layer 114a and an oxide semiconductor layer 114b are stacked.

Since a boundary between the oxide semiconductor layer 114a and the oxide semiconductor layer 114b is unclear in some cases, the boundary is shown by a dashed line in FIG. 18A and the like.

The oxide semiconductor film of one embodiment of the present invention can be applied to one or both of the oxide semiconductor layers 114a and 114b.

Typical examples of a material that can be used for the oxide semiconductor layer 114a are an In—Ga oxide, an In—Zn oxide, and an In—M—Zn oxide (M is Al, Ti, Ga, Y, Zr, La, Ce, Nd, or HO. When an In—M—Zn oxide is used for the oxide semiconductor layer 114a, the atomic ratio between In and M is preferably as follows: the atomic percentage of In is less than 50 at. % and the atomic percentage of M is greater than or equal to 50 at. %; further preferably, the atomic percentage of In is less than 25 at. % and the atomic percentage of M is greater than or equal to 75 at. %. Further, a material having an energy gap of 2 eV or more, preferably 2.5 eV or more, further preferably 3 eV or more is used for the oxide semiconductor layer 114a, for example.

For example, the oxide semiconductor layer 114b contains In or Ga; the oxide semiconductor layer 114b contains, for example, a material typified by an In—Ga oxide, an In—Zn oxide, or an In—M—Zn oxide (M is Al, Ti, Ga, Y, Zr, La, Ce, Nd, or HO. In addition, the energy of the conduction band minimum of the oxide semiconductor layer 114b is closer to the vacuum level than that of the oxide semiconductor layer 114a is. The difference between the energy of the conduction band minimum of the oxide semiconductor layer 114b and the energy of the conduction band minimum of the oxide semiconductor layer 114a is preferably 0.05 eV or more, 0.07 eV or more, 0.1 eV or more, or 0.15 eV or more and 2 eV or less, 1 eV or less, 0.5 eV or less, or 0.4 eV or less.

When an In—M—Zn oxide is used for the oxide semiconductor layer 114b, for example, the atomic ratio between In and M is preferably as follows: the atomic percentage of In is greater than or equal to 25 at. % and the atomic percentage of M is less than 75 at. %; further preferably, the atomic percentage of In is greater than or equal to 34 at. % and the atomic percentage of M is less than 66 at. %.

For the oxide semiconductor layer 114a, an In—Ga—Zn oxide containing In, Ga, and Zn at an atomic ratio of 1:1:1 or 3:1:2 can be used, for example. Further, for the oxide semiconductor layer 114b, an In—Ga—Zn oxide containing In, Ga, and Zn at an atomic ratio of 1:3:2, 1:6:4, or 1:9:6 can be used. Note that the atomic ratio of each of the oxide semiconductor layers 114a and 114b varies within a range of ±20% of the above atomic ratio as an error.

When an oxide containing a large amount of Ga that serves as a stabilizer is used for the oxide semiconductor layer 114b provided over the oxide semiconductor layer 114a, oxygen can be prevented from being released from the oxide semiconductor layers 114a and 114b.

Note that, without limitation to those described above, a material with an appropriate composition may be used depending on required semiconductor characteristics and electrical characteristics (e.g., field-effect mobility and threshold voltage) of a transistor. Further, in order to obtain required semiconductor characteristics of a transistor, it is preferable that the carrier density, the impurity concentration, the defect density, the atomic ratio of a metal element to oxygen, the interatomic distance, the density, and the like of the oxide semiconductor layers 114a and 114b be set to be appropriate.

Although a structure in which two oxide semiconductor layers are stacked is described above as an example of the oxide semiconductor layer 114, a structure in which three or more oxide semiconductor layers are stacked can also be employed.

<<Modification Example>>2

Figure 18B:
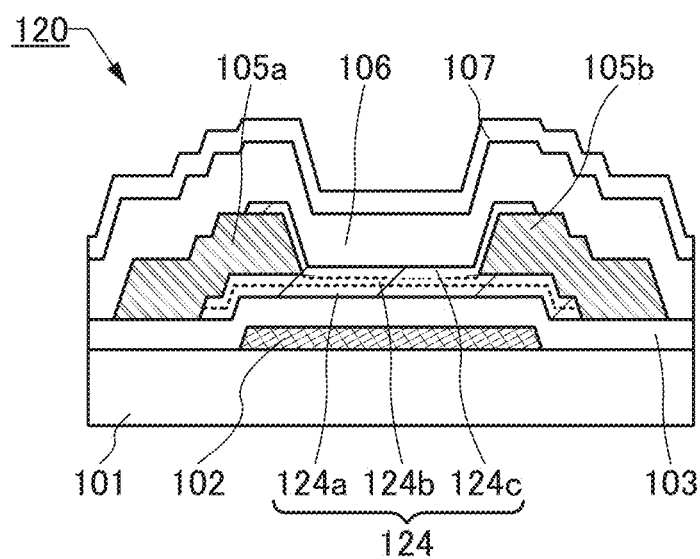

FIG. 18B is a schematic cross-sectional view of a transistor 120 described as an example below. The transistor 120 is different from the transistor 100 and the transistor 110 in the structure of an oxide semiconductor layer.

In an oxide semiconductor layer 124 included in the transistor 120, an oxide semiconductor layer 124a, an oxide semiconductor layer 124b, and an oxide semiconductor layer 124c are stacked in this order.

The oxide semiconductor layers 124a and 124b are stacked over the insulating layer 103. The oxide semiconductor layer 124c is provided in contact with the top surface of the oxide semiconductor layer 124b and the top surfaces and side surfaces of the pair of electrodes 105a and 105b.

The oxide semiconductor layer 124b can have a structure which is similar to that of the oxide semiconductor layer 114a described as an example in Modification Example 1, for example. Further, the oxide semiconductor layers 124a and 124c can each have a structure which is similar to that of the oxide semiconductor layer 114b described as an example in Modification Example 1, for example.

When an oxide containing a large amount of Ga that serves as a stabilizer is used for the oxide semiconductor layer 124a, which is provided under the oxide semiconductor layer 124b, and the oxide semiconductor layer 124c, which is provided over the oxide semiconductor layer 124b, for example, oxygen can be prevented from being released from the oxide semiconductor layer 124a, the oxide semiconductor layer 124b, and the oxide semiconductor layer 124c.

In the case where a channel is mainly formed in the oxide semiconductor layer 124b, for example, an oxide containing a large amount of In can be used for the oxide semiconductor layer 124b and the pair of electrodes 105a and 105b is provided in contact with the oxide semiconductor layer 124b; thus, the on-state current of the transistor 120 can be increased.

<Another Structural Example of Transistor>

A structural example of a top-gate transistor to which the oxide semiconductor film of one embodiment of the present invention can be applied will be described below.

Note that descriptions of components having structures or functions similar to those of the above, which are denoted by the same reference numerals, are omitted below.

<<Structural Example>>

Figure 19A:
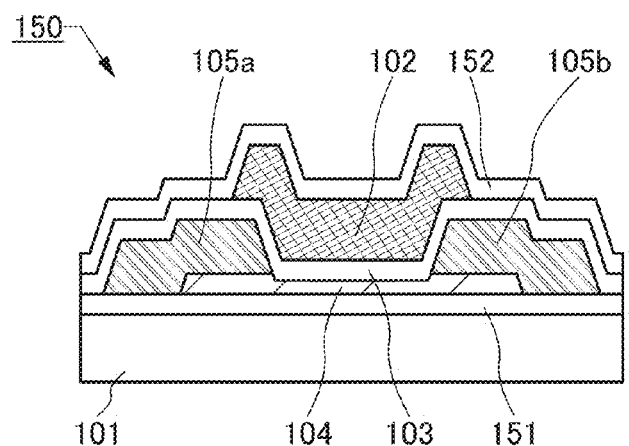
FIGS. 19A to 19C illustrate examples of a transistor of one embodiment of the present invention.

FIG. 19A is a schematic cross-sectional view of a top-gate transistor 150 which will be described below as an example.

The transistor 150 includes the oxide semiconductor layer 104 over the substrate 101 on which an insulating layer 151 is provided, the pair of electrodes 105a and 105b in contact with the top surface of the oxide semiconductor layer 104, the insulating layer 103 over the oxide semiconductor layer 104 and the pair of electrodes 105a and 105b, and the gate electrode 102 provided over the insulating layer 103 so as to overlap with the oxide semiconductor layer 104. Further, an insulating layer 152 is provided to cover the insulating layer 103 and the gate electrode 102.

The insulating layer 151 has a function of suppressing diffusion of impurities from the substrate 101 into the oxide semiconductor layer 104. For example, a structure similar to that of the insulating layer 107 can be employed. Note that the insulating layer 151 is not necessarily provided.

The insulating layer 152 can be formed using an insulating film having a blocking effect against oxygen, hydrogen, water, and the like in a manner similar to that of the insulating layer 107. Note that the insulating layer 107 is not necessarily provided.

<Modification Example<

A structural example of a transistor, which is partly different from the transistor 150, will be described below.

Figure 19B:
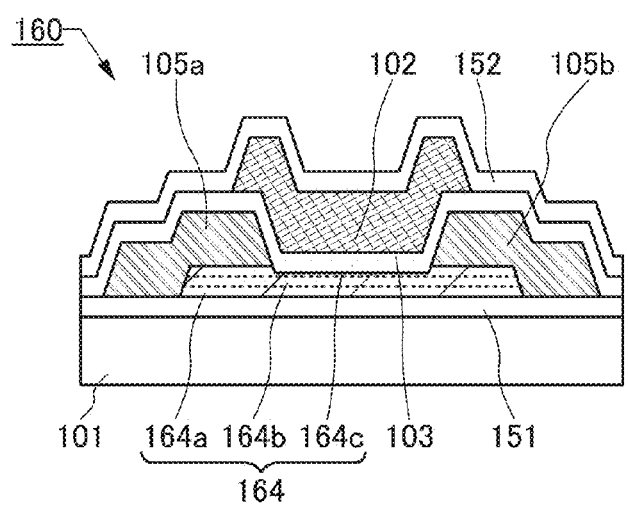

FIG. 19B is a schematic cross-sectional view of a transistor 160 described as an example below. The structure of an oxide semiconductor layer in the transistor 160 is different from that in the transistor 150.

In an oxide semiconductor layer 164 included in the transistor 160, an oxide semiconductor layer 164a, an oxide semiconductor layer 164b, and an oxide semiconductor layer 164c are stacked in this order.

The oxide semiconductor film of one embodiment of the present invention can be applied to one or more of the oxide semiconductor layer 164a, the oxide semiconductor layer 164b, and the oxide semiconductor layer 164c.

The oxide semiconductor layer 164b can have a structure which is similar to that of the oxide semiconductor layer 114a described as an example in Modification Example 1, for example. Further, the oxide semiconductor layers 164a and 164c can each have a structure which is similar to that of the oxide semiconductor layer 114b described as an example in Modification Example 1, for example.

An oxide containing a large amount of Ga that serves as a stabilizer is used for the oxide semiconductor layer 164a, which is provided under the oxide semiconductor layer 164b, and the oxide semiconductor layer 164c, which is provided over the oxide semiconductor layer 164b, for example; thus, oxygen can be prevented from being released from the oxide semiconductor layer 164a, the oxide semiconductor layer 164b, and the oxide semiconductor layer 164c.

The oxide semiconductor layer 164 can be formed in the following manner: the oxide semiconductor layer 164c and the oxide semiconductor layer 164b are obtained by etching, so that an oxide semiconductor film to be the oxide semiconductor layer 164a is exposed; and the oxide semiconductor film is processed into the oxide semiconductor layer 164a by a dry etching method. In that case, a reaction product of the oxide semiconductor film is attached to side surfaces of the oxide semiconductor layers 164b and 164c to form a sidewall protective layer (also referred to as a rabbit ear) in some cases. Note that the reaction product is attached by a sputtering phenomenon or through plasma at the time of the dry etching.

Figure 19C:
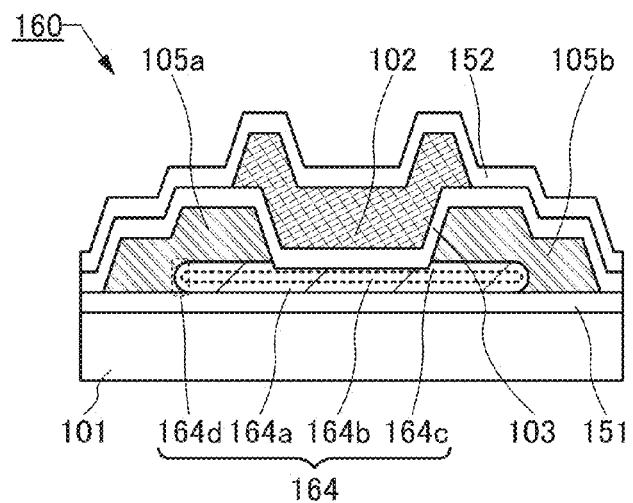

FIG. 19C is a schematic cross-sectional view of a transistor 160 in which a sidewall protective layer 164d is formed as a side surface of the oxide semiconductor layer 164 in the above manner.

The sidewall protective layer 164d mainly contains the same material as the oxide semiconductor layer 164a. In some cases, the sidewall protective layer 164d contains the constituent (e.g., silicon) of a layer provided under the oxide semiconductor layer 164a (the insulating layer 151 here).

With a structure in which a side surface of the oxide semiconductor layer 164b is covered with the sidewall protective layer 164d so as not to be in contact with the pair of electrodes 105a and 105b as illustrated in FIG. 19C, unintended leakage current of the transistor in an off state can be reduced particularly when a channel is mainly formed in the oxide semiconductor layer 164b; thus, a transistor having favorable off-state characteristics can be fabricated. Further, when a material containing a large amount of Ga that serves as a stabilizer is used for the sidewall protective layer 164d, oxygen can be effectively prevented from being released from the side surface of the oxide semiconductor layer 164b; thus, a transistor having excellent stability of electrical characteristics can be fabricated.

This embodiment can be combined with any of the other embodiments disclosed in this specification as appropriate.

(Embodiment 9)

Examples of a semiconductor and a semiconductor film which are preferably used for the region where a channel is formed in the transistor which is shown as an example in the above embodiment are described below.

An oxide semiconductor has a wide energy gap of 3.0 eV or more. A transistor including an oxide semiconductor film obtained by processing of the oxide semiconductor in an appropriate condition and a sufficient reduction in carrier density of the oxide semiconductor can have much lower leakage current between a source and a drain in an off state (off-state current) than a conventional transistor including silicon.

In the case where an oxide semiconductor film is used for a transistor, the thickness of the oxide semiconductor film is preferably greater than or equal to 2 nm and less than or equal to 40 nm.

An oxide semiconductor containing at least indium (In) or zinc (Zn) is preferably used. In particular, In and Zn are preferably contained. In addition, as a stabilizer for reducing variation in electrical characteristics of a transistor using the oxide semiconductor, one or more elements selected from gallium (Ga), tin (Sn), hafnium (HO, zirconium (Zr), titanium (Ti), scandium (Sc), yttrium (Y), and a lanthanoid (such as cerium (Ce), neodymium (Nd), or gadolinium (Gd)) is preferably contained.

As the oxide semiconductor, for example, an indium oxide, a tin oxide, a zinc oxide, an In—Zn-based oxide, a Sn—Zn-based oxide, an Al—Zn-based oxide, a Zn—Mg-based oxide, a Sn—Mg-based oxide, an In—Mg-based oxide, an In—Ga-based oxide, an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—Zr—Zn-based oxide, an In—Ti—Zn-based oxide, an In—Sc—Zn-based oxide, an In—Y—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide can be used.

Here, an "In—Ga—Zn-based oxide" means an oxide containing In, Ga, and Zn as main components and there is no limitation on the ratio of In:Ga:Zn. Further, a metal element in addition to In, Ga, and Zn may be contained.

Alternatively, a material represented by 1 $nMO_3(ZnO)_m$ (m>0, where m is not an integer) may be used as the oxide semiconductor. Note that M represents one or more metal elements selected from Ga, Fe, Mn, and Co, or the above-described element as a stabilizer. Alternatively, a material represented by $In_2SnO_5(ZnO)_n$ (n>0, where n is an integer) may be used as the oxide semiconductor.

For example, an In—Ga—Zn-based oxide with an atomic ratio of In:Ga:Zn=1:1:1, In:Ga:Zn=1:3:2, In:Ga:Zn=3:1:2, or In:Ga:Zn=2:1:3, or an oxide with an atomic ratio close to the above atomic ratios can be used.

When the oxide semiconductor film contains a large amount of hydrogen, the hydrogen and an oxide semiconductor are bonded to each other, so that part of the hydrogen serves as a donor and causes generation of an electron which is a carrier. As a result, the threshold voltage of the transistor shifts in the negative direction. Therefore, after formation of the oxide semiconductor film, it is preferable that dehydration treatment (dehydrogenation treatment) be performed to remove hydrogen or moisture from the oxide semiconductor film so that the oxide semiconductor film is highly purified to contain impurities as little as possible.

Note that oxygen in the oxide semiconductor film is also reduced by the dehydration treatment (dehydrogenation treatment) in some cases. Therefore, it is preferable that oxygen be added to the oxide semiconductor film to fill oxygen vacancies increased by the dehydration treatment (dehydrogenation treatment). In this specification and the like, supplying oxygen to an oxide semiconductor film may be expressed as oxygen adding treatment, or treatment for making the oxygen content of an oxide semiconductor film be in excess of that of the stoichiometric composition may be expressed as treatment for making an oxygen-excess state.

In this manner, hydrogen or moisture is removed from the oxide semiconductor film by the dehydration treatment (dehydrogenation treatment) and oxygen vacancies therein are filled by the oxygen adding treatment, whereby the oxide semiconductor film can be turned into an i-type (intrinsic) oxide semiconductor film or a substantially i-type (intrinsic) oxide semiconductor film which is extremely close to an i-type oxide semiconductor film. Note that "substantially intrinsic" means that the oxide semiconductor film contains extremely few (close to zero) carriers derived from a donor and has a carrier density of lower than or equal to $1 \times 10^{17}/cm^3$, lower than or equal to $1 \times 10^{16}/cm^3$, lower than or equal to $1 \times 10^{15}/cm^3$, lower than or equal to $1 \times 10^{14}/cm^3$, or lower than or equal to $1 \times 10^{13}/cm^3$.

Thus, the transistor including an i-type or substantially i-type oxide semiconductor film can have extremely favorable off-state current characteristics. For example, the drain current at the time when the transistor including an oxide semiconductor film is in an off state can be less than or equal to $1 \times 10^{-18}$ A, preferably less than or equal to $1 \times 10^{-21}$ A, further preferably less than or equal to $1 \times 10^{-24}$ A at room temperature (about 25° C.); or less than or equal to $1 \times 10^{-15}$ A, preferably less than or equal to $1 \times 10^{-18}$ A, further preferably less than or equal to $1 \times 10^{-21}$ A at 85° C. An off state of a transistor refers to a state where gate voltage is sufficiently lower than the threshold voltage in an n-channel transistor. Specifically, the transistor is in an off state when the gate voltage is lower than the threshold voltage by 1 V or more, 2 V or more, or 3 V or more.

The oxide semiconductor film may be in a non-single-crystal state, for example. The non-single-crystal state is, for example, structured by at least one of c-axis aligned crystal (CAAC), polycrystal, microcrystal, and an amorphous part. The density of defect states of an amorphous part is higher than those of microcrystal and CAAC. The density of defect states of microcrystal is higher than that of CAAC. Note that an oxide semiconductor including CAAC is referred to as a CAAC-OS (c-axis aligned crystalline oxide semiconductor).

For example, the oxide semiconductor film may include a CAAC-OS. In the CAAC-OS, for example, c-axes are aligned, and a-axes and/or b-axes are not macroscopically aligned.

For example, the oxide semiconductor film may include microcrystal. Note that an oxide semiconductor including microcrystal is referred to as a microcrystalline oxide semiconductor. The microcrystalline oxide semiconductor film includes a microcrystal (also referred to as nanocrystal) with a size greater than or equal to 1 nm and less than 10 nm, for example.

For example, the oxide semiconductor film may include an amorphous part. Note that an oxide semiconductor including an amorphous part is referred to as an amorphous oxide semiconductor. An amorphous oxide semiconductor film, for example, has disordered atomic arrangement and no crystalline component. Alternatively, an amorphous oxide semiconductor film is, for example, absolutely amorphous and has no crystal part.

Note that the oxide semiconductor film may be a mixed film including any of a CAAC-OS, a microcrystalline oxide semiconductor, and an amorphous oxide semiconductor. The mixed film, for example, includes a region of an amorphous oxide semiconductor, a region of a microcrystalline oxide semiconductor, and a region of a CAAC-OS. Further, the mixed film may have a layered structure including a region of an amorphous oxide semiconductor, a region of a microcrystalline oxide semiconductor, and a region of a CAAC-OS, for example.

Note that the oxide semiconductor film may be in a single-crystal state, for example.

It is preferable that the oxide semiconductor film include a plurality of crystal parts, and in each of the crystal parts, a c-axis be aligned in a direction parallel to a normal vector of a surface where the oxide semiconductor film is formed or a normal vector of a surface of the oxide semiconductor film. Note that, among crystal parts, the directions of the a-axis and the b-axis of one crystal part may be different from those of another crystal part. An example of such an oxide semiconductor film is a CAAC-OS film.

In most cases, a crystal part in the CAAC-OS film fits inside a cube whose one side is less than 100 nm. In an image obtained with a transmission electron microscope (TEM), a boundary between crystal parts in the CAAC-OS film is not clear. Further, with the TEM, a grain boundary in the CAAC-OS film is not clearly found. Thus, in the CAAC-OS film, a reduction in electron mobility due to the grain boundary is suppressed.

In each of the crystal parts included in the CAAC-OS film, for example, a c-axis is aligned in a direction parallel to a normal vector of a surface where the CAAC-OS film is formed or a normal vector of a surface of the CAAC-OS film. Further, in each of the crystal parts, metal atoms are arranged in a triangular or hexagonal configuration when seen from the direction perpendicular to the a-b plane, and metal atoms are arranged in a layered manner or metal atoms and oxygen atoms are arranged in a layered manner when seen from the direction perpendicular to the c-axis. Note that, among crystal parts, the directions of the a-axis and the b-axis of one crystal part may be different from those of another crystal part. In this specification, a term "perpendicular" includes a range from 80° to 100°, preferably from 85° to 95°. In addition, a term "parallel" includes a range from −10° to 10°, preferably from −5° to 5°.

When the CAAC-OS film is analyzed by an out-of-plane method with an X-ray diffraction (XRD) apparatus, a peak appears at 2θ of around 31° in some cases. In the case of a crystal of $InGaZnO_4$, the peak at 2θ of around 31° indicates that the crystal of $InGaZnO_4$ has (009) plane alignment. Further, in the CAAC-OS film, a peak appears at 2θ of around 36° in some cases. In the case of a crystal of $Ga_2ZnO_4$, the peak at 2θ of around 36° indicates that the crystal of $Ga_2ZnO_4$ has (222) plane alignment. In the CAAC-OS film, it is preferable that the peak appear at 2θ of around 31° and do not appear at 2θ of around 36°.

For example, when the CAAC-OS film including a crystal of $InGaZnO_4$ is analyzed with an XRD apparatus by an in-plane method in which an X-ray enters a sample in a direction perpendicular to the c-axis, a peak appears at 2θ of around 56° in some cases. The peak at 2θ of around 56° is a diffraction peak of the (110) plane of a crystal of $InGaZnO_4$. Here, when analysis (φ scan) is performed with 2θ fixed at around 56° and with a sample rotated using a normal vector of a surface of the sample as an axis (φ axis), although six peaks having symmetry appear in the case of a single crystal oxide semiconductor in which the directions of an a-axis and a b-axis of one crystal part are the same as those of another crystal part, a peak is not clearly observed in the case of the CAAC-OS film.

In the CAAC-OS film, distribution of crystal parts is not necessarily uniform. For example, in the formation process of the CAAC-OS film, in the case where crystal growth occurs from a surface side of the oxide semiconductor film, the proportion of crystal parts in the vicinity of the surface of the oxide semiconductor film is higher than that in the vicinity of the surface where the oxide semiconductor film is formed in some cases. Further, when an impurity is added to the CAAC-OS film, crystallinity of the crystal part in a region to which the impurity is added is lowered in some cases.

Since the c-axes of the crystal parts included in the CAAC-OS film are aligned in the direction parallel to a normal vector of a surface where the CAAC-OS film is formed or a normal vector of a surface of the CAAC-OS film, the directions of the c-axes may be different from each other depending on the shape of the CAAC-OS film (the cross-sectional shape of the surface where the CAAC-OS film is formed or the cross-sectional shape of the surface of the CAAC-OS film). Note that the film deposition is accompanied with the formation of the crystal parts or followed by the formation of the crystal parts through crystallization treatment such as heat treatment. Hence, the c-axes of the crystal parts are aligned in the direction parallel to a normal vector of the surface where the CAAC-OS film is formed or a normal vector of the surface of the CAAC-OS film.

In a transistor using the CAAC-OS film, change in electrical characteristics due to irradiation with visible light or ultraviolet light is small. Thus, the transistor has high reliability.

For example, the CAAC-OS film can be formed by a sputtering method with a polycrystalline oxide semiconductor sputtering target. When ions collide with the sputtering target, a crystal region included in the sputtering target may be separated from the target by cleavage along an a-b plane; in other words, a sputtered particle having a plane parallel to the a-b plane (flat-plate-like sputtered particle or pellet-like sputtered particle) may flake off from the sputtering target. In that case, the flat-plate-like or pellet-like sputtered particle reaches a surface where the CAAC-OS film is formed while maintaining their crystal state, whereby the CAAC-OS film can be formed.

The flat-plate-like sputtered particle has, for example, an equivalent circle diameter of a plane parallel to the a-b plane of greater than or equal to 3 nm and less than or equal to 10 nm, and a thickness (length in the direction perpendicular to the a-b plane) of greater than or equal to 0.7 nm and less than 1 nm. Note that in the flat-plate-like sputtered particle, the plane parallel to the a-b plane may be a regular triangle or a regular hexagon. Here, the term "equivalent circle diameter" refers to the diameter of a perfect circle having the same area as the plane.

For the deposition of the CAAC-OS, the following conditions are preferably used.

When the substrate temperature during the deposition is increased, migration of the flat-plate-like sputtered particles which have reached the substrate occurs, so that a flat plane of each sputtered particle is attached to the substrate. At this time, the sputtered particles are positively charged, thereby being attached to the substrate while repelling each other; thus, the sputtered particles are not stacked unevenly, so that a CAAC-OS film with a uniform thickness can be deposited. Specifically, the substrate temperature during the deposition is preferably higher than or equal to 100° C. and lower than or equal to 740° C., more preferably higher than or equal to 200° C. and lower than or equal to 500° C.

By reducing the amount of impurities entering the CAAC-OS film during the deposition, the crystal state can be prevented from being broken by the impurities. For example, the concentration of impurities (e.g., hydrogen, water, carbon dioxide, or nitrogen) which exist in the deposition chamber may be reduced. Furthermore, the concentration of impurities in a deposition gas may be reduced. Specifically, a deposition gas whose dew point is −80° C. or lower, preferably −100° C. or lower is used.

Furthermore, it is preferable that the proportion of oxygen in the deposition gas be increased and the power be optimized in order to reduce plasma damage at the deposition. The proportion of oxygen in the deposition gas is 30 vol % or higher, preferably 100 vol %.

After the CAAC-OS film is deposited, heat treatment may be performed. The temperature of the heat treatment is higher than or equal to 100° C. and lower than or equal to 740° C., preferably higher than or equal to 200° C. and lower than or equal to 500° C. The heat treatment time is longer than or equal to 1 minute and shorter than or equal to 24 hours, preferably longer than or equal to 6 minutes and shorter than or equal to 4 hours. The heat treatment may be performed in an inert atmosphere or an oxidizing atmosphere. It is preferable to perform heat treatment in an inert atmosphere and then perform heat treatment in an oxidizing atmosphere. The heat treatment in an inert atmosphere can reduce the concentration of impurities in the CAAC-OS in a short time. At the same time, the heat treatment in an inert atmosphere may generate oxygen vacancies in the CAAC-OS. In such a case, the heat treatment in an oxidizing atmosphere can reduce the oxygen vacancies. The heat treatment can further increase the crystallinity of the CAAC-OS. Note that the heat treatment may be performed under a reduced pressure, such as 1000 Pa or lower, 100 Pa or lower, 10 Pa or lower, or 1 Pa or lower. The heat treatment under the reduced pressure can reduce the concentration of impurities in the CAAC-OS in a shorter time.

As an example of the sputtering target, an In—Ga—Zn—O compound target is described below.

The In—Ga—Zn—O compound target which is polycrystalline is made by mixing $InO_X$ powder, $GaO_Y$ powder, and $ZnO_Z$ powder in a predetermined molar ratio, applying pressure, and performing heat treatment at a temperature higher than or equal to 1000° C. and lower than or equal to 1500° C. Note that X, Y, and Z are given positive numbers. Here, the predetermined molar ratio of $InO_X$ powder to $GaO_Y$ powder and $ZnO_Z$ powder is, for example, 1:1:1, 1:1:2, 1:3:2, 1:9:6, 2:1:3, 2:2:1, 3:1:1, 3:1:2, 3:1:4, 4:2:3, 8:4:3, or a ratio close to these ratios. The kinds of powder and the molar ratio for mixing powder may be determined as appropriate depending on the desired sputtering target.

Alternatively, the CAAC-OS may be formed by the following method.

First, a first oxide semiconductor film is formed to a thickness of greater than or equal to 1 nm and less than 10 nm. The first oxide semiconductor film is formed by a sputtering method. Specifically, the substrate temperature is set to higher than or equal to 100° C. and lower than or equal to 500° C., preferably higher than or equal to 150° C. and lower than or equal to 450° C., and the proportion of oxygen in a deposition gas is set to higher than or equal to 30 vol %, preferably 100 vol %.

Next, heat treatment is performed so that the first oxide semiconductor film becomes a first CAAC-OS with high crystallinity. The temperature of the heat treatment is higher than or equal to 350° C. and lower than or equal to 740° C., preferably higher than or equal to 450° C. and lower than or equal to 650° C. The heat treatment time is longer than or equal to 1 minute and shorter than or equal to 24 hours, preferably longer than or equal to 6 minutes and shorter than or equal to 4 hours. The heat treatment may be performed in an inert atmosphere or an oxidizing atmosphere. It is preferable to perform heat treatment in an inert atmosphere and then perform heat treatment in an oxidizing atmosphere. The heat treatment in an inert atmosphere can reduce the concentration of impurities in the first oxide semiconductor film in a short time. At the same time, the heat treatment in an inert atmosphere may generate oxygen vacancies in the first oxide semiconductor film. In such a case, the heat treatment in an oxidizing atmosphere can reduce the oxygen vacancies. Note that the heat treatment may be performed under a reduced pressure, such as 1000 Pa or lower, 100 Pa or lower, 10 Pa or lower, or 1 Pa or lower. The heat treatment under the reduced pressure can reduce the concentration of impurities in the first oxide semiconductor film in a shorter time.

The first oxide semiconductor film with a thickness of greater than or equal to 1 nm and less than 10 nm can be easily crystallized by heat treatment as compared to the case where the first oxide semiconductor film has a thickness of greater than or equal to 10 nm.

Although the oxide semiconductor film which is described in the above embodiment can be formed by a sputtering method, the oxide semiconductor film may be formed by another method, e.g., a thermal CVD method. Examples of a thermal CVD method include a metal organic chemical vapor deposition (MOCVD) method and an atomic layer deposition (ALD) method.

A thermal CVD method has an advantage that no defect due to plasma damage is generated because it does not utilize plasma for forming a film.

Deposition by a thermal CVD method may be performed in such a manner that the pressure in a chamber is set to an atmospheric pressure or a reduced pressure, and a source gas and an oxidizer are supplied to the chamber at a time and react with each other in the vicinity of the substrate or over the substrate.

Deposition by an ALD method may be performed in such a manner that the pressure in a chamber is set to an atmospheric pressure or a reduced pressure, source gases for reaction are sequentially introduced into the chamber, and then the sequence of the gas introduction is repeated. For example, two or more kinds of source gases are sequentially supplied to the chamber by switching respective switching valves (also referred to as high-speed valves). For example, a first source gas is introduced, an inert gas (e.g., argon or nitrogen) or the like is introduced at the same time as or after the introduction of the first gas so that the source gases are not mixed, and then a second source gas is introduced. Note that in the case where the first source gas and the inert gas are introduced at a time, the inert gas serves as a carrier gas, and the inert gas may also be introduced at the same time as the introduction of the second source gas. Alternatively, the first source gas may be exhausted by vacuum evacuation instead of the introduction of the inert gas, and then the second source gas may be introduced. The first source gas is adsorbed on the surface of the substrate to form a first single-atomic layer; then the second source gas is introduced to react with the first single-atomic layer; as a result, a second single-atomic layer is stacked over the first single-atomic layer, so that a thin film is formed. The sequence of the gas introduction is repeated plural times until a desired thickness is obtained, whereby a thin film with excellent step coverage can be formed. The thickness of the thin film can be adjusted by the number of repetition times of the sequence of the gas introduction; therefore, an ALD method makes it possible to accurately adjust a thickness and thus is suitable for manufacturing a minute FET.

For example, in the case where an InGaZnO$_X$ (X>0) film is formed, trimethylindium, trimethylgallium, and diethylzinc are used. Note that the chemical formula of trimethylindium is $(CH_3)_3In$. The chemical formula of trimethylgallium is $(CH_3)_3Ga$. The chemical formula of diethylzinc is $(CH_3)_2Zn$. Without limitation to the above combination, triethylgallium (chemical formula: $(C_2H_5)_3Ga$) can be used instead of trimethylgallium and dimethylzinc (chemical formula: $(C_2H_5)_2Zn$) can be used instead of diethylzinc.

For example, in the case where an oxide semiconductor film, e.g., an InGaZnO$_X$ (X>0) film is formed using a deposition apparatus employing ALD, an $In(CH_3)_3$ gas and an $O_3$ gas are sequentially introduced plural times to form an $InO_2$ layer, a $Ga(CH_3)_3$ gas and an $O_3$ gas are introduced at a time to form a GaO layer, and then a $Zn(CH_3)_2$ gas and an $O_3$ gas are introduced at a time to form a ZnO layer. Note that the order of these layers is not limited to this example. A mixed compound layer such as an $InGaO_2$ layer, an $InZnO_2$ layer, a GaInO layer, a ZnInO layer or a GaZnO layer may be formed by mixing of these gases. Note that although an $H_2O$ gas which is obtained by bubbling with an inert gas such as Ar may be used instead of an $O_3$ gas, it is preferable to use an $O_3$ gas, which does not contain H. Further, instead of an $In(CH_3)_3$ gas, an $In(C_2H_5)_3$ gas may be used. Instead of a $Ga(CH_3)_3$ gas, a $Ga(C_2H_5)_3$ gas may be used. Instead of an $In(CH_3)_3$ gas, an $In(C_2H_5)_3$ may be used. Furthermore, a $Zn(CH_3)_2$ gas may be used.

Next, a second oxide semiconductor film having the same composition as the first oxide semiconductor film is formed to a thickness of greater than or equal to 10 nm and less than or equal to 50 nm. The second oxide semiconductor film is formed by a sputtering method. Specifically, the substrate temperature is set to higher than or equal to 100° C. and lower than or equal to 500° C., preferably higher than or equal to 150° C. and lower than or equal to 450° C., and the proportion of oxygen in a deposition gas is set to higher than or equal to 30 vol %, preferably 100 vol %.

Next, heat treatment is performed so that solid phase growth of the second oxide semiconductor film from the first CAAC-OS occurs, whereby the second oxide semiconductor film is turned into a second CAAC-OS having high crystallinity. The temperature of the heat treatment is higher than or equal to 350° C. and lower than or equal to 740° C., preferably higher than or equal to 450° C. and lower than or equal to 650° C. The heat treatment time is longer than or equal to 1 minute and shorter than or equal to 24 hours, preferably longer than or equal to 6 minutes and shorter than or equal to 4 hours. The heat treatment may be performed in an inert atmosphere or an oxidizing atmosphere. It is preferable to perform heat treatment in an inert atmosphere and then perform heat treatment in an oxidizing atmosphere. The heat treatment in an inert atmosphere can reduce the concentration of impurities in the second oxide semiconductor film in a short time. At the same time, the heat treatment in an inert atmosphere may generate oxygen vacancies in the second oxide semiconductor film. In such a case, the heat treatment in an oxidizing atmosphere can reduce the oxygen vacancies. Note that the heat treatment may be performed under a reduced pressure, such as 1000 Pa or lower, 100 Pa or lower, 10 Pa or lower, or 1 Pa or lower. The heat treatment under the reduced pressure can reduce the concentration of impurities in the second oxide semiconductor film in a shorter time.

In the above-described manner, a CAAC-OS film having a total thickness of 10 nm or more can be formed.

Further, the oxide semiconductor film may have a structure in which a plurality of oxide semiconductor films is stacked.

For example, a structure may be employed in which, between an oxide semiconductor film (referred to as a first layer for convenience) and a gate insulating film, a second layer which is formed using the constituent elements of the first layer and whose electron affinity is lower than that of the first layer by 0.2 eV or more is provided. In this case, when an electric field is applied from a gate electrode, a channel is formed in the first layer, and a channel is not formed in the second layer. The constituent elements of the first layer are the same as the constituent elements of the second layer, and thus interface scattering hardly occurs at the interface between the first layer and the second layer. Accordingly, when the second layer is provided between the first layer and the gate insulating film, the field-effect mobility of the transistor can be increased.

Further, in the case where a silicon oxide film, a silicon oxynitride film, a silicon nitride oxide film, or a silicon nitride film is used as the gate insulating film, silicon contained in the gate insulating film enters the oxide semiconductor film in some cases. When the oxide semiconductor film contains silicon, reductions in crystallinity and carrier mobility of the oxide semiconductor film occur, for example. Thus, it is preferable to provide the second layer between the first layer and the gate insulating film in order to reduce the concentration of silicon in the first layer where a channel is formed. For the same reason, it is preferable to provide a third layer which is formed using the constituent elements of the first layer and whose electron affinity is lower than that of the first layer by 0.2 eV or more so that the first layer is interposed between the second layer and the third layer.

Such a structure makes it possible to reduce and further prevent diffusion of impurities such as silicon to a region where a channel is formed, so that a highly reliable transistor can be obtained.

Note that in order to make the oxide semiconductor film a CAAC-OS, the concentration of silicon contained in the oxide semiconductor film is set to lower than or equal to $2.5\times10^{21}/cm^3$, preferably lower than $1.4\times10^{21}/cm^3$, more preferably lower than $4\times10^{19}/cm^3$, still more preferably lower than $2.0\times10^{18}/cm^3$. This is because the field-effect mobility of the transistor may be reduced when the concentration of silicon contained in the oxide semiconductor film is higher than or equal to $1.4\times10^{21}/cm^3$, and the oxide semiconductor film may be made amorphous at the interface between the oxide semiconductor film and a film in contact with the oxide semiconductor film when the concentration of silicon contained in the oxide semiconductor film is higher than or equal to $4.0\times10^{19}/cm^3$. Further, when the concentration of silicon contained in the oxide semiconductor film is lower than $2.0\times10^{18}/cm^3$, further improvement in reliability of the transistor and a reduction in density of states (DOS) in the oxide semiconductor film can be expected. Note that the concentration of silicon in the oxide semiconductor film can be measured by secondary ion mass spectrometry (SIMS).

This embodiment can be implemented in an appropriate combination with any of the other embodiments described in this specification.

(Embodiment 10)

In this embodiment, specific examples of electronic devices each of which is manufactured using the liquid crystal display device described in any of the above embodiments are described with reference to FIGS. 20A to 20C.

Examples of electronic devices to which one embodiment of the present invention can be applied include a television set (also referred to as a television or a television receiver), a monitor of a computer or the like, a camera such as a digital camera or a digital video camera, a digital photo frame, a mobile phone, a portable game machine, a portable information terminal, an audio reproducing device, a game machine (e.g., a pachinko machine or a slot machine), and a game console. FIGS. 20A to 20C illustrate specific examples of these electronic devices.

Figure 20A:
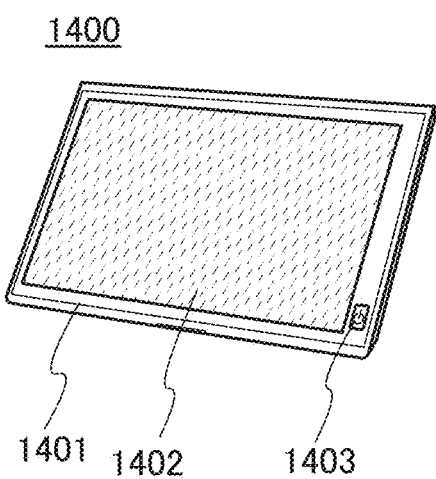
FIGS. 20A to 20C illustrate electronic devices of one embodiment of the present invention.

FIG. 20A illustrates a portable information terminal 1400 including a display portion. The portable information terminal 1400 includes a display portion 1402 and an operation button 1403 which are incorporated in a housing 1401. The liquid crystal display device of one embodiment of the present invention can be used for the display portion 1402.

Figure 20B:
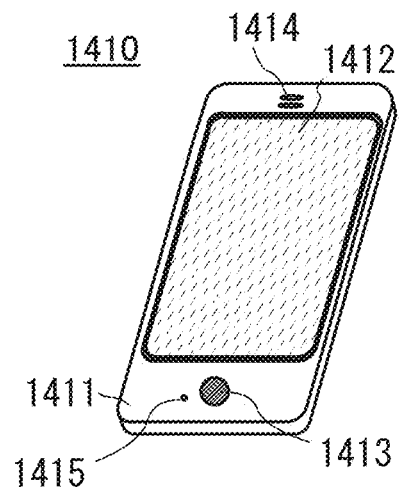

FIG. 20B illustrates a cellular phone 1410. The cellular phone 1410 includes a display portion 1412, an operation button 1413, a speaker 1414, and a microphone 1415 which are incorporated in a housing 1411. The liquid crystal display device of one embodiment of the present invention can be used for the display portion 1412.

Figure 20C:
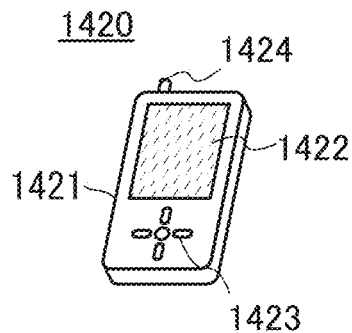

FIG. 20C illustrates an audio reproducing device 1420. The audio reproducing device 1420 includes a display portion 1422, an operation button 1423, and an antenna 1424 which are incorporated in a housing 1421. In addition, the antenna 1424 transmits and receives data via a wireless signal. The liquid crystal display device of one embodiment of the present invention can be used for the display portion 1422.

The display portions 1402, 1412, and 1422 each have a touch-input function. When a user touches a displayed button (not illustrated) which is displayed on the display portion 1402, 1412, or 1422 with his/her fingers or the like, the user can carry out operation on the screen and input of information.

When the liquid crystal display device shown in any of the above embodiments is used for the display portions 1402, 1412, and 1422, the display quality of the display portions 1402, 1412, and 1422 can be improved.

This embodiment can be implemented in appropriate combination with any of the structures described in the other embodiments.

(Embodiment 11)

In this embodiment, the significance of a reduction in refresh rate described in the above embodiments is explained.

The eye strain is divided into two categories: nerve strain and muscle strain. The nerve strain is caused by prolonged looking at light emitted from a liquid crystal display device or blinking images. This is because the brightness stimulates and fatigues a retina, optic nerves, and a brain. The muscle strain is caused by overuse of a ciliary muscle which works for adjusting the focus.

Figure 21A:
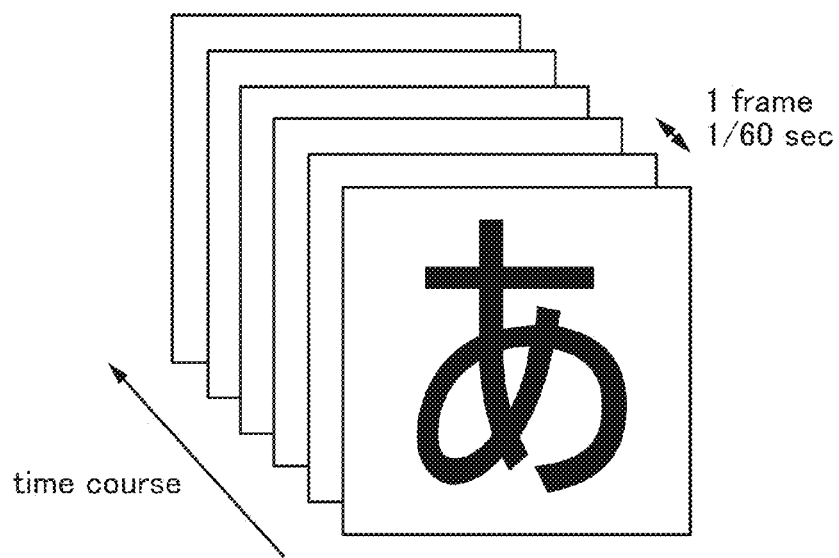
FIGS. 21A and 21B illustrate display of one embodiment of the present invention.

FIG. 21A is a schematic diagram illustrating display of a conventional liquid crystal display device. As illustrated in FIG. 21A, for the display of the conventional liquid crystal display device, image rewriting is performed 60 times per second. A prolonged looking at such a screen might stimulate a retina, optic nerves, and a brain of a user and lead to eye strain.

In one embodiment of the present invention, a transistor including an oxide semiconductor (e.g., a transistor including a CAAC-OS) is used in a pixel portion of a liquid crystal display device. Since the transistor has an extremely small off-state current, the luminance of the liquid crystal display device can be kept even when the frame frequency is decreased.

Figure 21B:
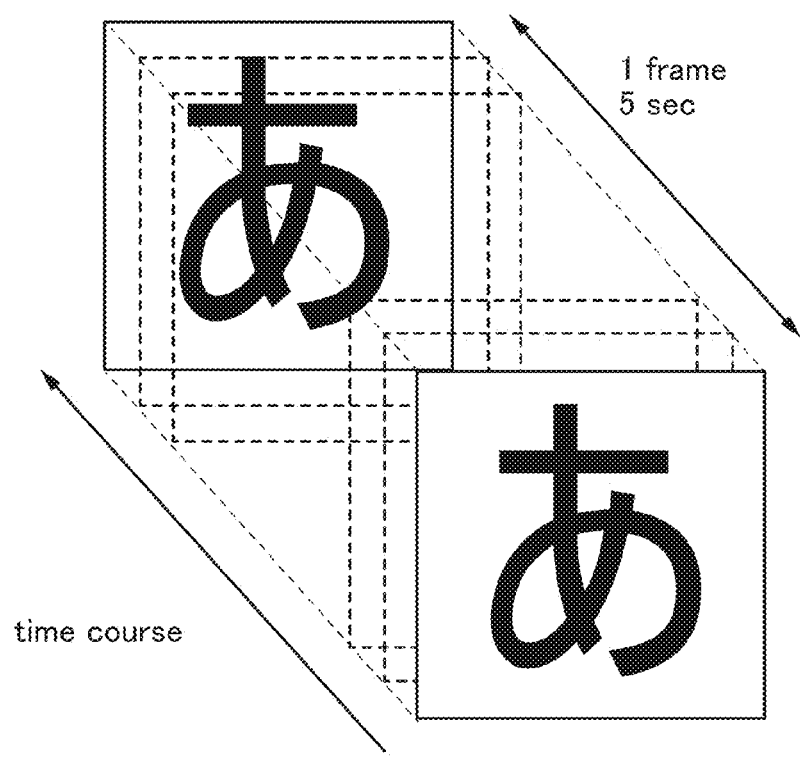

Thus, for example, the number of times of image writing can be reduced to 5 times per second as shown in FIG. 21B. The same image can be displayed for a long time as much as possible and flickers on a screen perceived by a user can be reduced. Therefore, stimuli to a retina, optic nerves, and a brain of a user are reduced, so that the strain is reduced.

Figure 22A:
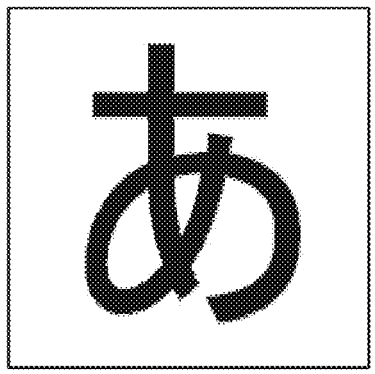
FIGS. 22A and 22B illustrate display of one embodiment of the present invention.

In the case where the size of one pixel is large (e.g., the resolution is less than 150 ppi), a blurred character is displayed by a liquid crystal display device as shown in FIG. 22A. When users look at the blurred character displayed on the liquid crystal display device for a long time, their ciliary muscles keep working to adjust the focus in a state where adjusting the focus is difficult, which might lead to eye strain.

Figure 22B:
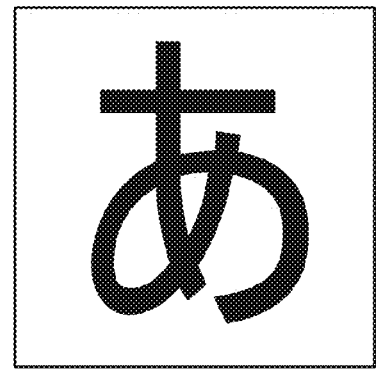

In contrast, in the liquid crystal display device of one embodiment of the present invention, the size of one pixel is small and thus high resolution display is performed as shown in FIG. 22B, so that precise and smooth display can be achieved. The precise and smooth display enables ciliary muscles to adjust the focus more easily, and reduces muscle strain of users.

Quantitative measurement of eye strain has been studied. For example, the critical flicker (fusion) frequency (CFF) is known as an index of measuring nerve strain; and the accommodation time and the accommodation near point are known as indexes of measuring muscle strain.

Examples of other methods for measuring eye strain include electroencephalography, thermography, measurement of the number of blinkings, measurement of tear volume, measurement of a pupil contractile response speed, and a questionnaire for surveying subjective symptoms.

One embodiment of the present invention can provide an eye-friendly liquid crystal display device.

EXAMPLE

In this example, description is made on the measurement results of the transmittance of a panel which was actually fabricated using the liquid crystal layer of one embodiment of the present invention described in Embodiment 1. The panel used in the measurement in this example is an FFS mode liquid crystal display device including a liquid crystal element including a liquid crystal layer in which liquid crystal molecules are oriented by the horizontal electric field.

Figure 26A:
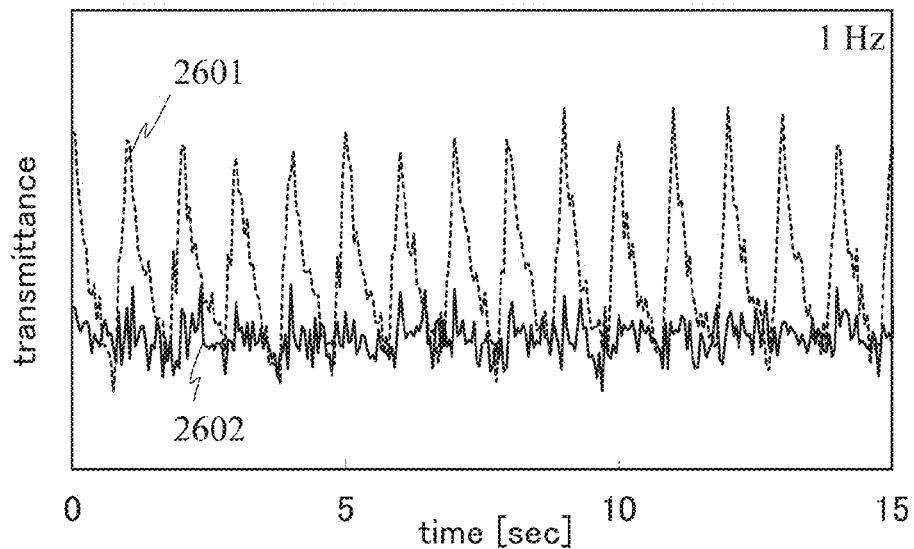
FIGS. 26A and 26B are graphs showing a time-dependent change in transmittance of a liquid crystal display device.

In FIG. 26A, the waveform denoted by a solid line 2602 shows a time-dependent change in transmittance of a liquid crystal display device including a liquid crystal layer having a dielectric constant anisotropy of 3.8 when voltage for the intermediate gray level is applied to the liquid crystal display device including the liquid crystal layer at a frame frequency of 1 Hz in a sawtooth waveform. For comparison, the waveform denoted by a dotted line 2601 in FIG. 26A shows a time-dependent change in transmittance of a liquid crystal layer having a dielectric constant anisotropy of 5.2 when voltage for the intermediate gray level is applied to a liquid crystal display device including the liquid crystal layer at a frame frequency of 1 Hz in a sawtooth waveform.

Figure 26B:
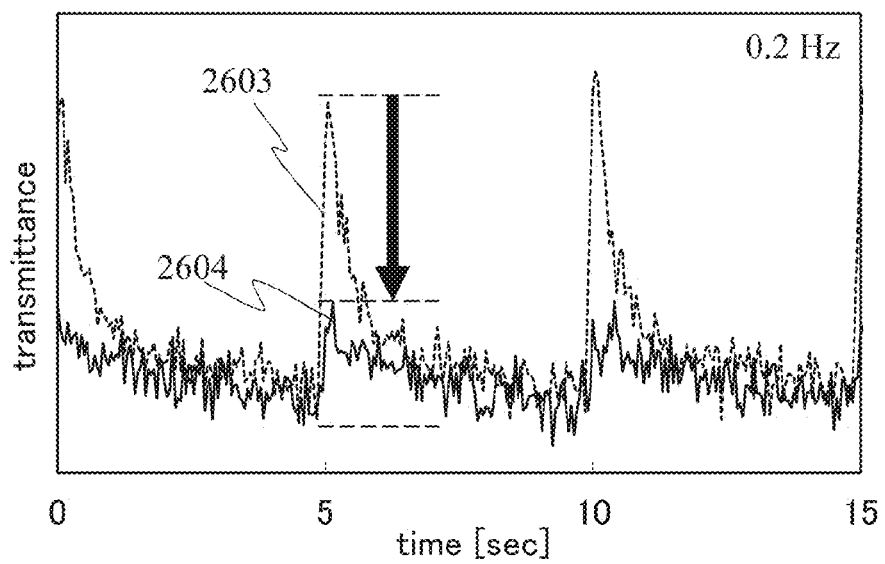

In FIG. 26B, the waveforms denoted by a solid line 2604 and a dotted line 2603 each show a time-dependent change in transmittance of a liquid crystal layer under conditions similar to those in FIG. 26A except that the frame frequency is 0.2 Hz.

Note that in FIGS. 26A and 26B, each of the vertical axes in the graphs denotes a normalized transmittance. Specifically, the graphs in FIGS. 26A and 26B show a change in transmittance of the liquid crystal layer at the intermediate gray level, on the assumption that a transmittance of 100% is expressed as 1.

In FIG. 26A, the time-dependent change in transmittance of the liquid crystal display device where the dielectric constant anisotropy is 5.2, which is shown by the dotted line 2601, is larger than the time-dependent change in transmittance of the liquid crystal display device where the dielectric constant anisotropy is 3.8, which is shown by the solid line 2602. This result accords with the results in FIGS. 4A and 4B described in Embodiment 1.

In FIG. 26B, the time-dependent change in transmittance of the liquid crystal display device where the dielectric constant anisotropy is 5.2, which is shown by the dotted line 2603, is larger than the time-dependent change in transmittance of the liquid crystal display device where the dielectric constant anisotropy is 3.8, which is shown by the solid line 2604. This result accords with the results in FIGS. 5A and 5B described in Embodiment 1.

The sawtooth waveforms denoted by the dotted line 2601 in FIG. 26A and the dotted line 2603 in FIG. 26B each reflect a residual DC due to an impurity in the respective liquid crystal layers. On the other hand, the sawtooth waveforms denoted by the solid line 2602 in FIG. 26A and the solid line 2604 in FIG. 26B show smaller changes in transmittance caused by the residual DC because the proportion of an impurity in the liquid crystal layers is low.

In the time-dependent change in transmittance of the liquid crystal layer at the intermediate gray level shown in FIGS. 26A and 26B, the fluctuation range of the transmittance can be reduced to about 40%.

Figure 31:
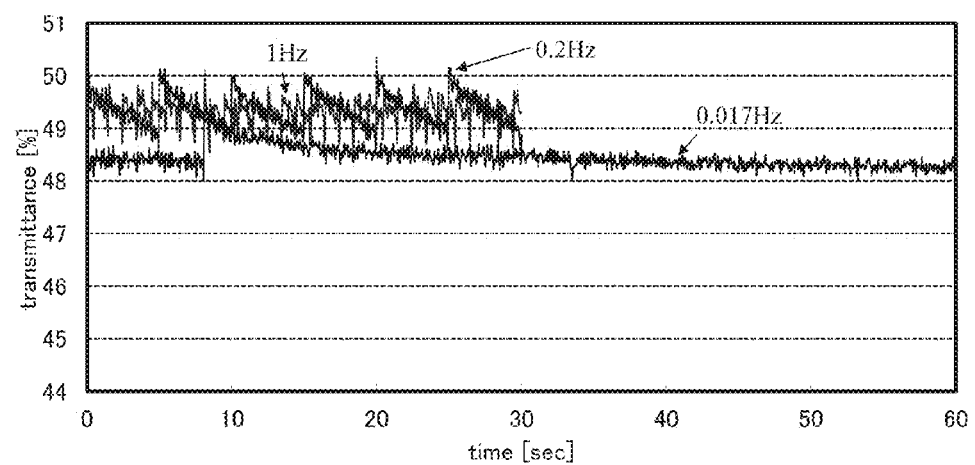
FIG. 31 is a graph showing changes in transmittance at different refresh rates.

In FIG. 31, each of waveforms shows a time-dependent change in transmittance of a liquid crystal display device including a liquid crystal layer having a dielectric constant anisotropy of 3.8 when voltage for the intermediate gray level is applied to the liquid crystal display device including the liquid crystal layer at a frame frequency of 1 Hz, 0.2 Hz, or 0.017 Hz in a sawtooth waveform.

FIG. 31 indicates that there is little difference in time-dependent change in transmittance between the waveforms at frame frequencies of 1 Hz, 0.2 Hz, and 0.017 Hz.

Figure 27:
FIG. 27 shows display of a liquid crystal display device.

FIG. 27 is an example of display of a liquid crystal display device including a liquid crystal layer having a dielectric constant anisotropy of 3.8.

As shown in FIG. 27, excellent display can be obtained without practical problems.

EXPLANATION OF REFERENCE

G1: scan line, G2: scan line, S1: signal line, S2: signal line, S3: signal line, 10: region, 11: first electrode, 12: second electrode, 13: alignment film, 14: alignment film, 15: liquid crystal molecule, 21: polarizing plate, 22: polarizing plate, 23: light detector, 24: arrow, 25: arrow, 100: transistor, 101: substrate, 102: gate electrode, 103: insulating layer, 104: oxide semiconductor layer, 105a: electrode, 105b: electrode, 106: insulating layer, 107: insulating layer, 110: transistor, 114: oxide semiconductor layer, 114a: oxide semiconductor layer, 114b: oxide semiconductor layer, 120: transistor, 124: oxide semiconductor layer, 124a: oxide semiconductor layer, 124b: oxide semiconductor layer, 124c: oxide semiconductor layer, 150: transistor, 151: insulating layer, 152: insulating layer, 160: transistor, 164: oxide semiconductor layer, 164a: oxide semiconductor layer, 164b: oxide semiconductor layer, 164c: oxide semiconductor layer, 164d: sidewall protective layer, 200: panel module, 201: first substrate, 202: second substrate, 203: sealant, 204: FPC, 205: external connection electrode, 206: wiring, 208: connection layer, 211: pixel portion, 212: IC, 213: gate driver circuit, 231: transistor, 232: transistor, 237: insulating layer, 238: insulating layer, 239: insulating layer, 242: black matrix, 243: color filter, 250: liquid crystal element, 251: first electrode, 252: liquid crystal, 253: second electrode, 254: spacer, 255: overcoat, 256: transistor, 400: touch panel, 401: first substrate, 402: second substrate, 403: substrate, 404: FPC, 405: external connection electrode, 406: wiring, 411: display portion, 412: source driver circuit, 413: gate driver circuit, 414: pixel portion, 415: FPC, 416: external connection electrode, 417: wiring, 420: liquid crystal display device, 421: electrode, 422: electrode, 423: wiring, 424: insulating layer, 430: touch sensor, 431: liquid crystal, 433: insulating layer, 434: adhesive layer, 435: color filter layer, 436: sealant, 437: switching element layer, 438: wiring, 439: connection layer, 440: sensor layer, 441: polarizing plate, 500: input unit, 500_C: signal, 600: liquid crystal display device, 610: control unit, 615_C: second-order control signal, 615_V: second-order signal, 620: arithmetic unit, 625_C: first-order control signal, 625V: first-order image signal, 630: display portion, 631: pixel portion, 631a: region, 631b: region, 631c: region, 631p: pixel, 632 G: driver circuit, 632_G: G signal, 633: S driver circuit, 633_S: S signal, 634: pixel circuit, 634c(i): parasitic capacitance, 634c: capacitor, 634t: transistor, 635: display element, 635_1: pixel electrode, 635LC: liquid crystal element, 650: light supply portion, 701: arithmetic unit, 702 memory unit, 703 graphic unit, 704 display means, 1400: portable information terminal, 1401: housing, 1402: display portion, 1403: operation button, 1410: mobile phone device, 1411: housing, 1412: display portion, 1413: operation button, 1414: speaker, 1415: microphone, 1420: audio reproducing device, 1421: housing, 1422: display portion, 1423: operation button, 1424: antenna, 2601: dotted line, 2602: solid line, 2603: dotted line, 2604: solid line This application is based on Japanese Patent Application serial no. 2012-251653 filed with Japan Patent Office on Nov. 15, 2012, Japanese Patent Application serial no. 2012-260839 filed with Japan Patent Office on Nov. 29, 2012, Japanese Patent Application serial no. 2013-044848 filed with Japan Patent Office on Mar. 7, 2013, and Japanese Patent Application serial no. 2013-151217 filed with Japan Patent Office on Jul. 22, 2013, the entire contents of which are hereby incorporated by reference.

The invention claimed is:

1. A liquid crystal display device comprising a pixel for displaying a still image at a frame frequency of less than or equal to 1 Hz, wherein the pixel comprises a liquid crystal layer having a dielectric constant anisotropy of greater than or equal to 2 and less than or equal to 5 and wherein a deviation in gray level for displaying the still image in one frame period is less than or equal to 1.2% of the maximum gray level.

2. The liquid crystal display device according to claim 1, wherein the pixel comprises: a transistor; and a liquid crystal element electrically connected to the transistor, and wherein the liquid crystal element comprises the liquid crystal layer.

3. The liquid crystal display device according to claim 2, wherein the transistor comprises a semiconductor layer, and wherein the semiconductor layer comprises an oxide semiconductor.

4. The liquid crystal display device according to claim 1, wherein the liquid crystal layer has a dielectric constant anisotropy of greater than or equal to 2.6 and less than or equal to 4.4.

5. The liquid crystal display device according to claim 1, wherein the liquid crystal layer has a dielectric constant anisotropy of greater than or equal to 3 and less than or equal to 3.8.

6. The liquid crystal display device according to claim 1, wherein the frame frequency is less than or equal to 0.2 Hz.

7. A liquid crystal display device comprising:
a pixel comprising:
   a pixel electrode; and
   a liquid crystal layer comprising a liquid crystal over the pixel electrode; and a driver circuit capable of outputting a signal to the pixel with a frame frequency of 1 Hz or less, wherein the liquid crystal has a dielectric constant anisotropy of greater than or equal to 2 and less than or equal to 5 and wherein a deviation in gray level for displaying a still image in one frame period is less than or equal to 1.2% of the maximum gray level.

8. The liquid crystal display device according to claim 7, wherein the pixel comprises a transistor electrically connected to the pixel electrode.

9. The liquid crystal display device according to claim 8, wherein the transistor comprises a semiconductor layer, and wherein the semiconductor layer comprises an oxide semiconductor.

10. The liquid crystal display device according to claim 7, wherein the liquid crystal layer has a dielectric constant anisotropy of greater than or equal to 2.6 and less than or equal to 4.4.

11. The liquid crystal display device according to claim 7, wherein the liquid crystal layer has a dielectric constant anisotropy of greater than or equal to 3 and less than or equal to 3.8.

12. The liquid crystal display device according to claim 7, wherein the frame frequency is less than or equal to 0.2 Hz.

* * * * *

UNITED STATES PATENT AND TRADEMARK OFFICE
CERTIFICATE OF CORRECTION

PATENT NO. : 9,129,568 B2
APPLICATION NO. : 14/078693
DATED : September 8, 2015
INVENTOR(S) : Daisuke Kubota et al.

It is certified that error appears in the above-identified patent and that said Letters Patent is hereby corrected as shown below:

In the Specification:

Col. 5, line 6, "anisotropy (As)" should read --anisotropy ($\Delta \varepsilon$)--

Col. 8, line 67, "ratio (VHIR)" should read --ratio (VHR)--

Col. 9, line 1, "anisotropies ($\Delta \in = 3.8$," should read --anisotropies ($\Delta\varepsilon = 3.8$,--

Col. 10, line 22, "$\in L$," should read --$\varepsilon L$--

Col. 10, line 23, "$\in //$" should read --$\varepsilon //$--

Col. 10, line 24, "constant $\in \perp$" should read --constant $\varepsilon \perp$--

Col. 10, line 25, "constant $\in //$" should read --constant $\varepsilon //$--

Col. 12, line 48, "constant $\in$" should read --constant $\varepsilon$--

Col. 12, line 48, "resistivity p," should read --resistivity $p$,--

Col. 25, line 24, "period off" should read --period of f--

Col. 38, line 15, "<<Modification Example>>1" should read --<<Modification Example 1>>--

Col. 38, line 33, "orHO" should read --or Hf).--

Col. 38, line 47, "orHO" should read --or Hf).--

Col. 39, line 25, "<<Modification Example>>2" should read --<<Modification Example 2>>--

Col. 40, line 25, "<Modification Example<" should read --<<Modification Example >>--

Col. 41, line 48, "hafnium (HO, zirconium" should read --hafnium (Hf), zirconium--

Col. 42, line 10, "1 $_nMO_3(ZnO)_m$" should read --1n$M0_3(ZnO)_m$--

Col. 44, line 13, "at 20 of" should read --at $2\theta$ of--

Col. 44, line 14, "at 20 of" should read --at $2\theta$ of--

Col. 52, line 49, "625V" should read --625_V--

Signed and Sealed this
Twenty-second Day of March, 2016

Michelle K. Lee
*Director of the United States Patent and Trademark Office*